(12) United States Patent
Shipman et al.

(10) Patent No.: US 11,987,312 B2
(45) Date of Patent: May 21, 2024

(54) SEAT POST ASSEMBLY

(71) Applicant: SRAM, LLC, Chicago, IL (US)

(72) Inventors: Christopher Shipman, Chicago, IL (US); Brian Jordan, Highland Park, IL (US); Kevin Wesling, Lombard, IL (US); Rafer Chambers, Colorado Springs, CO (US); Jesse Jakomait, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 1187 days.

(21) Appl. No.: 16/723,476

(22) Filed: Dec. 20, 2019

(65) Prior Publication Data

US 2020/0122799 A1    Apr. 23, 2020

Related U.S. Application Data

(63) Continuation of application No. 16/017,277, filed on Jun. 25, 2018.

(60) Provisional application No. 62/527,811, filed on Jun. 30, 2017, provisional application No. 62/589,745, filed on Nov. 22, 2017.

(51) Int. Cl.
*B62J 1/08* (2006.01)
*B62J 1/06* (2006.01)
*B62K 19/36* (2006.01)

(52) U.S. Cl.
CPC . *B62J 1/08* (2013.01); *B62J 1/06* (2013.01); *B62K 19/36* (2013.01); *B62J 2001/085* (2013.01); *B62K 2201/08* (2013.01)

(58) Field of Classification Search
CPC .... B62K 25/08; B62K 19/36; B62K 2201/08; B62J 1/06; B62J 1/08; B62J 2001/085
See application file for complete search history.

(56) References Cited

U.S. PATENT DOCUMENTS

| | | | |
|---|---|---|---|
| 3,081,788 A | 3/1963 | Lewis | |
| 3,083,000 A | 3/1963 | Jack et al. | |
| 3,415,159 A | 12/1968 | Hornlein et al. | |
| 3,948,147 A | 4/1976 | Sauer et al. | |
| 4,145,067 A * | 3/1979 | Ceriani | B62K 25/08 |
| | | | 280/124.16 |
| 4,245,826 A | 1/1981 | Wirges | |
| 4,257,582 A | 3/1981 | Wirges | |

(Continued)

FOREIGN PATENT DOCUMENTS

| | | |
|---|---|---|
| CN | 86105381 | 4/1987 |
| CN | 201646955 U | 11/2010 |

(Continued)

OTHER PUBLICATIONS

Maxwell, Taylor Patrick, "Passive Gas-Liquid Separation Using Hydrophobic Porous Polymer Membranes: A Study on the Effect of Operating Pressure on Membrane Area Requirement" (2012). UNF Theses and Dissertations, Paper 351. https://digitalcommons.unf.edu/etd/351.

*Primary Examiner* — Daniel J Wiley

(57) ABSTRACT

A fluid device for a bicycle may be provided to vent fluid from a hydraulic chamber of a seating component such as an adjustable seating assembly for a bicycle. The fluid device may be operable to vent a compressible fluid or a mixed combination flow of compressible and non-compressible fluids in a metered volume. The fluid device may recycle fluids preferentially.

15 Claims, 35 Drawing Sheets

(56) References Cited

U.S. PATENT DOCUMENTS

| | | | |
|---|---|---|---|
| 4,392,664 A * | 7/1983 | Tsuchiya | F16F 9/50 280/5.513 |
| 4,445,671 A | 5/1984 | Reuschenbach et al. | |
| 4,664,451 A | 5/1987 | Sakaguchi et al. | |
| 4,834,223 A * | 5/1989 | Kawamura | F16F 9/516 188/289 |
| 5,058,715 A * | 10/1991 | Silberstein | F16F 9/49 188/282.4 |
| 5,135,366 A | 8/1992 | Ribeiro | |
| 5,190,126 A * | 3/1993 | Curnutt | F16F 9/466 188/269 |
| 5,332,260 A | 7/1994 | Heinrichs et al. | |
| 6,202,806 B1 | 3/2001 | Sandrin | A63B 21/0056 188/267.2 |
| 6,390,457 B1 * | 5/2002 | Roper | C08F 8/36 188/282.1 |
| 6,612,410 B1 * | 9/2003 | Antonovsky | F16F 9/49 267/64.11 |
| 7,900,947 B2 * | 3/2011 | Inoue | B62K 25/08 280/276 |
| 8,333,217 B2 | 12/2012 | Raper et al. | |
| 8,511,655 B2 | 8/2013 | Wu | |
| 8,813,922 B2 * | 8/2014 | Mochizuki | F16F 9/50 188/313 |
| 9,156,327 B2 * | 10/2015 | Kitamura | F16F 9/063 |
| 9,341,226 B2 * | 5/2016 | Marking | B60G 13/08 |
| 9,688,331 B1 | 6/2017 | Sharai | |
| 9,957,008 B1 * | 5/2018 | Tsai | B62J 1/08 |
| 10,953,716 B2 * | 3/2021 | Marking | F16F 9/062 |
| 11,008,062 B2 * | 5/2021 | Barefoot | F16F 9/0281 |
| 11,180,212 B2 * | 11/2021 | Shirai | F15B 15/16 |
| 2004/0012132 A1 * | 1/2004 | Roper | F16F 9/48 267/64.15 |
| 2004/0061266 A1 | 4/2004 | Riel et al. | |
| 2004/0232650 A1 * | 11/2004 | Felsl | B62K 25/28 280/283 |
| 2006/0157954 A1 * | 7/2006 | Chen | B62K 25/08 280/276 |
| 2008/0041681 A1 * | 2/2008 | Shipman | B62K 25/08 280/276 |
| 2009/0261555 A1 * | 10/2009 | Tomiuga | F16F 9/20 280/279 |
| 2010/0044975 A1 * | 2/2010 | Yablon | F16F 9/065 188/282.8 |
| 2012/0098175 A1 | 4/2012 | Wu | |
| 2012/0305350 A1 * | 12/2012 | Ericksen | F16F 9/46 188/269 |
| 2013/0118847 A1 * | 5/2013 | Krahenbuhl | F16F 9/48 188/313 |
| 2013/0292218 A1 * | 11/2013 | Ericksen | F16F 9/464 188/266.2 |
| 2013/0313056 A1 * | 11/2013 | Cox | F16F 9/48 188/285 |
| 2014/0174286 A1 | 6/2014 | Pittens et al. | |
| 2015/0300382 A1 | 10/2015 | Kuo | |
| 2016/0304146 A1 | 10/2016 | Teixeira et al. | |
| 2016/0375951 A1 * | 12/2016 | Gilbert | F16F 9/061 188/280 |
| 2017/0274949 A1 * | 9/2017 | Pittens | B62J 1/08 |

FOREIGN PATENT DOCUMENTS

| | | |
|---|---|---|
| CN | 103991494 | 8/2014 |
| CN | 204688263 U | 10/2015 |
| CN | 105026791 | 11/2015 |
| CN | 105599825 | 5/2016 |
| CN | 205524616 | 8/2016 |
| CN | 106662193 | 5/2017 |
| DE | 1554251 | 3/1970 |
| DE | 2253269 | 5/1974 |
| DE | 2408055 | 8/1975 |
| DE | 3040483 | 5/1982 |
| DE | 38577 C | 6/1989 |
| DE | 102007003407 | 6/2008 |
| DE | 102007012838 | 6/2008 |
| DE | 102010029180 | 11/2011 |
| EP | 1054185 | 11/2000 |
| EP | 3345817 | 7/2018 |
| GB | 951775 | 3/1964 |
| TW | 554145 | 9/2003 |
| TW | 201109214 | 3/2011 |
| TW | 385094 | 2/2013 |
| TW | 201636256 | 10/2016 |
| TW | M531424 U | 11/2016 |
| TW | 201700340 | 1/2017 |
| TW | M538106 | 3/2017 |
| TW | M546161 | 8/2017 |
| TW | M555818 | 2/2018 |
| WO | 9201171 | 1/1992 |

* cited by examiner

SEAT POST ASSEMBLY

The present application is a continuation of and claims priority to U.S. patent application Ser. No. 16/017,277, filed Jun. 25, 2018 which claims priority to Provisional U.S. Patent Application No. 62/527,811, filed Jun. 30, 2017 and to Provisional U.S. Patent Application No. 62/589,745, filed Nov. 22, 2017. The contents of which are hereby incorporated in their entirety.

FIELD OF THE INVENTION

The present provisional application generally relates to seats for bicycles, and more particularly to an adjustable seat post assembly for a bicycle seat.

BACKGROUND

A bicycle may be equipped with a component such as an adjustable seating assembly. Such a component may be advantageous to allow selective lowering and raising of a saddle while the bicycle is in operation. For example, a rider may benefit from a lower saddle height while descending an incline through greater control achieved by more range of motion. Conversely, a rider may benefit from a higher saddle height while ascending an incline through a position allowing greater power transfer to a drivetrain of the bicycle. By allowing selective height adjustment of the saddle during operation, the bicycle may be configured to provide an appropriate seating position for varying conditions.

A typical bicycle seating assembly may have a seat post that is mechanically clamped to a seat tube of the bicycle. The clamp may be a fastener or lever that is released to allow an increase in an inside diameter of the seat tube in order to facilitate sliding the seat post up or down, thus adjusting the saddle height. Such a seating assembly does not facilitate user-friendly adjustment while the bicycle is in operation. An adjustable seating assembly for a bicycle may be designed for relatively quick adjustment of the saddle height within a defined range. Such systems may commonly be known as dropper seat posts, and may also use remote activation to improve the usability during operation. Such remote activation may be actuated by cable tension, hydraulic pressure, electronic signal, or other actuation methods. The remote activation may trigger movement within a linear movement mechanism. The linear movement mechanism may include a spring, such as a coil spring or a pneumatic spring; an electronic device, such as a servo or motor, or another type of linear actuator or component thereof. Such a linear movement mechanism may be designed to provide power for movement in both a raising direction and a lowering direction, as with a reversible electric motor, or the linear movement mechanism may provide bias in only one direction, such as with a spring. For example, a pneumatic spring may be provided to bias the seating assembly in the raising direction with enough force that the saddle height may be increased by actuation while the rider is not applying downward force to the saddle but with less force than a gravitational force acting on the rider's mass applied to the saddle such that the rider's weight may be used to decrease the saddle height. A locking mechanism may be provided to prevent actuation of the linear movement mechanism and thus provide a stable seating platform at a fixed saddle height.

A hydraulic locking mechanism of an adjustable seating assembly biased in the raising direction may provide positive support of the seating assembly in the raising direction when the system is static and not actuated. The hydraulic locking mechanism may provide more finely modulated adjustment of saddle height in contrast to systems that use ratchet- or detent-type locking mechanisms. The hydraulic locking mechanism also avoids problems associated with friction-type locking mechanisms such as slippage. A hydraulic locking mechanism may function by supporting a movable portion of the seating assembly with an adjustable volume of minimally-compressible or non-compressible fluid, which may be referred to as non-compressible fluid for convenience. In general, non-compressibility will hereinafter refer to fluids, states, or components configured for insubstantial compressibility, such as in hydraulic fluids or pressure-transmitting configurations. For instance, a volume of hydraulic fluid may be contained within a support chamber of the seating assembly with a volume control valve selectively operable to allow adjustment of the volume. Conversely, the term compressible will refer to fluids with relatively high compressibility, such as those fluids in a gaseous state or which would substantially interfere with hydraulic pressure transfer.

The adjustable volume may be increased by a source of stored potential energy, such as a compressed pneumatic spring, being released to force part of a reservoir volume of hydraulic fluid into the support chamber, thus increasing the volume contained within the support chamber and increasing the saddle height. In this scenario, if the volume control valve is opened when the force of the rider's weight on the support chamber exceeds the force applied on the reservoir volume by the pneumatic spring, the volume of the support chamber and thus the saddle height will decrease. The force required to overcome the force of the spring bias may be tunable by adjusting pressure or working surface area of components.

Hydraulic systems relying on the non-compressibility of hydraulic fluid may degrade in performance due to ingress of compressible fluids. For example, gasses present in the atmosphere or contained within a pneumatic spring of the adjustable seating assembly may enter the hydraulic support chamber. Under pressure, these compressible fluids will compress and allow deflection of the adjustable seating assembly. In contrast, it may be advantageous to have no or very little movement in a seating assembly, for instance to promote more efficient energy transfer to the drivetrain of the bicycle. Because ingress of gasses may occur in a hydraulic system, a facility for releasing gasses from such a system may be advantageous. Such issues may also arise in other hydraulic components of a bicycle, for instance front and rear suspension components, to which such a facility may also apply.

SUMMARY

One aspect of the invention provides a seating component for a bicycle, comprising: an upper, and a lower connected to the upper and movable relative to the upper along an axis; a support chamber disposed between the upper and the lower and configured to contain a liquid fluid; a reservoir disposed between the upper and the lower; a spring portion configured to contain a gaseous fluid; an actuation valve operable to facilitate fluid communication between the support chamber and the reservoir in an open state and to inhibit fluid communication in a closed state of the actuation valve; and a flow device permeable to the gaseous fluid and substantially impermeable to the liquid fluid.

Another aspect of the invention provides a telescopic seating component for a bicycle, comprising an upper comprising a saddle mounting portion; and a lower configured to attach to a frame and connected to the upper and movable relative to the upper along an axis; a support chamber disposed between the upper and the lower and configured to contain a non-compressible fluid; a reservoir disposed between the upper and the lower; a spring portion configured to contain a relatively compressible fluid; an actuation valve operable to facilitate fluid communication between the support chamber and the reservoir in an open state and to inhibit fluid communication in a closed state of the actuation valve; and a flow device configured to pass the relatively compressible fluid and to restrict the relatively non-compressible fluid, in the closed state of the actuation valve.

BRIEF DESCRIPTION OF THE DRAWINGS

Other aspects and advantages of the embodiments disclosed herein will become apparent upon consideration of the following detailed description, wherein similar or identical structures have similar or identical reference numerals.

DETAILED DESCRIPTION

A fluid device configured to control fluid within a hydraulic component of a bicycle is advantageous to the operation thereof. For instance, a fluid device configured to vent fluid and/or seal fluid may be useful to maintain a desired state of a bicycle component. A fluid device may be known as a vent device, a seal device, or a combination thereof.

A vent device configured to release gas from a hydraulic chamber is advantageous to the operation of a hydraulic component of a bicycle. A vent or seal device that is simple in user operation may reduce or eliminate the need for regular service intervals of hydraulic components. Particularly on a bicycle, a component should be lightweight and compact to minimize interference with and resistance to riding a bicycle. A fluid device may be configured to address these needs.

Figure 1:
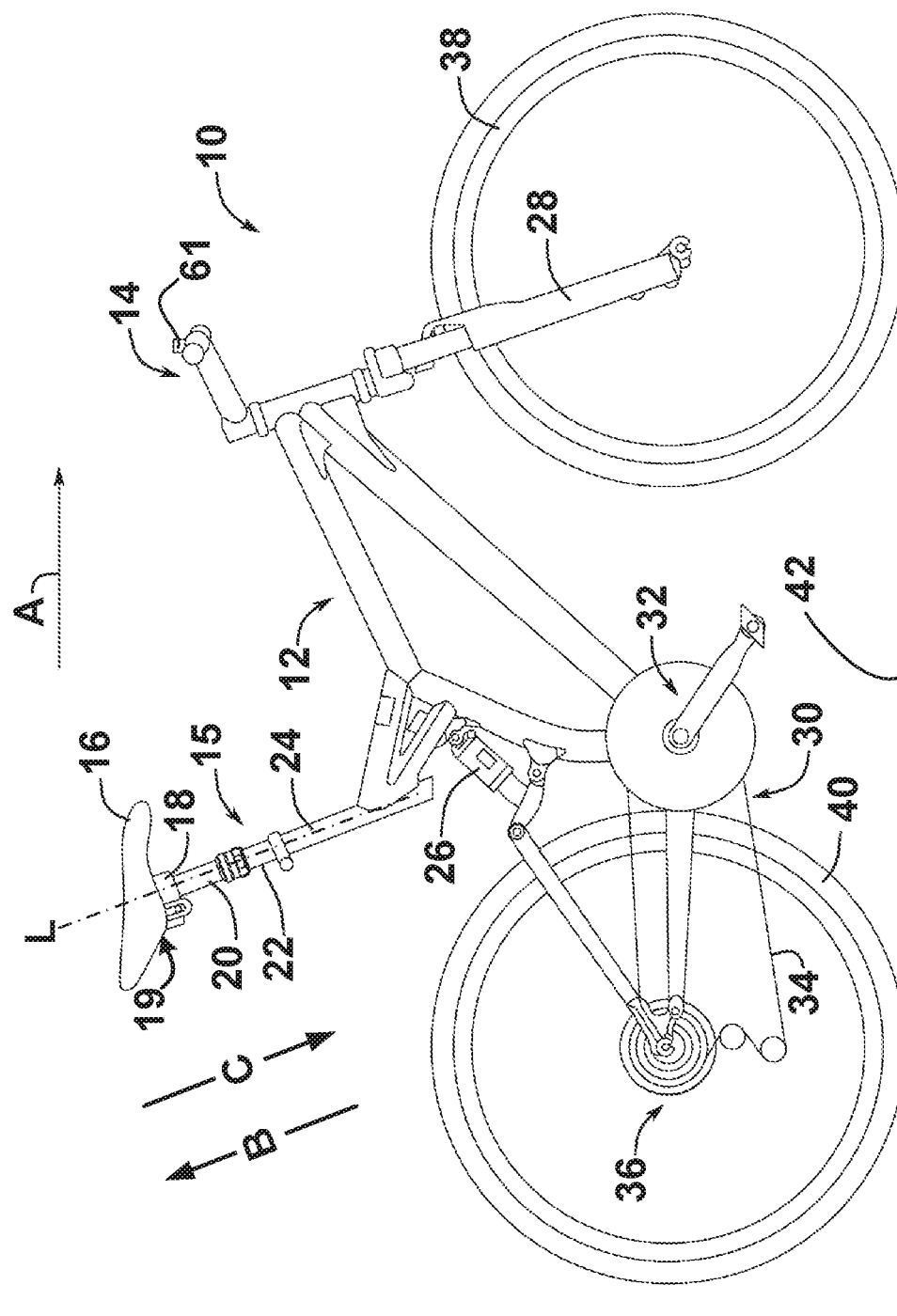
FIG. 1 is a side view of an off-road type bicycle, which may be used to employ a fluid device.

FIG. 1 is a side view of an off-road or mountain type configuration of a bicycle 10 which may be used to employ a vent device. The bicycle 10 has a frame 12. A front shock absorber 28 is connected to the frame 12 and is steerable with a handlebar 14. A rear shock absorber 26 is connected to the frame 12. The front shock absorber 28 and the rear shock absorber 26 each connect to a wheel 36, having a rim 38 with a tire 40. The wheel 36 connected to the frame 12 with the rear shock absorber 26 may be driven with the drivetrain 30. The drivetrain 30 may translate rotational movement of a crank 32 to rotational movement of the wheel 36 through a chain 34. Frictional interaction between the tire 40 of the wheel 36 and an external surface 42 then translates the rotational movement of the wheel 36 into linear movement of the bicycle 10 in a forward direction A. A seating component 15 attaches to a seat tube 24 of the frame 12. The seating component 15 includes a seat post lower 22, operably associated with a seat post upper 20. The seat post upper 20 may include a seat post head 18. The seat post upper 20, and specifically the seat post head 18, may include a saddle connection portion 19 for connecting to a saddle 16. The saddle connection portion 19 may directly attach to the saddle 16 or may interface with another component, such as in what is known as a seat mast configuration. The saddle 16 may also be integral.

The saddle 16 is configured to be movable along a first axis L. The saddle 16 may be movable in a raising direction B and in a lowering direction C along the first axis L. For example, the seat post upper 20 may be fixedly attached to the saddle 16 and be movable within the seat post lower 22 along the first axis L. Features may be added or configurations changed to limit movement relative to the first axis L. For instance, features of the seat post upper 20 and the seat post lower 22 may inhibit movement past an upper point in the raising direction B and past a lower point in the lowering direction C. Additionally, the seat post upper 20 and the seat post lower 22 may include features or configurations to inhibit relative rotation about the first axis L. For example, one or more protrusions (not shown) of the seat post upper 20 may be keyed with features (not shown) of the seat post lower 22.

While the illustrated bicycle 10 of FIG. 1 represents a fully-suspensioned off road type bicycle, the present invention contemplates application to bicycles of any type, including road type bicycles, time trial or triathlon bicycles, and fully or partially-suspensioned mountain bicycles. The seating component 15 may be integrated into the frame 12. For instance, the seat post lower 22 and the seat tube 24 may be integrated.

Figure 2:
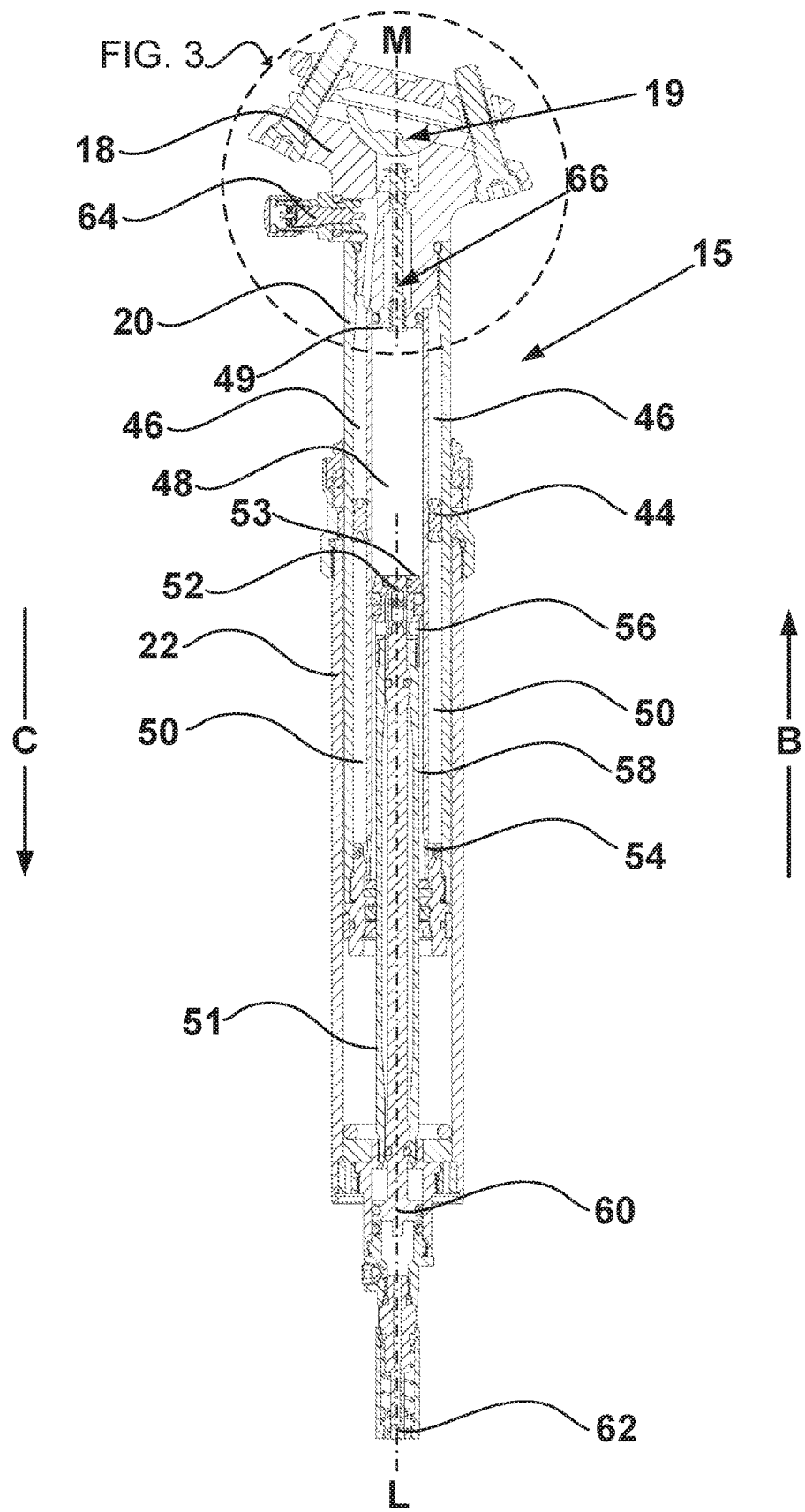
FIG. 2 is a bisected cross-sectional view of an embodiment of an adjustable seating assembly having a fluid device.

FIG. 2 is a bisected cross-sectional view of an embodiment of the seating component 15 having a vent device 66. The seat post upper 20 is shown slidably received within the seat post lower 22. The seat post upper 20 and the seat post lower 22 are shown having generally cylindrical configurations but may also be otherwise configured. For example, the seat post upper 20 and the seat post lower 22 may be configured so as to have oblong or polygonal radial cross-sections in order to facilitate aerodynamics, rigidity, packaging efficiency, and/or application compatibility to specific configurations of the bicycle 10.

The seat post lower 22 may also be configured such that at least a portion of the seat post lower 22 is received within the seat post upper 20. For instance, the seat post lower 22 may have a guide 51 received within the seat post upper 20. A pneumatic spring chamber 46 may provide a pressure to bias the seating component 15 in the raising direction B. The pressure contained within the pneumatic spring chamber 46 may be fixed or may be adjustable, such as through a pneumatic spring adjustment valve 64. The pneumatic spring adjustment valve 64 as shown is a Schrader type valve but may be another type of valve. For example, the pneumatic spring adjustment valve 64 may be a pressure-sealed valve type such as a Presta valve, a check valve type, or another type of valve operable to provide pneumatic adjustment of the pneumatic spring. The pneumatic spring chamber 46 may interact with a hydraulic reservoir chamber 50 directly or through a floating piston 44. The hydraulic reservoir chamber 50 is in selective fluid communication with a hydraulic support chamber 48, for instance through a reservoir opening 54, in fluid communication with a hydraulic exchange chamber 58, in fluid communication with an exchange opening 56, in fluid communication with an actuation valve 52 that is selectively operable to facilitate fluid communication between the exchange opening 56 and the hydraulic support chamber 48.

When the actuation valve 52 is closed and thus blocking fluid passage therethrough, the hydraulic support chamber 48 may contain a fixed volume of non-compressible fluid. In a closed state, the hydraulic support chamber 48 is configured to inhibit relative movement of the seat post upper 20 towards the seat post lower 22 in the lowering direction C along the first axis L. For example, the hydraulic support chamber 48 may have an upper support surface 49 fixed in at least the raising direction B relative to the seat post upper 20 and a lower support surface 53 fixed at least in the lowering direction C relative to the seat post lower. In this exemplary embodiment, a scenario in which a force in the lowering direction C applied to the seat post upper 20 is balanced with a force in the raising direction B applied to the seat post lower 22 would cause no relative movement between the seat post lower 22 and the seat post upper 20. Instead, the hydraulic support chamber 48, when filled with a fixed volume of non-compressible fluid, would provide sufficient forces through the upper support surface 49 and the lower support surface 53 to resist any such relative movement. However, when the hydraulic support chamber 48 contains a volume of a compressible fluid, as through gas ingress, such force would result in compression of the compressible fluid and thus relative movement between the seat post upper 20 and the seat post lower 22. In order to maintain a substantially non-compressible state of the hydraulic support chamber 48, the vent device 66 may be provided to vent non-compressible fluids.

Figure 3:
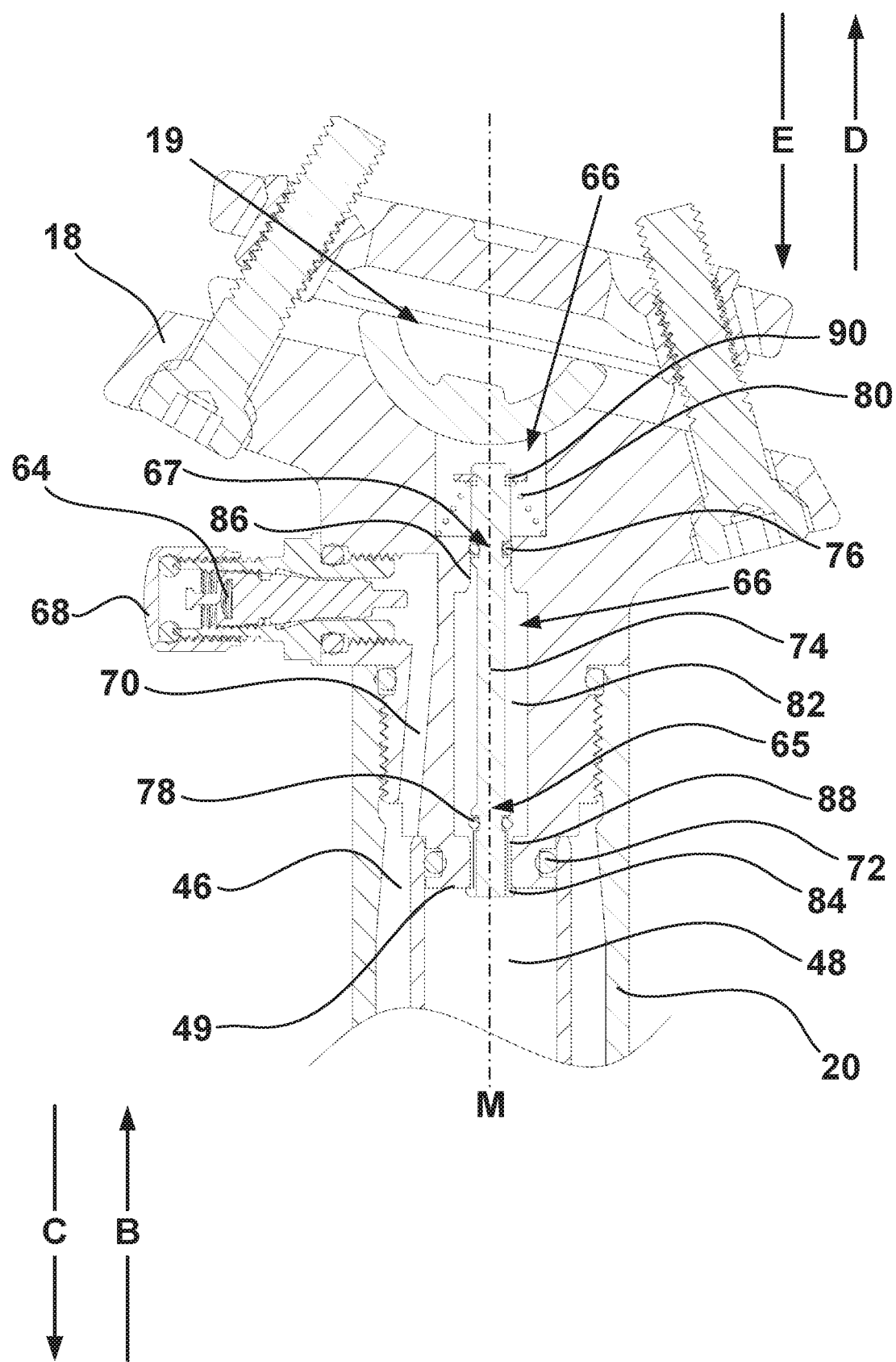
FIG. 3 illustrates an enlarged view of the fluid device of FIG. 2.

FIG. 3 illustrates an enlarged view of the vent device 66 of FIG. 2. The pneumatic spring adjustment valve 64 is shown having an adjustment valve cover 68. With the adjustment valve cover 68 removed, the pneumatic spring adjustment valve 64 may be operable to selectively facilitate fluid communication with an external component such as an air pump (not shown). Fluid communication through the pneumatic spring adjustment valve 64 may further extend through an adjustment path 70 into the pneumatic spring chamber 46. A portion of the hydraulic support chamber 48 is shown to be sealed at least in part by a support chamber upper seal 72. At least a portion of the vent device 66 is shown to be in fluid communication with the hydraulic support chamber 48. The vent device 66 may be selectively operable to permit fluid communication between the hydraulic support chamber 48 and an external environment. In one exemplary embodiment, the hydraulic support chamber 48 is in fluid communication with a vent chamber 82 in a released state.

A vent member 74 may travel along a second axis M and be biased in a bias direction D by a vent bias device 80. The second axis M may be coaxial with, orthogonal to, or in some other relation with the first axis L. As such, the bias direction D may be the same as the raising direction B or may be another direction as shown in other embodiments. The vent bias device 80 may be a spring, such as a coil spring, or may be a configuration facilitating a working pressure on a surface of the vent member 74. The vent member 74 may have a first end and a second end. These first and second ends of the vent member 74 and components associated with those ends may be referred to as distal or proximal relative to an internal hydraulic component of the seating component 15, for example the hydraulic exchange chamber 58 of FIG. 5 or the hydraulic support chamber 48 of FIG. 2. The vent member 74 may have a first stop and a second stop. For example, the vent member 74 may have a member bias stop 84 at the proximal end of the vent member 74 to restrict movement in the bias direction D and a member anti-bias stop 90 at the distal end of the vent member 74 to restrict movement in an anti-bias direction E. The member bias stop 84 and/or the vent member 74 may be configured to facilitate flow in the absence of a sealing connection.

The vent chamber 82 is sealed by the interaction of a vent distal seal 76 with a vent distal seal surface 86 when in the released state. In this embodiment, the vent distal seal 76 is fixed in the vent member 74 such that operation of the vent member 74 in the anti-bias direction E displaces the vent distal seal 76 in the anti-bias direction E along the second axis M. A vent proximal seal 78 is similarly fixed to the vent member 74 such that sufficient operation of the vent member 74 in the anti-bias direction E will cause the vent proximal seal 78 to interact with a vent proximal seal surface 88. In this embodiment, the vent distal seal 76 will remain in sealing contact with the vent distal seal surface 86 during all operational travel of the vent member 74 in which the vent proximal seal 78 is not in sealing contact with the vent proximal seal surface 88. Operational travel of the vent member 74 may be defined as a range of motion of the vent member 74 in an installed state. The vent proximal seal surface 88 and the vent distal seal surface 86 may be of beveled configurations so as to limit wear on the vent proximal seal 78 and the vent distal seal 76 during transitions between sealing and non-sealing states.

After the vent proximal seal 78 makes sealing contact with the vent proximal seal surface 88, further operation of the vent member 74 in the anti-bias direction E will move the vent distal seal 76 out of sealing contact with the vent distal seal surface 86 such that fluid communication between the vent chamber 82 past the vent distal seal 76 is facilitated but fluid communication between the vent chamber 82 and the hydraulic support chamber 48 is inhibited. A member anti-bias stop 90 may be provided to inhibit movement of the vent member 74 in the anti-bias direction E. For instance, the member anti-bias stop 90 may inhibit movement of the vent lower seat 78 past the vent proximal seal surface 88 in the anti-bias direction E. In this example, the member bias stop 84 limits the operational travel of the vent member 74 in the bias direction D and the member anti-bias stop 90 limits the operational travel of the vent member 74 in the anti-bias direction E.

In such a manner, a metered volume of pressurized fluid may be released from the hydraulic support chamber 48 into the vent chamber 82, isolated in the vent chamber 82, and released past the vent distal seal 76. Such an arrangement may be configured such that release occurs at a location where separation between a combination flow of compressible and non-compressible fluids occurs. For example, in a configuration of the seating component 15 in which compressible fluids may mix with relatively dense non-compressible fluids, release may be selectively permitted from an elevated location at which the less dense compressible fluids collect, such as adjacent to the upper support surface 49. The seating component 15 may be configured to create such a spot for efficient collection of less dense fluids or separation of components of combination flow of different fluid densities. In an alternative embodiment, the vent proximal seal 78 and the vent proximal seal surface 88 may be configured to be in sealing contact in the released state.

Figure 4:
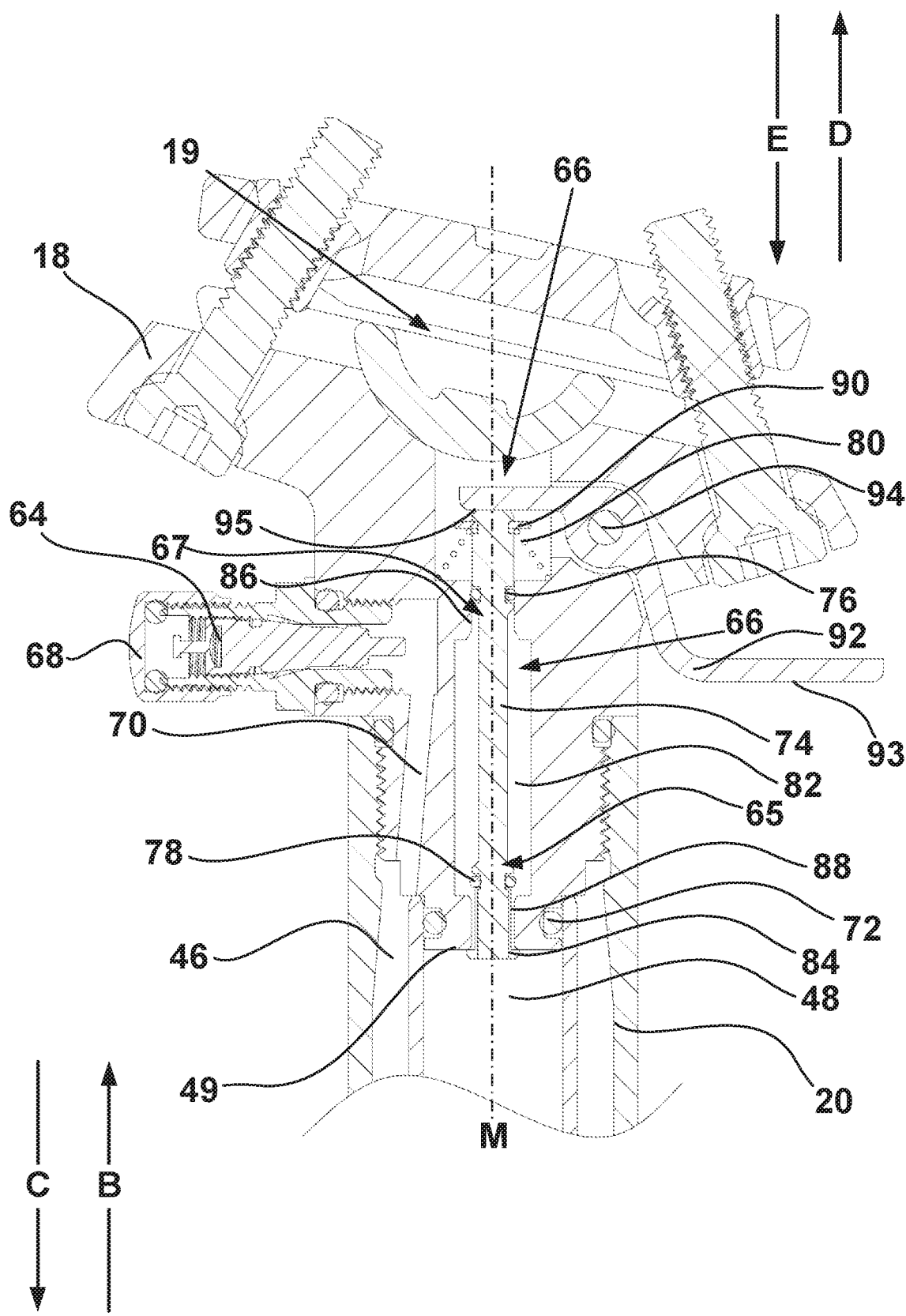
FIG. 4 illustrates an enlarged view of an alternative embodiment of the fluid device of FIG. 2.

FIG. 4 illustrates an enlarged view of an alternative embodiment of the vent device 66 of FIG. 2. This embodiment includes an operation control device 92 in operative association with the vent member 74. The operation control device 92 provides a remote operative connection with which a user may operate the vent member 74. For example, the operation control device 92 may be a lever pivotable about a control pivot 94. In such a manner, a user input force in the bias direction D on a user surface 93 of the operation control device 92 will result in an operation force by an operation surface 95 on the vent member 74 in the anti-bias direction E. The operation control device 92 may also be another type of control device. For instance, the operation control device 92 may be an electronic or electromechanical device such as a motor or a servo-based device.

Figure 5:
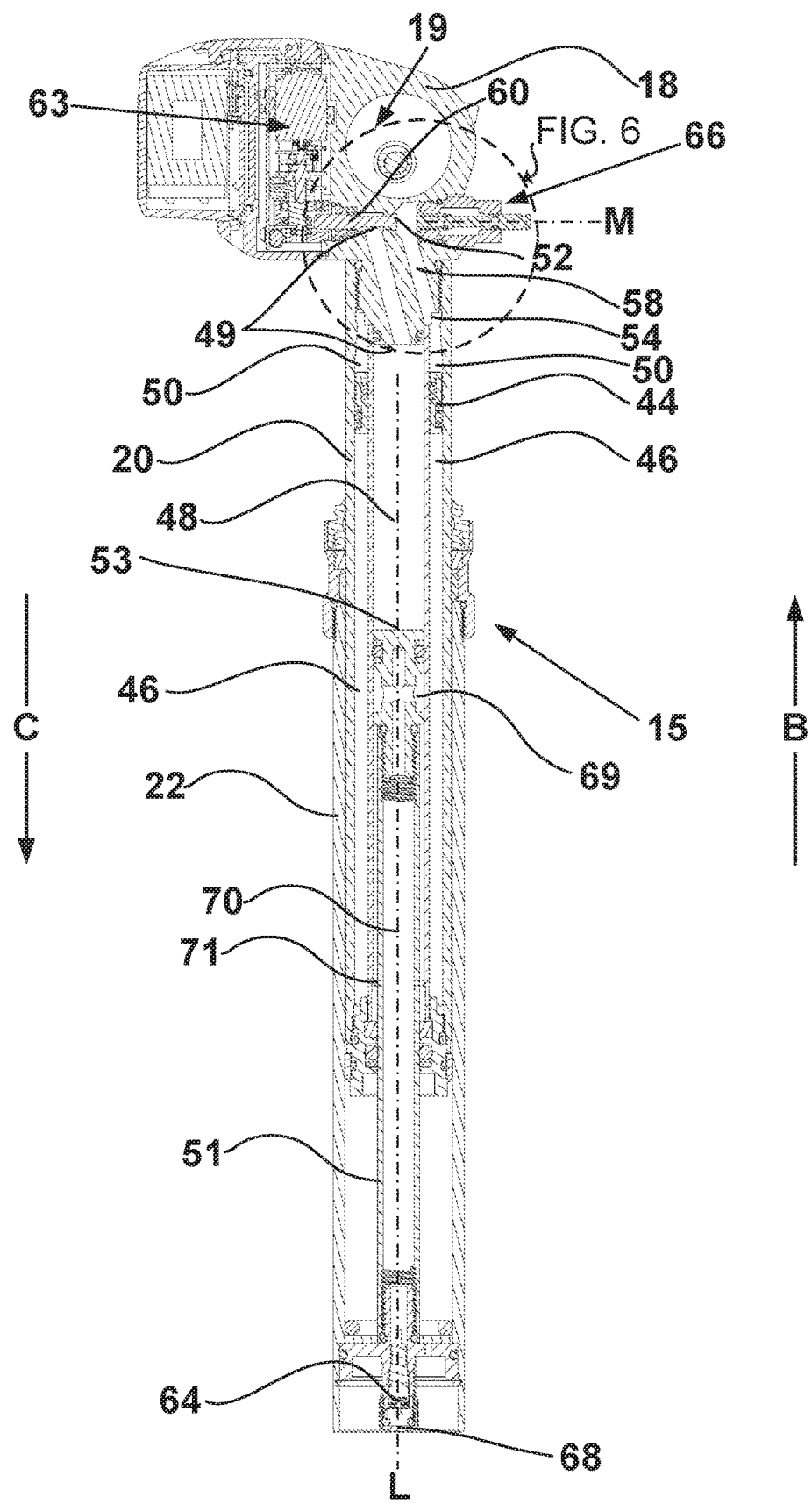
FIG. 5 is a bisected cross-sectional view of an embodiment of an adjustable seating assembly having a fluid device.

FIG. 5 is a bisected cross-sectional view of an embodiment of the seating component 15 with the vent device 66. The example shown in FIGS. 5-8 differs from the examples shown in FIGS. 2-4 in that the actuation valve 52 is disposed in the seat post head 18 and the pneumatic spring adjustment valve 64 is disposed in the seat post lower 22. As such, the pneumatic spring adjustment valve 64 may remain in fluid communication with the pneumatic spring chamber 46. For example, the pneumatic spring adjustment valve 64 may be in fluid communication with an adjustment opening 69 through the adjustment path 70. The adjustment opening 69 may be configured such that at least at one operative displacement of the seat post upper 20 relative to the seat post lower 22 the adjustment opening 69 is in fluid communication with the pneumatic spring chamber 46 through a spring opening 71. Additionally, FIG. 5 shows the second axis M not coaxial with the first axis L. The second axis M may be orthogonal to the first axis L as shown, or the two axes L, M may be otherwise oriented.

The actuation chamber 62 may be substituted with an actuation device 63, such as an electromechanical motor, a cable actuation device, or other actuation facility. The upper support surface 49 may be a plurality of surfaces against which a force in the raising direction B may be exerted. At least a portion of the upper support surface 49 may be a component other than the seat post upper 20. For example, the actuation member 60 may act as a portion of the upper support surface 49 as shown. The actuation member 60 may be selectively operable to allow fluid communication, for instance of compressible fluids, past the actuation valve 52 into the hydraulic exchange chamber 58.

Figure 6:
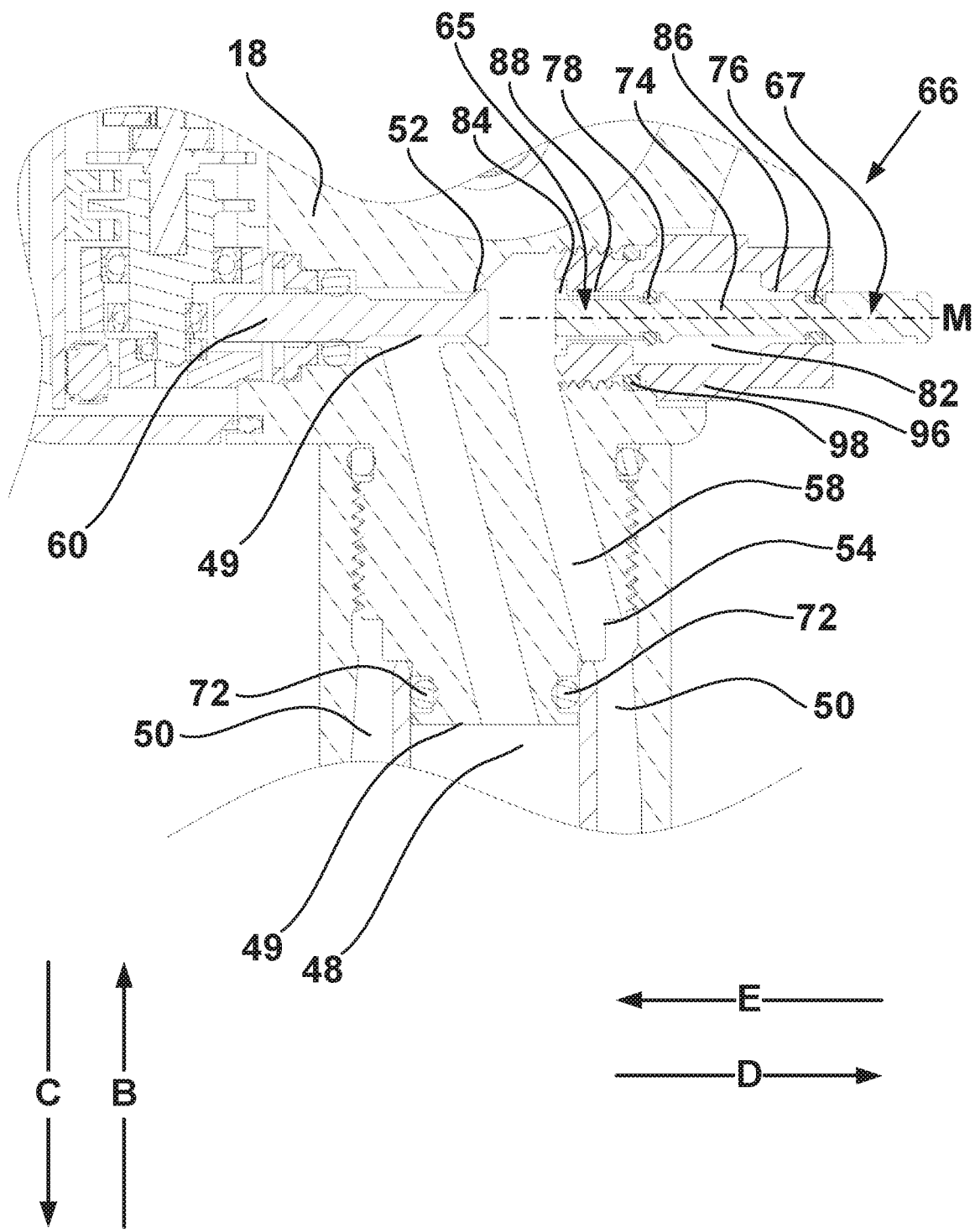
FIG. 6 illustrates an enlarged view of the fluid device of FIG. 5 in a released state.
Figure 7:
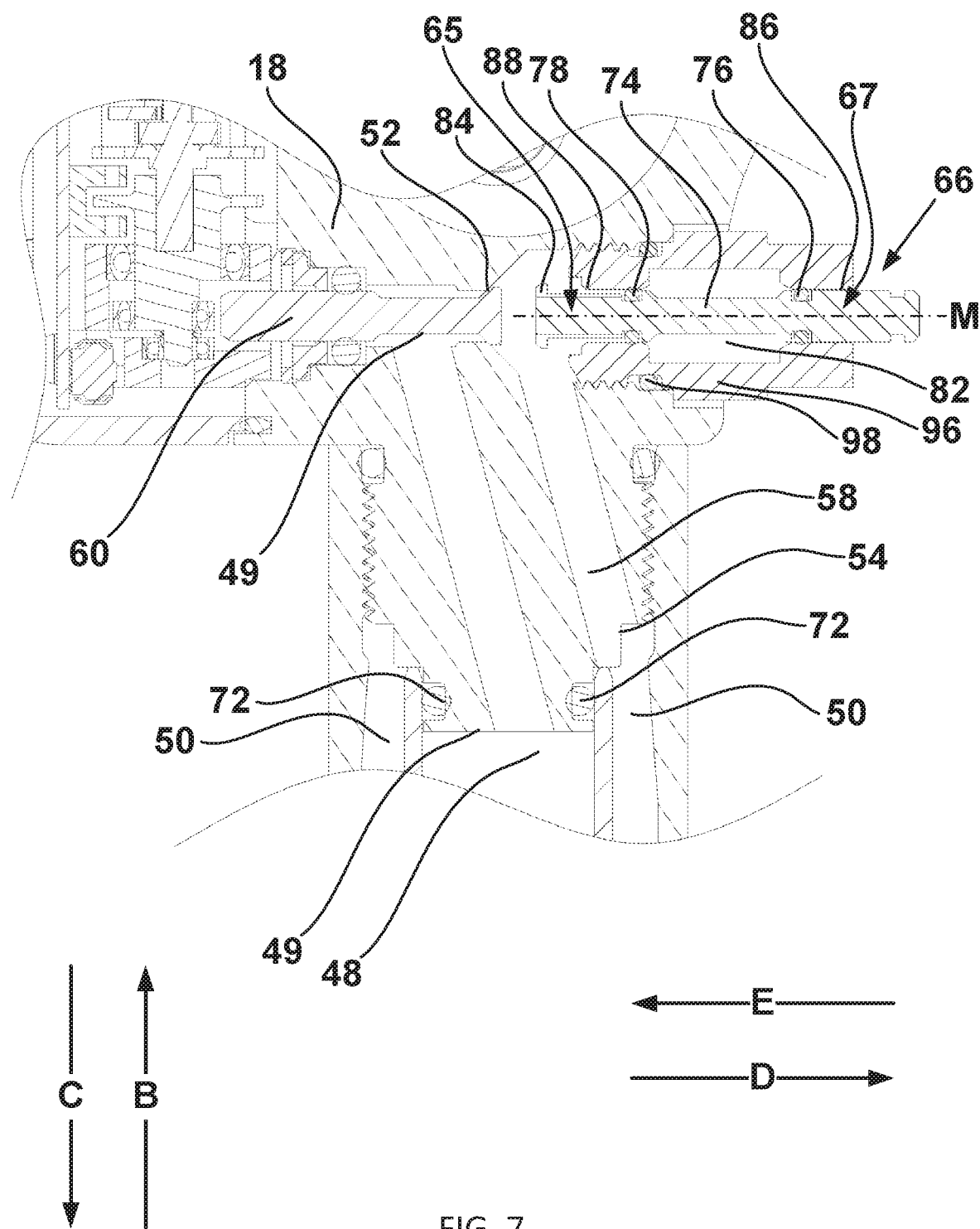
FIG. 7 illustrates an enlarged view of the fluid device of FIG. 5 in an intermediate state.
Figure 8:
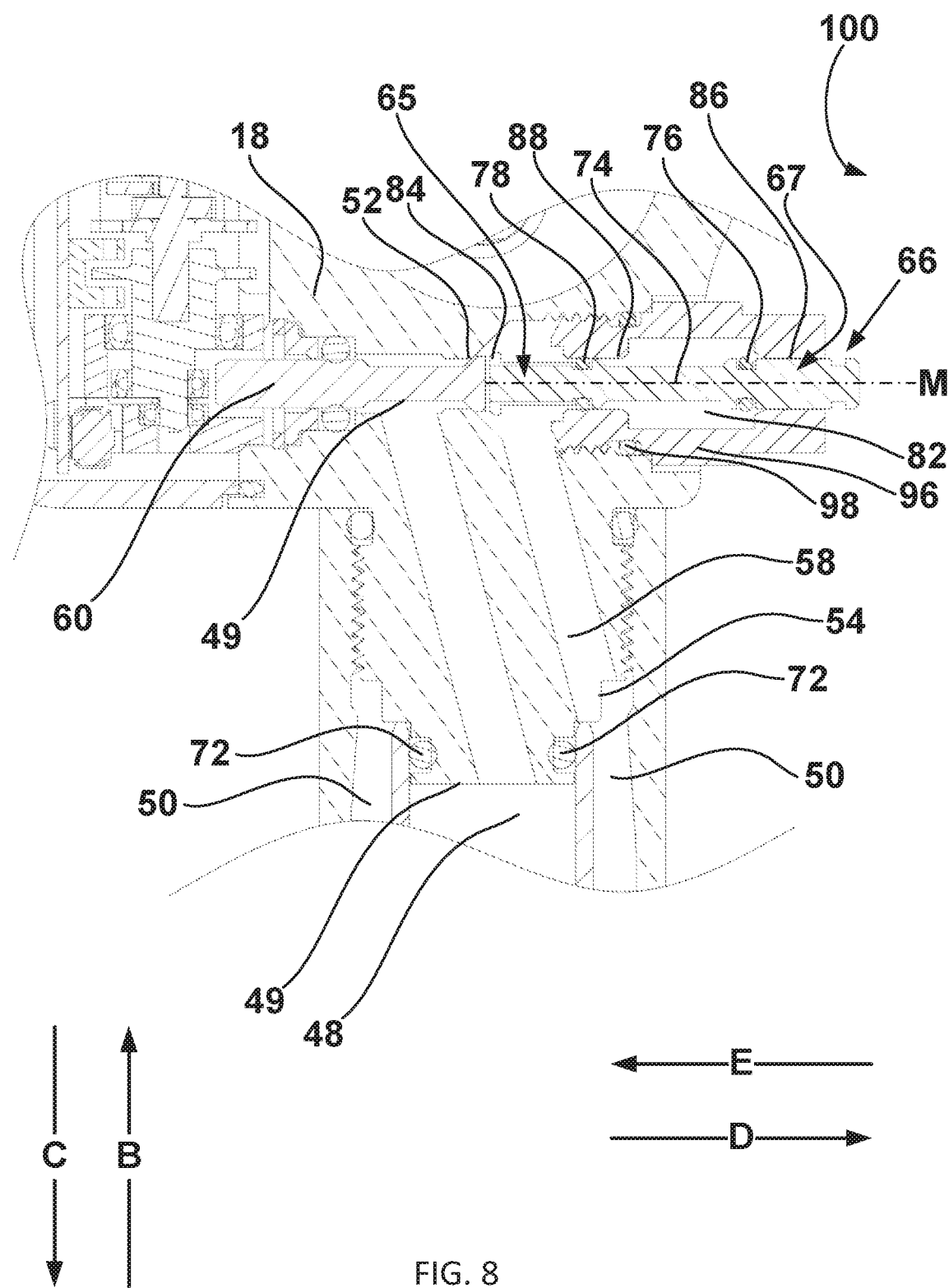
FIG. 8 illustrates an enlarged view of the fluid device of FIG. 5 in an actuated state.

FIGS. 6-8 illustrate an enlarged view of the vent device of FIG. 5 in various states of operation. The member anti-bias stop 90 of FIG. 3 may be omitted in an embodiment and the vent member 74 may be inhibited from moving past a point in the anti-bias direction E by another component. For example, the actuation member 60 may prevent movement of the vent member 74 in the anti-bias direction E through contact with the vent member 74. The vent member 74 may be stopped in such a manner to prevent movement of the vent proximal seal 78 past the vent proximal seal surface 88 in the anti-bias direction E.

The vent bias device 80 may also be omitted in an embodiment and a pressure acting on at least a portion of the vent member 74 may bias the vent member 74 in the bias direction D. For example, a pressure within the hydraulic exchange chamber 58 may exert a force on the vent member 74 in the bias direction D. This force, in the absence any operative force in the anti-bias direction E, may move the vent member 74 into a released state where the member bias stop 84 inhibits further movement in the bias direction D through interference with a vent body 96. The vent body 96 may be a separate component or may be a portion of another component. For example, the vent body 96 may be a portion of the seat post head 18. Alternatively, the vent body 96 may be a removable component and may be sealed with a vent body seal 98.

FIG. 6 illustrates an enlarged view of the vent device 66 of FIG. 5 in the released state. In the released state of this exemplary embodiment, the vent body 96 applies a force in the anti-bias direction E to the member bias stop 84 to counteract force in the bias direction D resultant from pressure within the hydraulic exchange chamber 58. The vent chamber 82 may be in fluid communication with the hydraulic exchange chamber 58 in the released state. Alternatively, the vent chamber 82 may be sealed from the hydraulic exchange chamber 58 in the released state, and enter into fluid communication with the hydraulic exchange chamber 58 in a transition state (not shown) after the released state but before an intermediate state, as in FIG. 7, in which fluid communication between the vent chamber 82 and the hydraulic exchange chamber 58 is sealed. For example, the member bias stop 84 may form a sealing connection with the vent body 96 in the released state but said sealing connection may be interrupted in the transition state to facilitate fluid communication between the hydraulic exchange chamber 58 and the vent chamber 82. In this example, the hydraulic exchange chamber 58 would enter into fluid communication with the vent chamber 82 before the vent proximal seal 78 makes sealing contact with the vent proximal seal surface 88 as in the intermediate state.

Compressible fluids contained within the hydraulic support chamber 48 may be released into the hydraulic exchange chamber 58 during the released state through relative positioning of the hydraulic exchange chamber above the hydraulic support chamber 48 and opening of the actuation valve 52. In an exemplary embodiment, said relative positioning is achieved through installation of the seating component 15 on the bicycle 10 while the bicycle is upright and positioned on the external surface 42, where the external surface 42 is level ground as in FIG. 1. Alternatively, direct fluid communication between the hydraulic support chamber 48 and the vent chamber 82 may be facilitated as in other embodiments.

FIG. 7 illustrates an enlarged view of the vent device 66 of FIG. 5 in the intermediate state. In this state, fluid communication is inhibited between the hydraulic exchange chamber 58 and the vent chamber 82. A sealing connection between the vent proximal seal 78 and the vent proximal seal surface 88 may inhibit said fluid communication. In the intermediate state, fluid communication past the vent distal seal 76 is also inhibited. For example, the vent distal seal 76 may form a sealing connection with the vent distal seal surface to inhibit said fluid communication. The intermediate state may exist while the vent distal seal 76 is in sealing contact with the vent distal seal surface 86 and the vent proximal seal 78 is in contact with the vent proximal seal surface 88. During the intermediate state, a fixed volume of fluid may be contained within the vent chamber 82. This fixed volume may be tunable to achieve a balance between maximum release of compressible fluids and minimum release of pressure and non-compressible fluids during an actuated state.

FIG. 8 illustrates an enlarged view of the vent device 66 of FIG. 5 in the actuated state. In the actuated state shown, the vent member 74 is not in contact with the actuation member 60. The actuation member 60 may function to stop movement past an actuated state point in the anti-bias direction E or an independent embodiment of the member anti-bias stop 90 may be provided to limit the operational travel of the vent member 74. In the actuated state shown, the vent distal seal 76 is not in sealing contact with the vent distal seal surface 86, and thus fluid communication past the vent distal seal 76 may be possible. Fluid communication past the vent distal seal 76 may be fluid communication between the vent chamber 82 and an external volume 100 such as the atmosphere. Assuming fluid communication with the atmosphere, fluids will be released from the vent chamber 82 in the actuated state until the vent chamber 82 has equalized to atmospheric pressure.

Fluid communication past the vent distal seal 76 may also be between the vent chamber 82 and another component of the bicycle 10 or another component of the seating component 15. For instance, the vent chamber 82 may be in fluid communication past the vent distal seal 76 with another component in order to facilitate containment of fluids and/or recycling of fluids. Fluid communication past the vent distal seal 76 may also be further inhibited. For example, the vent distal seal surface 86 may form a seal with another portion of the distal end 67 of the vent member 74 in order to limit fluid communication. In this example, the interaction of the vent member 74 and the vent distal seal surface 86 may inhibit the flow of dense fluids such as oils while permitting the flow of other less dense fluids such as atmospheric gasses. A possible configuration of such an example may include a gas-liquid separation device, such as a hydrophobic porous polymer membrane, that permits the flow of gas therethrough, but prohibits the flow of fluid therethrough.

Figure 9:
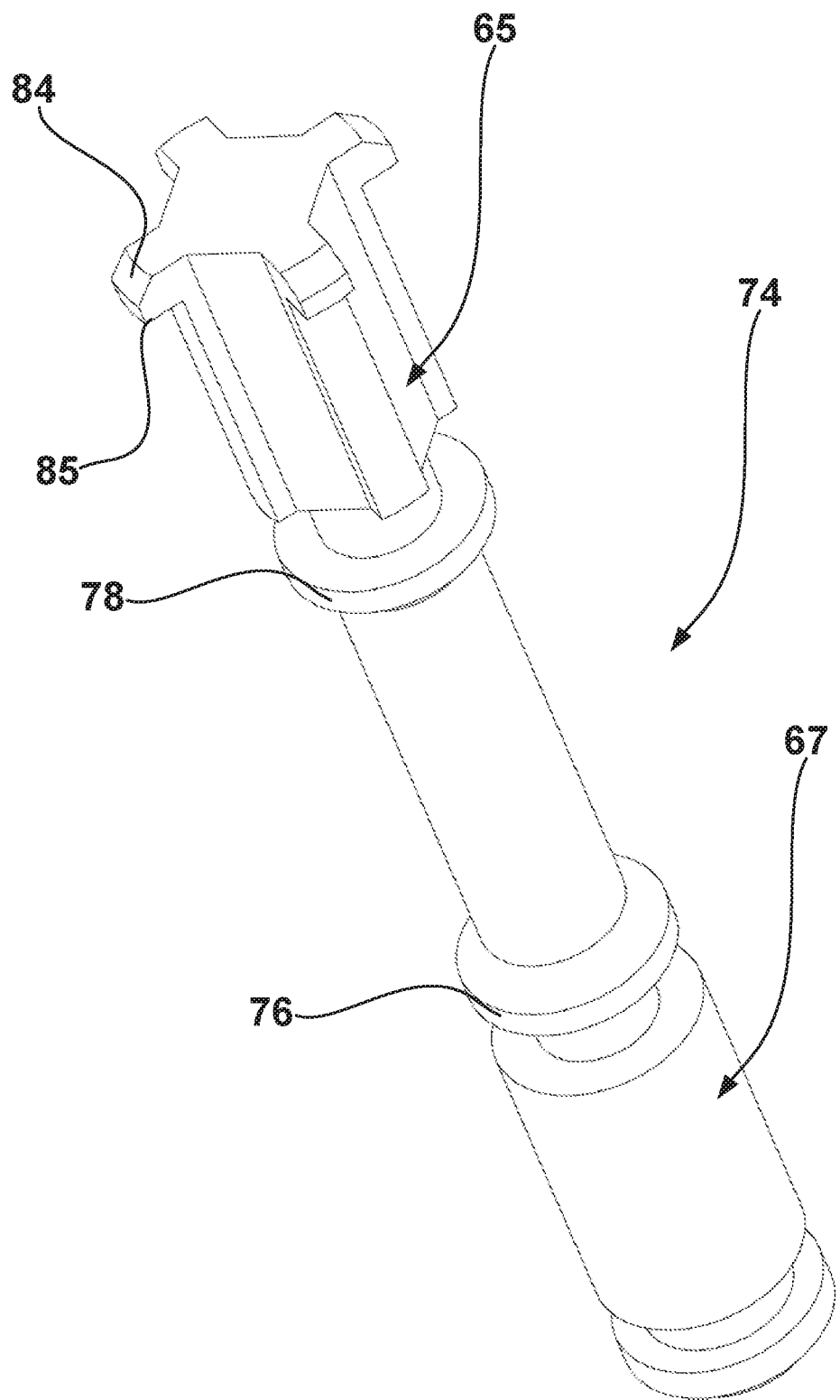
FIG. 9 is an isometric view of a component of the fluid device of FIG. 5.

FIG. 9 is an isometric view of the vent member 74 of the vent device 66. The vent member 74 is shown to have a multiple lug-type configuration of the member bias stop 84 on the proximal end 65. The member bias stop 84 may also have other configurations. For instance, the member bias stop 84 could also be of a single lug-type configuration or a wedge-type configuration. A lug-type configuration may include one or more of a protrusion 85. For example, a plurality of four (4) the protrusion 85 may be provided. The member bias stop 84 may also be disposed on the distal end 67 of the vent member 74, for instance as a surface facing the bias direction D for interaction with a surface of the vent body 96 facing the anti-bias direction E. The member bias stop 84 may also function as the member anti-bias stop 90, for example through contact with the actuation member 60. The proximal end 65, which may include the member bias stop 84, may be configured to facilitate fluid communication such as with cut outs or recesses. The distal end 67 may be similarly configured to facilitate fluid communication or may include fluid communication inhibiting features such as a gas-liquid separation device. The vent member 74 is shown in a generally cylindrical configuration but may be otherwise configured such as in an oblong configuration or a polygonal configuration. For example, features or the configuration of the vent member 74 may inhibit rotation relative to the vent body 96 about the second axis M.

Figure 10:
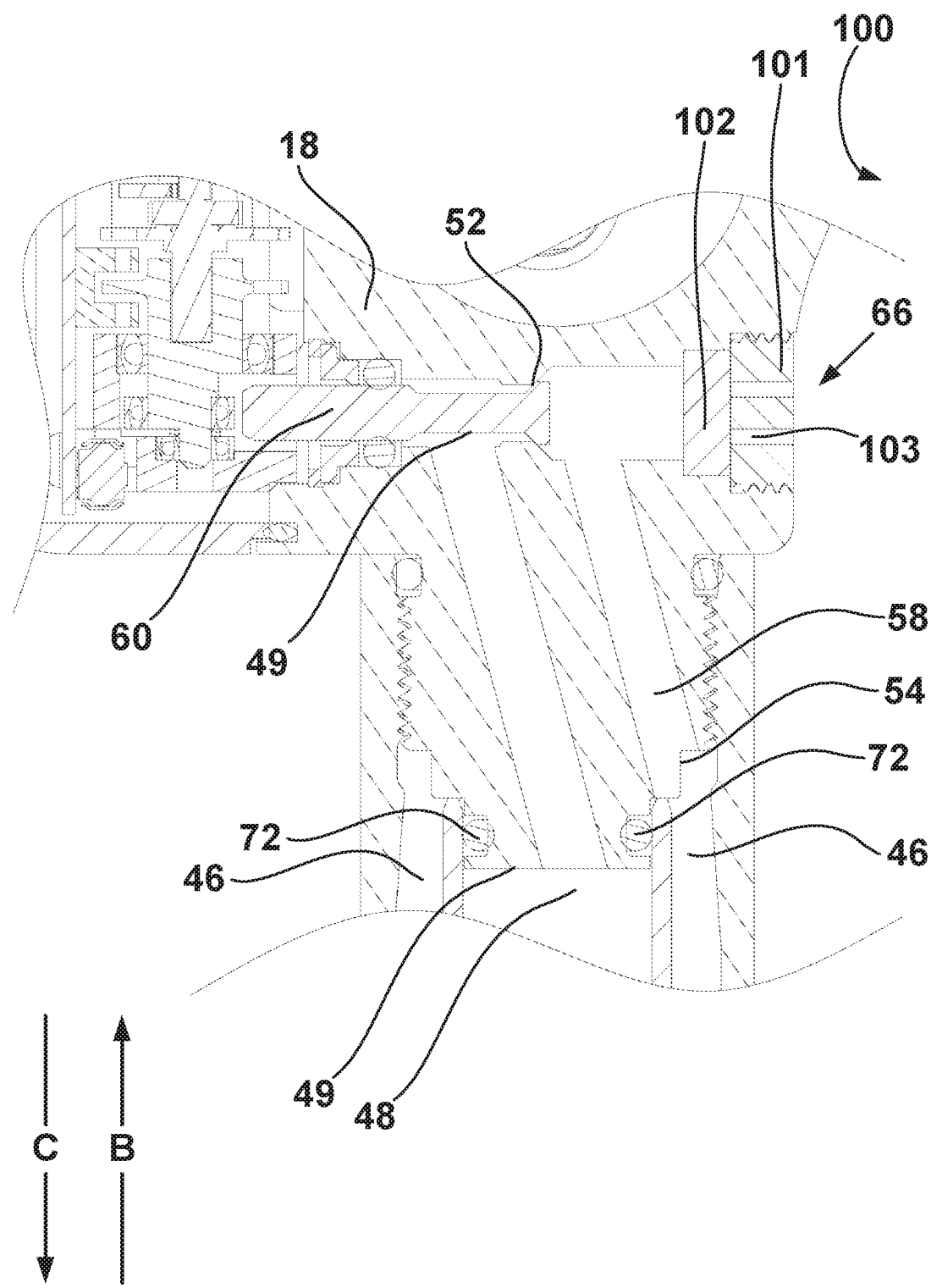
FIG. 10 illustrates an enlarged view of an alternative embodiment of the adjustable seating assembly of FIG. 5 having a fluid device.

FIG. 10 illustrates an enlarged view of an alternative embodiment of the vent device 66. The example shown in FIG. 10 differs from the examples shown in FIGS. 2-8 in that the vent member 74 is omitted and a permeable device 102, permeable to at least some fluids, is included. The vent member 74 need not be omitted in such an embodiment, and could be used in conjunction with the permeable device 102. The permeable device 102 may be at least in part a gas-liquid separation device such as a hydrophobic porous polymer membrane. The permeable device 102 may also include one or more of micro holes (not shown) configured to vent gaseous fluids. As an example, the permeable device 102 may apply condensation, temperature gradient, surface tension gradient, and/or droplet coalescence techniques to achieve selective permeability of fluids. In such a manner, with or without the use of a membrane, the permeable device 102 may be a tunable feature, for instance through adjustment of membrane porosity, to allow permeability of selected fluid flow. For example, the permeable device 102 may be configured with a gas-permeable, oil-impermeable membrane to permit fluid communication of gasses but to inhibit fluid communication of liquid oils. In other embodiments, for example non-membrane based embodiments, other techniques may be used to tune the permeable device.

The vent device 66 may further include a flow device 101. The flow device 101 may be configured to secure the permeable device 102 to a portion of the seating component 15. For example, the flow device 101 may threadably install into the seat post head 18 to secure the permeable device 102 therebetween. The permeable device 102 may be deformable so as to sealingly attach therein, or an independent seal (not shown) may be provided to seal the permeable device 102. The permeable device 102 may be in direct fluid communication with the hydraulic exchange chamber 58. The flow device 101 is also permeable to at least some fluids. For example, the flow device 101 may have a flow unit 103, which may be a channel, a plurality of channels, or other flow-facilitating configuration to permit fluid communication. Any fluid communication through the permeable device 102 and/or the flow device 101 may be between a component of the seating component 15 and the external volume 100 or between a component of the seating component 15 and another component of the seating component 15. For example, the permeable device 102 may facilitate fluid communication between the hydraulic support chamber 48 and the external volume 100.

Figure 11:
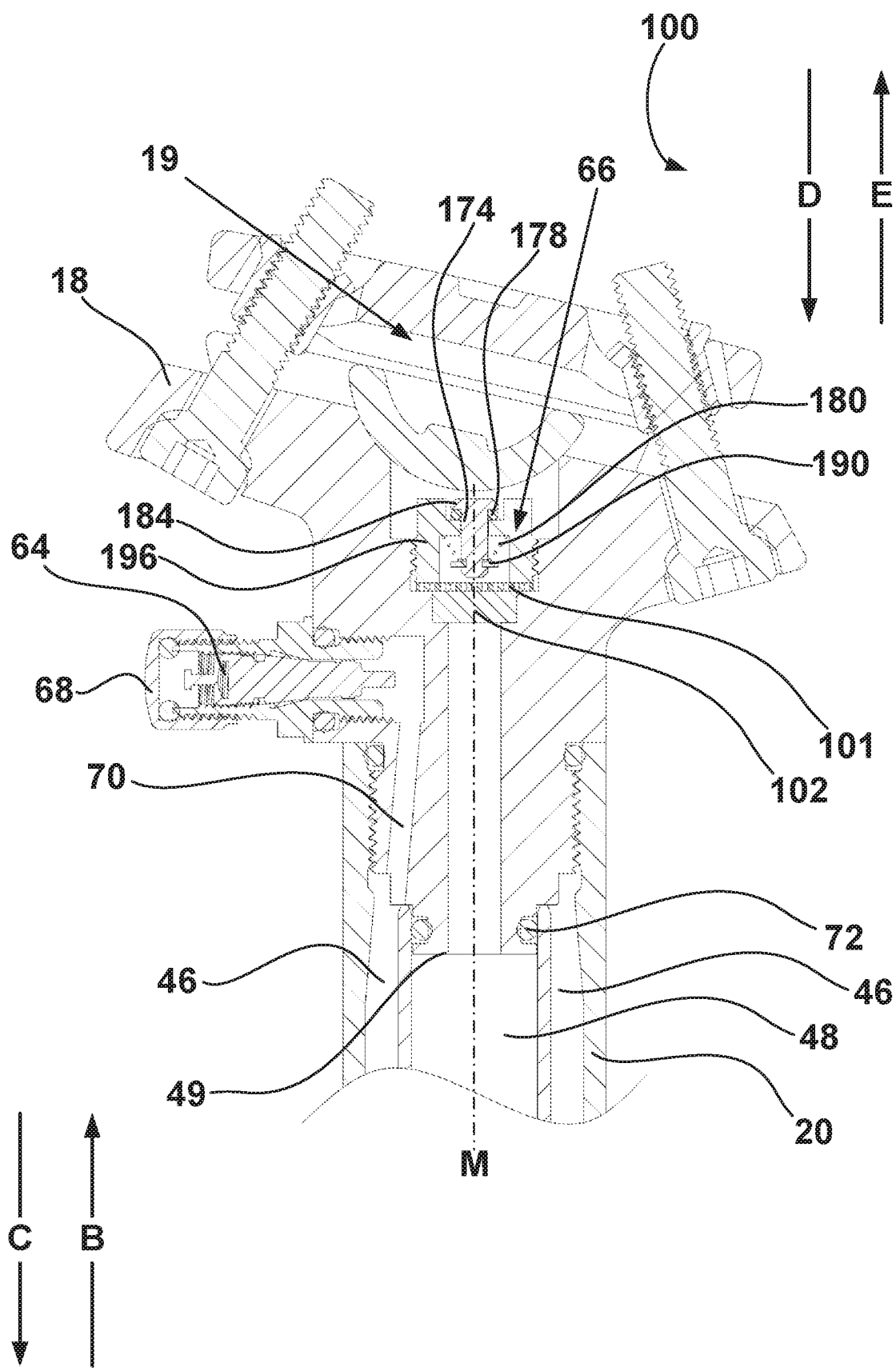
FIG. 11 illustrates an enlarged view of an alternative embodiment of the adjustable seating assembly of FIG. 2 having a fluid device.

FIG. 11 illustrates an enlarged view of an alternative embodiment of the vent device 66. The example in FIG. 11 differs from the examples in FIGS. 2-8 in that it includes the permeable device 102 and the flow device 101, which may be the same as those of FIG. 10. The example in FIG. 11 differs from the example in FIG. 10 in part with the addition of a second vent member 174. The second vent member 174 may be in fluid communication with the hydraulic support chamber 48 as in FIG. 11 and/or with the hydraulic exchange chamber 58 as per an arrangement like that in FIG. 10 through the permeable device 102 and/or the flow device 101. In such a relation, the second vent member 174 and associated components of the vent device 66 of this exemplary embodiment may be described as secondary to the primary flow communication of the permeable device 102 and/or the flow device 101. Alternative, the second vent member 174 may be employed without the permeable device 102 and/or the flow device 101 and the vent member 74 may be employed in conjunction with the permeable device 102 and/or the flow device 101.

The second vent member 174 may be biased in the bias direction D by a second vent bias device 180. The second vent bias device 180 may be a spring, such as a coil spring in the present embodiment, or may be a configuration facilitating a working pressure on a surface of the second vent member 174. The second vent bias device 180 may bias the second vent member 174 in the bias direction D until stopped by another component, such as a second member bias stop 184. The second member bias stop 184 may form a sealing connection, such as a sealing connection between the second member bias stop 184, a second vent seal 178, and a second vent body 196 of the vent device 66. The second vent member 174 may be constrained by a second member anti-bias stop 190 in the anti-bias direction E. The second member anti-bias stop 190 may be fixed or removable and may be adjustable.

The second vent body 196 may be removable from or an integral component of the seating component 15. A pressure within the seating component 15 may overcome the second vent bias device 180 to displace the second vent member 174 and permit fluid communication past the second vent seal 178. For example, pressure from movement of the seat post upper 20 relative to the seat post lower 22 in the lowering direction C may result in a pressure within the hydraulic support chamber 48, communicated through the permeable device 102 and/or the flow device 101, sufficient to overcome the second vent bias device 180 through acting on a working surface of the second vent member 174 and thus displacing the second vent member 174 to facilitate fluid communication past the second vent seal 178 and with the external volume 100. Such fluid communication may also be with another component of the seating component 15, such as for containment or recycling purposes shown in FIG. 12.

Figure 12:
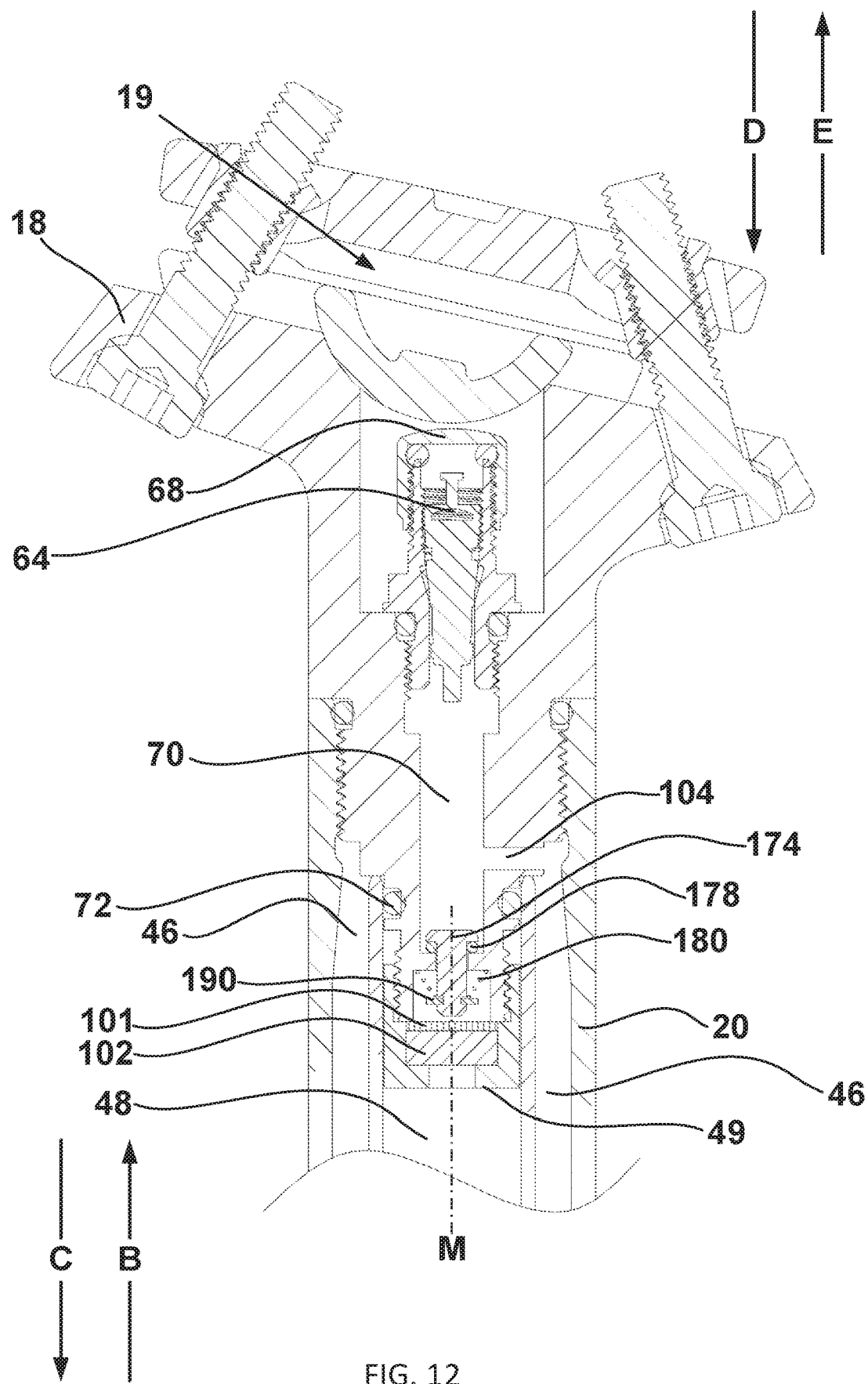
FIG. 12 illustrates an enlarged view of an alternative embodiment of the adjustable seating assembly of FIG. 2 having a fluid device.

FIG. 12 illustrates an enlarged view of an alternative embodiment of the vent device 66. The example in FIG. 12 differs from the example shown in FIG. 11 in that fluid communication past the second vent seal 178 is between the hydraulic support chamber 48, through the permeable device 102 and/or the flow device 101, and the pneumatic spring chamber 46, through the adjustment path 70 and/or a recycling path 104. In such a way gas may be vented from a hydraulic chamber, such as the hydraulic support chamber 48 or the hydraulic exchange chamber 58, while maintaining an internal pressure of the seating component 15.

Figure 13:
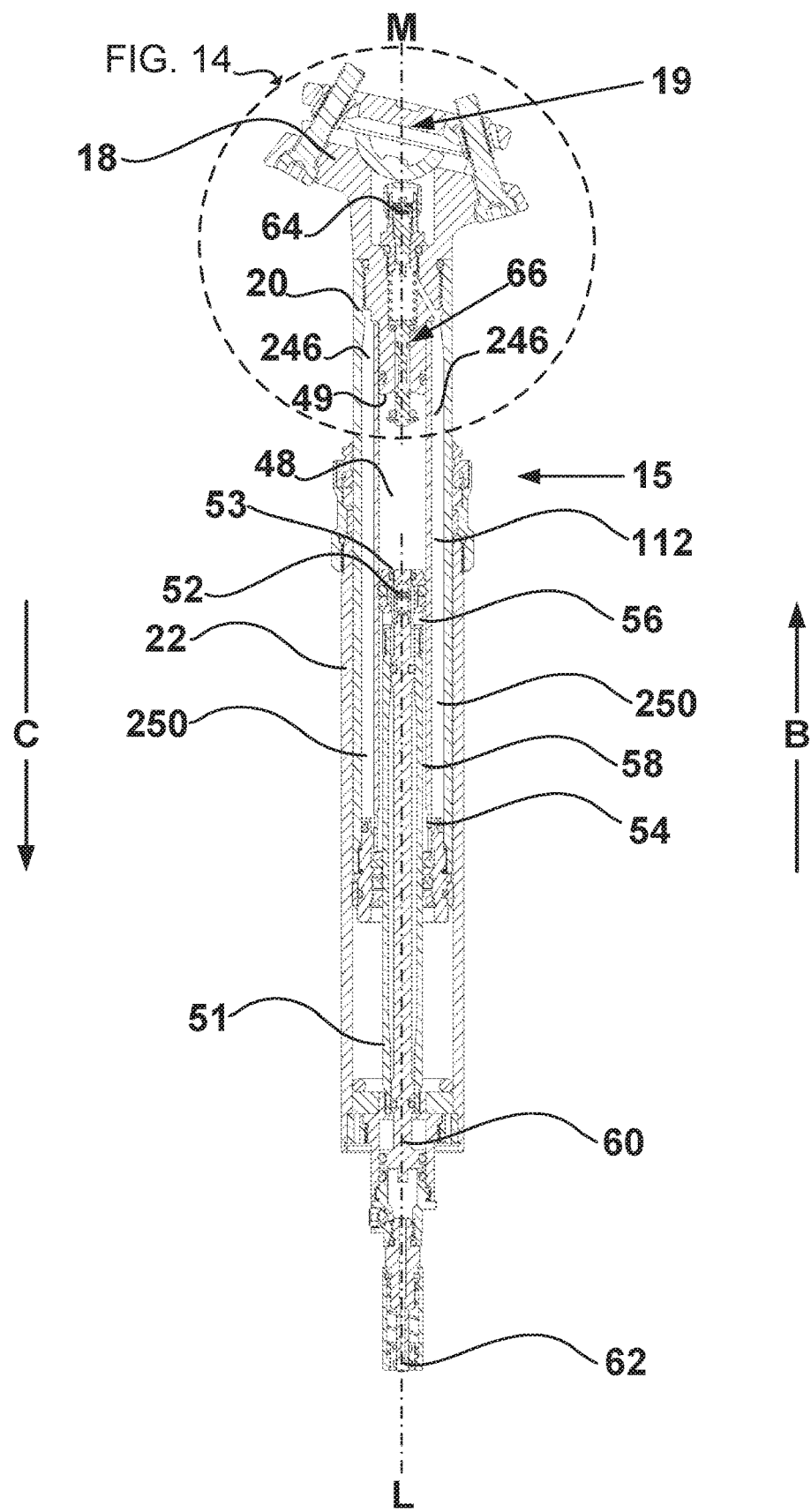
FIG. 13 is a bisected cross-sectional view of an embodiment of an adjustable seating assembly having a fluid device.
Figure 14:
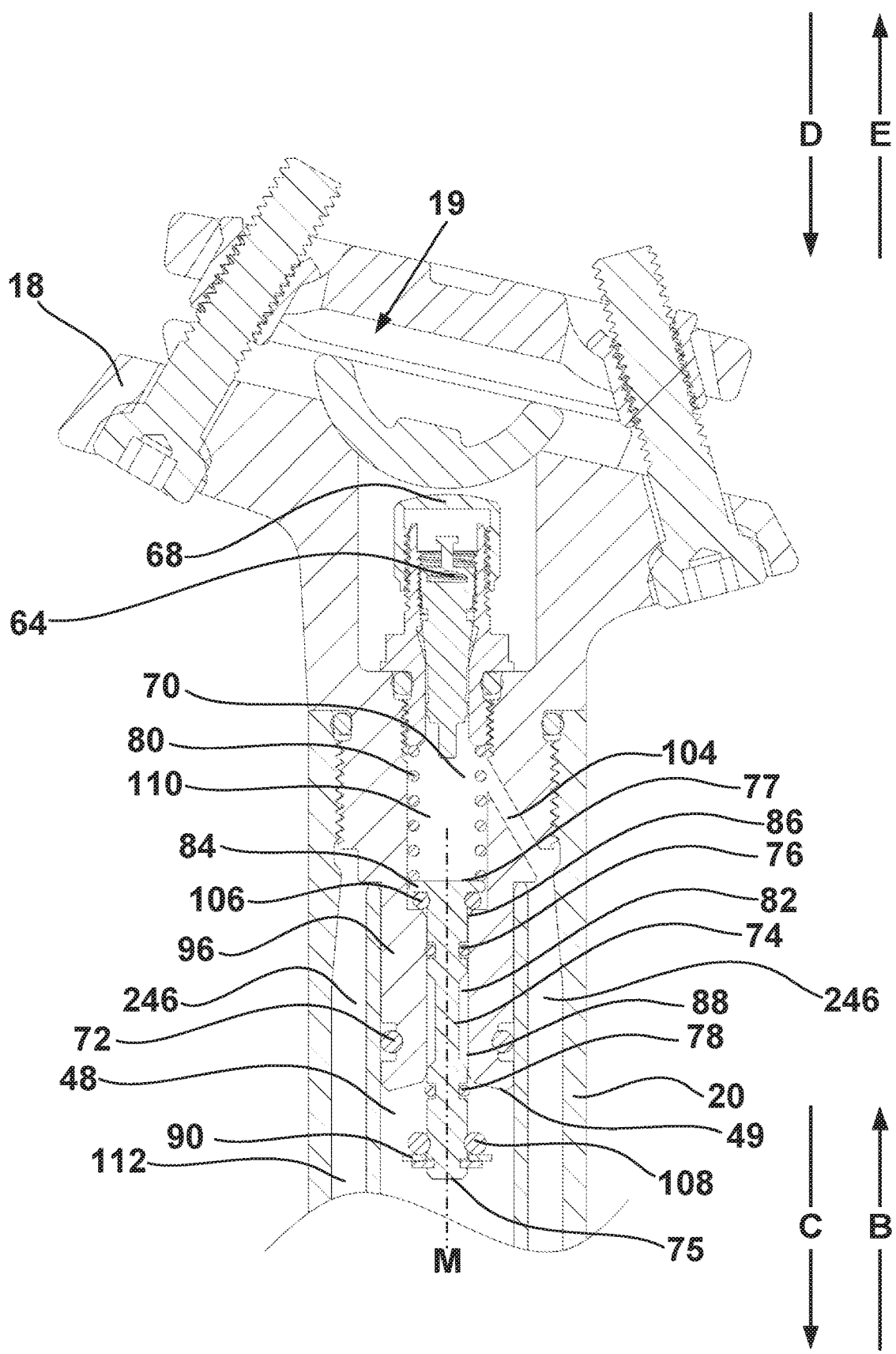
FIG. 14 illustrates an enlarged view of the adjustable seating assembly of FIG. 13 having a fluid device.

FIGS. 13 and 14 illustrate an alternative embodiment of the vent device 66. The example in FIGS. 13 and 14 differs from the examples shown in FIGS. 2-12 in that the vent member 74, having the vent proximal seal 78 and the vent distal seal 76, is configured for operation responsive to a hydraulic pressure. For example, the vent member 74 may be configured to move along the second axis M in the anti-bias direction E responsive to a hydraulic pressure in the hydraulic support chamber 48. Hydraulic pressure within the hydraulic support chamber 48 will act on all portions of the vent member 74 in communication with the hydraulic support chamber 48. The vent device 66 is configured such that a pressure increase within the hydraulic support chamber 48 will result in a net force on the vent member 74 in the anti-bias direction E. A member anti-bias surface 75 may be configured to facilitate this net force in the anti-bias direction E. The hydraulic pressure may also act on other portions of the vent member 74 to result in said net force. For example, the vent chamber 82, which may be in pressure communication with the hydraulic support chamber 48, may have one or more surfaces on which the hydraulic pressure acts.

The hydraulic pressure may result from force on the seating component 15 when the actuation valve 52 is closed. For example, the seat post upper 20 may be forced towards the seat post lower 22 in the lowering direction C as a result of a force in the lowering direction C on the saddle 16, such as from the rider. A force in the raising direction B may act on the seat post lower 22 as through the frame 12. In this example, a pressure within the hydraulic support chamber 48 resultant from such forces may act on the vent member 74 in the anti-bias direction E.

Additionally, FIG. 13 illustrates an embodiment not having the floating piston 44. Such an embodiment may retain similar characteristics, relying on gravitational separation between fluids having different densities. For instance, liquid oil of relatively high density will collect at the gravitational bottom of a given chamber when in communication with a gaseous fluid of relatively low density. As an example, in an installed state of the seating component 15, relatively high-density liquid hydraulic fluid will separate from relatively low density compressed air or nitrogen, with the hydraulic fluid separating in the lowering direction C and the compressed air or nitrogen separating in the raising direction B. In such a way, similar fluid distribution to an embodiment having the floating piston 44 may be achieved.

In such a way, this embodiment facilitates separation of dissimilar fluids within a chamber. For example, relatively high-density liquid fluid and relatively low density gaseous fluid may be added to a communication chamber 112. The communication chamber 112 may be configured such that relatively high-density fluid will separate into a hydraulic reservoir portion 250 of the communication chamber 112 and relatively low-density fluid will separate into a pneumatic spring portion 246 of the communication chamber 112. The separation between chamber portions such as the pneumatic spring portion 246 and the hydraulic reservoir portion 250 may be defined by relative fluid levels.

The vent bias device 80 may be used to provide bias force on the vent member 74 in the bias direction D. This bias force may be tunable to regulate the amount of an anti-bias force required to displace the vent member 74 in the anti-bias direction E. For example, the vent bias device 80 may be a spring tunable as to the anti-bias force, as applied to the vent member 74, required to displace the vent member 74 into the actuated state as in FIG. 8. A pressure, for instance communicated from the pneumatic spring chamber 46, may act on the vent member 74 so as to result in a net force in the bias direction D, thus contributing to the bias force. A member bias surface 77 may be included to result in such a net force, or other portions of the vent member 74 may be used. As such, the vent bias device 80 may be tuned in conjunction with the configuration of the vent member 74 to require a sufficient magnitude of the anti-bias force for displacement of the vent member 74 into the actuated state. This sufficient magnitude of force may be related to a pressure differential. For instance, a given pressure differential between the hydraulic support chamber 48 and the adjustment path 70 may be sufficient to operate the vent member 74 to transition into the actuated state. This pressure differential may then correspond to a pressure differential between the vent chamber 82 and the adjustment path 70, or another communicative path to the pneumatic spring chamber 46, in the intermediate state as in FIG. 7.

The vent member 74 may also include a bias cushion 106 and/or an anti-bias cushion 108. For instance, the member bias stop 84 and the member anti-bias stop 90 may be configured to contain the bias cushion 106 and the anti-bias cushion 108. The bias cushion 106 may be a compressible component, such as an O-ring, configured to cushion an impact upon full travel of the vent member in the bias direction D. The anti-bias cushion 108 may be a compressible component, such as an O-ring, configured to cushion an impact upon full travel of the vent member 74 in the anti-bias direction E. The bias cushion 106 and the anti-bias cushion 108 may also be configured to form sealing connections, for instance between the vent member 74 and the vent body 96. A portion of the upper support surface 49, which may be disposed on the vent body 96, may be of a beveled configuration. For example, the beveled configuration of the portion of the upper support surface 49 may facilitate fluid flow into the vent chamber 82 when the seating component 15 is in an installed state on the bicycle 10.

There may be a bias chamber 110 for communicating a force in the bias direction D on the member bias surface 77. The bias chamber 110 may be configured to be in fluid communication with the pneumatic spring chamber 46, for instance through the recycling path 104. In such a way, fluid passing from the hydraulic support chamber 48 to the bias chamber 110 through the vent chamber 82 may be recycled into communication with the pneumatic spring chamber 46. As above, the pneumatic spring chamber 46 may be in fluid communication with the hydraulic reservoir chamber 50.

The bias chamber 110 may be configured such that in an installed state the bias chamber 110 contains a captured volume of liquid fluid. For example, the bias chamber 110 may have limited fluid communication to the pneumatic spring chamber 46 through the recycling path 104. In the actuated state, for instance when fluid pressures between the vent chamber 82 and the bias chamber 110 have equalized, gravity may displace liquid fluid contained within the bias chamber 110 past the vent distal seal 76 and into the vent chamber 82. Gravity may further displace such fluid into the hydraulic support chamber 48 during the released state. Alternatively, fluid communication from the vent chamber 82 past the vent distal seal 76 may be to the external volume 100.

Figure 15:
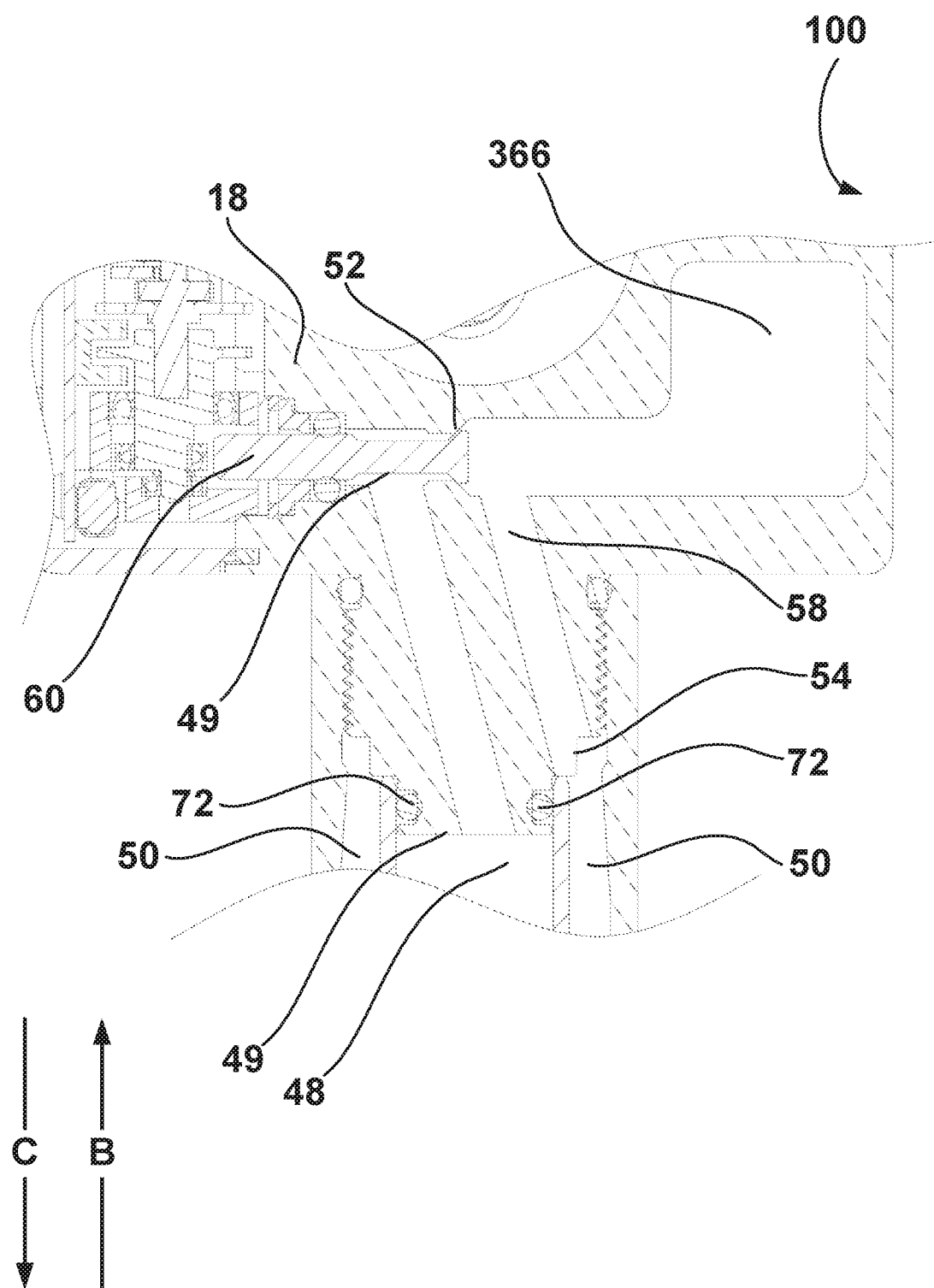
FIG. 15 illustrates an enlarged view of an alternative embodiment of an adjustable seating assembly.

FIG. 15 is an enlarged view of an alternative embodiment of the seating component 15. The example in FIG. 15 differs from the examples in FIGS. 2-14 in that the vent device 66 is not provided. Alternatively, the embodiment in FIG. 15 incorporates a collection device 366. The collection device 366 is configured to be in fluid communication with the hydraulic exchange chamber 58. The hydraulic exchange chamber 58 and the collection device 366 may be configured to facilitate separation of flow through the hydraulic exchange chamber 58. For example, a combination flow of relatively low density compressible fluid and relatively high density non-compressible fluid may enter the collection device 366 during a state of flow across the actuation valve 52.

The collection device 366 may be tuned to facilitate separation in various ways. For instance, the collection device may have sufficient volume to reduce a flow rate and facilitate separation between fluids of different densities. Separation may result from gravity separation, and relatively low density compressible fluids may enter the collection device 366. The collection device 366 may also be configured to maintain separation based on relative density. For example, flow through the collection device 366 may be limited such that a separated component of relatively low density compressible fluid does not enter a combination flow of mixed fluid density out of the collection device 366. In an alternative embodiment, fluid may be vented from the collection device 366, for instance with a vent device 66.

Figure 16:
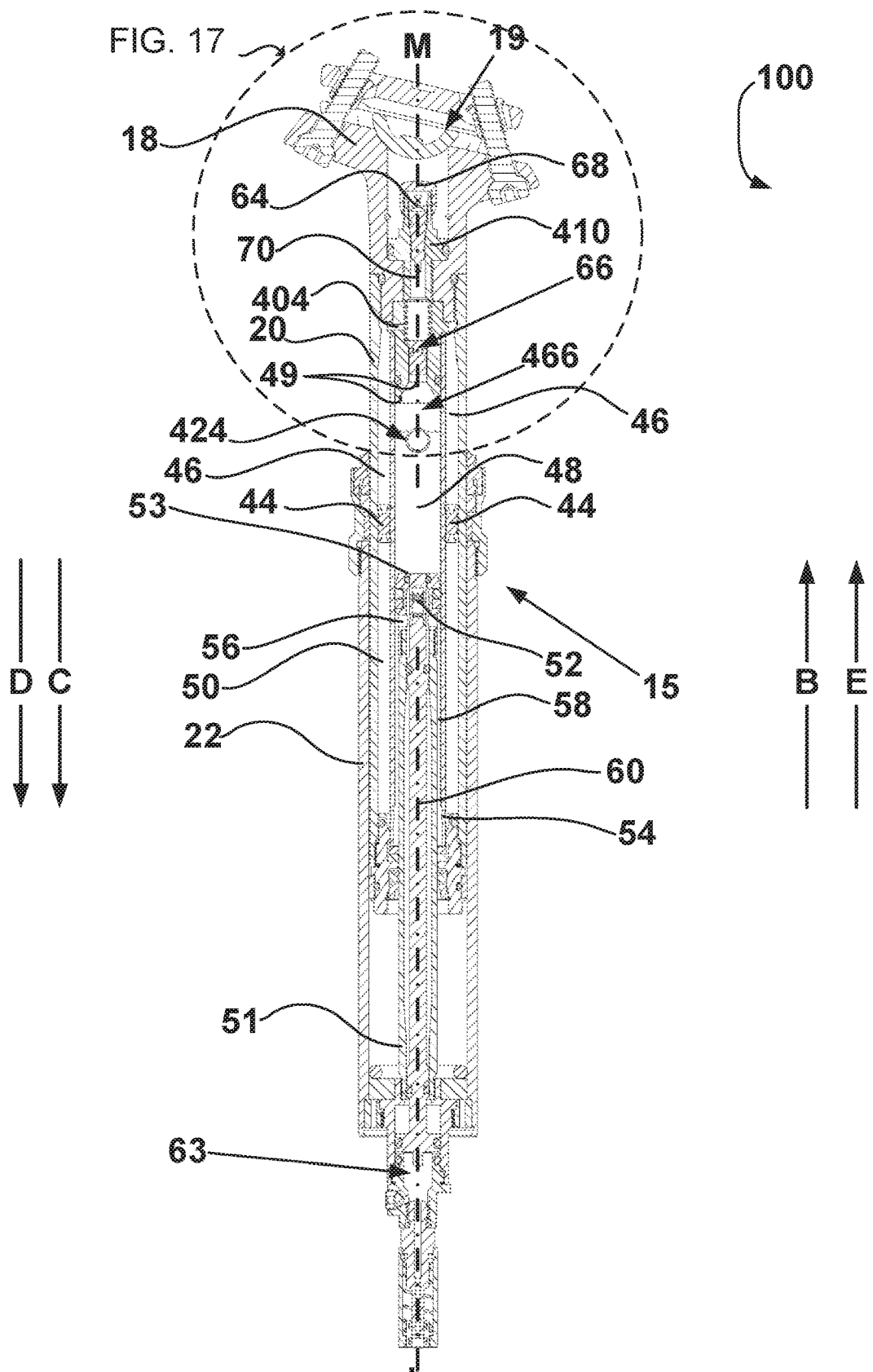
FIG. 16 is a bisected cross-sectional view of an embodiment of an adjustable seating assembly having a fluid device.

FIG. 16 is a bisected cross-sectional view of an embodiment of the seating component 15 having the vent device 66. The seating component 15 further includes a seal device 466. An actuation chamber 62 may be provided to facilitate movement of an actuation member 60 responsive to hydraulic pressure. For instance, the actuation member 60 may operate the actuation valve 52 from its sealing state to its unsealed state responsive to an increase in fluid pressure within the actuation chamber 62. A remote device 61 may be provided to facilitate changes in pressure within the actuation chamber 62.

The actuation chamber 62 and the actuation member 60 may be parts of an actuation device 63. The actuation device 63 may alternatively include other actuation configurations, such as an electromechanical motor, a cable actuation device, or other actuation facility. The actuation member 60 may be selectively operable to allow fluid communication, for instance of compressible fluids, past the actuation valve 52 into the hydraulic exchange chamber 58.

Figure 17:
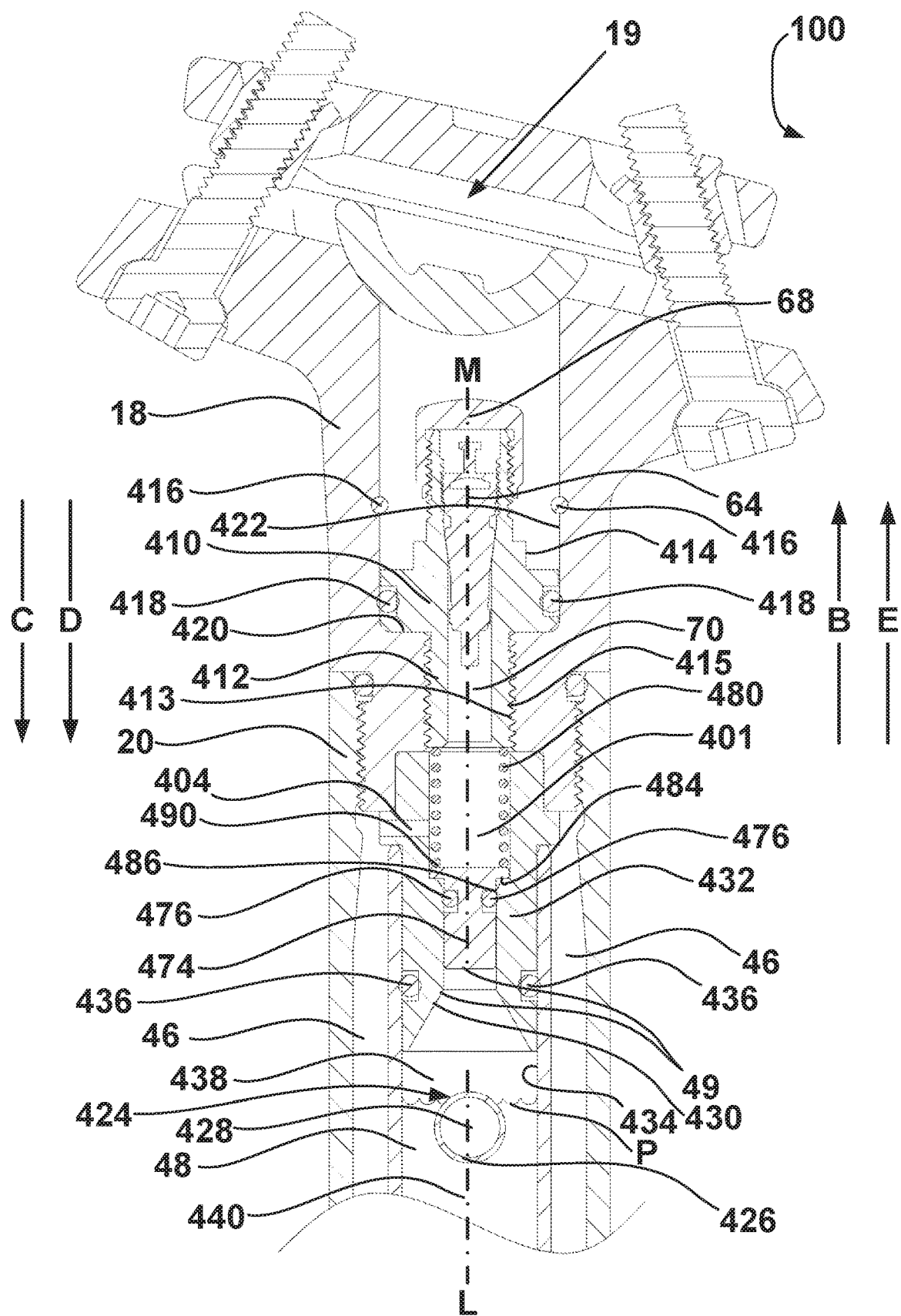
FIG. 17 illustrates an enlarged view of the fluid device of FIG. 16.

FIG. 17 illustrates an enlarged view of the seal device 466 of FIG. 16. The pneumatic spring adjustment valve 64 is shown having an adjustment valve cover 68. With the adjustment valve cover 68 removed, the pneumatic spring adjustment valve 64 may be operable to selectively facilitate fluid communication with an external component such as an air pump (not shown). Fluid communication through the pneumatic spring adjustment valve 64 may further extend through an adjustment path 70 into the pneumatic spring chamber 46. A portion of the hydraulic support chamber 48 is shown to be sealed at least in part by a support chamber upper seal 72. At least a portion of the vent device 66 is shown to be in fluid communication with the hydraulic support chamber 48.

A vent member 474 may travel along a second axis M and be biased in a bias direction D by a vent bias device 480. The second axis M may be coaxial with, orthogonal to, or in some other relation with the first axis L. As such, the bias direction D may be the same as the raising direction B or may be another direction as shown in other embodiments. The vent bias device 480 may be a spring, such as a coil spring, or may be a configuration facilitating a working pressure on a surface of the vent member 474. The vent member 474 may have a first end and a second end. These first and second ends of the vent member 474 and components associated with those ends may be referred to as distal or proximal relative to an internal hydraulic component of the seating component 15, for example the hydraulic exchange chamber 58 of FIG. 19 or the hydraulic support chamber 48 of FIG. 16.

The vent member 474 may have a first stop and a second stop. For example, the vent member 474 may have a member bias stop 484 at the proximal end of the vent member 474 to restrict movement in the bias direction D and a member anti-bias stop 490 at the distal end of the vent member 474 to restrict movement in an anti-bias direction E. The member bias stop 484 and/or the vent member 474 may be configured to facilitate flow in the absence of a sealing connection.

The vent member 474 seals the hydraulic support chamber 48 from communication with the pneumatic spring chamber 46 through the interaction of a vent seal 476 with a vent seal surface 486 when in the released state. In this embodiment, the vent seal 476 is fixed in the vent member 474 such that operation of the vent member 474 in the anti-bias direction E displaces the vent seal 476 in the anti-bias direction E along the second axis M. The vent seal surface 486 may be of various beveled configurations so as to limit wear on the vent seal 476 during transitions between sealing and non-sealing states.

If pressure in the hydraulic support chamber 48 sufficiently exceeds pressure in the pneumatic spring chamber 46, for instance to overcome force of the vent bias device 480, then the vent member 474 will move in the anti-bias direction E. Such movement of the vent member 474 will displace the vent seal 476 out of sealing interaction with the vent seal surface 486 and thus permit fluid communication between the hydraulic support chamber 48 and the pneumatic spring chamber 46. The member anti-bias stop 490 may be provided to inhibit movement of the vent member 474 in the anti-bias direction E. In an embodiment, the member anti-bias stop 490 inhibits movement in part due to binding of a coil spring configuration of the vent bias device 480. In this example, the member bias stop 484 limits the operational travel of the vent member 474 in the bias direction D and the member anti-bias stop 490 limits the operational travel of the vent member 474 in the anti-bias direction E.

The vent bias device 480 may be used to provide bias force on the vent member 474 in the bias direction D. This bias force may be tunable to regulate the amount of an anti-bias force required to displace the vent member 474 in the anti-bias direction E. For example, the vent bias device 480 may be a spring tunable as to the anti-bias force, as applied to the vent member 474, required to displace the vent member 474 into the actuated state as in FIG. 25. A pressure, for instance communicated from the pneumatic spring chamber 46, may act on the vent member 474 so as to result in a net force in the bias direction D, thus contributing to the bias force. A member bias surface 477 may be included to result in such a net force, or other portions of the vent member 474 may be used.

The vent bias device 480 may be tuned in conjunction with the configuration of the vent member 474 to require a sufficient magnitude of the anti-bias force for displacement of the vent member 474 into the actuated state. This sufficient magnitude of force may be related to a pressure differential. For instance, a given pressure differential between the hydraulic support chamber 48 and the pneumatic spring chamber 46 may be sufficient to operate the vent member 474 to transition into the actuated state. This pressure differential may then correspond to a pressure differential between the hydraulic support chamber 48 and a bias chamber 401, or another communicative path to the pneumatic spring chamber 46. The vent bias device 480 may be further tuned to overcome frictional forces, for instance friction between the vent seal 476 and the vent seal surface 486.

The bias chamber 401 may function to communicate a force in the bias direction D on the member bias surface 477. The bias chamber 401 may be configured to be in fluid communication with the pneumatic spring chamber 46, for instance through a recycling path 404. In such a way, fluid passing from the hydraulic support chamber 48 to the bias chamber 401 may be recycled into communication with the pneumatic spring chamber 46. As above, the pneumatic spring chamber 46 may be in fluid communication with the hydraulic reservoir chamber 50.

The bias chamber 401 may be configured such that in an installed state the bias chamber 401 contains a captured volume of liquid fluid. For example, the bias chamber 401 may have limited fluid communication to the pneumatic spring chamber 46 through the recycling path 404. In the actuated state, and when fluid pressures between hydraulic support chamber 48 and the bias chamber 401 have equalized, gravity may displace liquid fluid contained within the bias chamber 401 past the vent seal 476 and into the hydraulic support chamber 48. Alternatively, fluid communication from the hydraulic support chamber 48 past the vent seal 476 may be to the external environment 100.

The vent bias device 480 may be adjustable. For example, there may be a bias adjustment member 410. The bias adjustment member 410 is configured to adjust force applied to the vent member 474 by the vent bias device 480. The bias adjustment member 410 may be integral to the vent bias device 480, such as with adjustable pneumatic spring or captured coil spring configurations of the vent bias device 480. Alternatively, the bias adjustment member 410 may be a discrete component from the vent bias device 480.

As shown in FIG. 17, the bias adjustment member 410 may have a movable bias adjuster 412. The movable bias adjuster 412 is movable to adjust force applied to the vent member 474 by the vent bias device 480 in the bias direction D. For instance, the movable bias adjuster 412 may be movable in the bias direction D to increase force applied to the vent bias device 480 in the bias direction D and may also be movable in the anti-bias direction E to decrease force applied to the vent bias device 480 in the bias direction D. In one exemplary embodiment, the movable bias adjuster 412 may facilitate compression and extension of a coil spring configuration of the vent bias device 480 independent of movement of the vent member 474.

The movable bias adjuster 412 may threadably engage with another component of the seating component 15 to facilitate movement. For instance, the movable bias adjuster 412 may have a threaded adjuster portion 415 configured to engage with a threaded head portion 413 of the seat post head 18. The thread pitches of the threaded adjuster portion 415 and the threaded head portion may be configured to inhibit relative movement therebetween due to force in the anti-bias direction E from the vent bias device 480. The vent bias device 480 may be adjustable with an adjustment interface 414. The adjustment interface 414 may be a tool interface, such as with a hex nut, or may be a manual interface, such as with knurling.

An adjustment anti-bias stop 416 and/or an adjustment bias stop 420 may be provided to limit movement of the movable bias adjuster 412. The adjustment anti-bias stop 416 may be provided to limit movement in the anti-bias direction E and the adjustment bias stop 420 may be provided to limit movement in the bias direction D. The adjustment stops 416, 420 may be formed from any suitably rigid material or combination of materials. For example, the adjustment stops 416, 420 may be made from one or more of aluminum, steel, nylon, and vinyl. The adjustment stops 416, 420 may be integrally formed with the seat post head 18 or another component of the seating component 15. In one exemplary embodiment, the adjustment bias stop 420 is a lower surface of the seat post head 18 and the adjustment anti-bias stop 416 is a locking device located in a recess of the seat post head 18. For instance, the adjustment anti-bias stop 416 may be a lock ring or circlip located by a groove in the seat post head 18.

The bias adjustment member 410 may also function to seal the seating component 15. For instance, the movable bias adjuster 412 may have an adjustment seal 418 configured to seal against an adjustment seal surface 422. The adjustment seal 418 may be an elastomeric seal such as an O-ring. The bias adjustment member 410 may be shaped and sized to constrain the adjustment seal 418 in order to maintain a sealing interaction between the adjustment seal 418, the adjustment seal surface 422, and the movable bias adjuster 412.

A range of adjustment may be defined based on possible positions of the bias adjustment member 410 between the adjustment stops 416, 420. The range of adjustment may correspond to a range of forces imparted to the vent member 474 by the vent bias device 480. For example, force applied by the vent bias device 480 to the vent member 474 may be at a minimum at the end of the range of adjustment corresponding to the adjustment anti-bias stop 416. This minimum force could be a relatively low force or zero force. Alternatively, when the bias adjustment member 410 is stopped against the adjustment anti-bias stop 416 the vent bias device 480 or another component may impart a force in the anti-bias direction E upon the vent member 474.

In such a way, the vent member 474 may be more easily transitioned into its open state when the movable bias adjuster 412 is adjusted more closely to the adjustment anti-bias stop 416. Thus, the movable bias adjuster 412 may be employed to allow the user to purposefully change between states of relative ease of venting. For instance, the movable bias adjuster 412 may have positions in the range of adjustment corresponding to rider weight, terrain, and/or riding style. The movable bias adjuster 412 may also include a position in the range of adjustment that prevents movement of, or locks out the vent member 474.

It may be useful to prevent actuation of the vent member 474 in certain circumstances. Actuation of the vent member 474 may cause loss of fluid from the hydraulic support chamber 48 and thus undesirable relative movement between the seat post upper 20 and the seat post lower 22. The movable bias adjuster 412 may, as above, be configured to inhibit operation of the vent member 474 in at least one position in its range of adjustment. Thus, the movable bias adjuster 412 may also have locked and unlocked positions.

The pneumatic spring adjustment valve 64 may also be integrated with or mounted to the bias adjustment member 410. For instance, the pneumatic spring adjustment valve 64 may be of a Schrader configuration and integrated with the bias adjustment member 410. The bias adjustment member 410 may also be configured to accept installation of the adjustment valve cover 68, for instance through a threaded attachment interface.

A volume of pressurized fluid may be released from the hydraulic support chamber 48 past the vent seal 476. Such an arrangement may be configured such that release occurs at a location where separation between a combination flow of compressible and non-compressible fluids occurs. For example, in a configuration of the seating component 15 in which relatively less dense compressible fluids may mix with relatively more dense non-compressible fluids, release may be selectively permitted from an elevated location at which the relatively less dense compressible fluids collect, such as adjacent to the upper support surface 49. The seating component 15 may be configured to create such a location for efficient collection of relatively less dense fluids or separation of components of combination flow of different fluid densities. In an alternative embodiment, the vent seal 476 and the vent seal surface 486 may be configured to be in sealing contact in the released state.

Fluids released past the vent seal 476 may enter the pneumatic spring chamber 46 from the bias chamber 401 through the recycling path 404. In other embodiments, fluids released past the vent seal 476 may enter a communication chamber 112 from the bias chamber 401 through the recycling path 404. The seal device 466 may be provided to regulate flow across the vent seal 476.

The seal device 466 may be provided to selectively inhibit flow of relatively high-density fluids. The seal device 466 may include a seal unit 424. The seal unit 424 may be configured to have a relatively intermediate density as compared to the relatively low-density fluids and the relatively high-density fluids. Thus, the seal unit 424 may have negative buoyancy in relatively low-density fluids but positive buoyancy in relatively high-density fluids. For example, the seal unit 424 may be tuned to sink in air and float in hydraulic fluid. The density of the seal unit 424 may be a tunable feature, for instance to account for different fluid densities.

The seal unit 424 may be a solid component or may be of a hollow configuration. For example, the seal unit 424 may be a solid component made of material of a relatively intermediate density or a hollow component having a seal body 426 made of a material of a relatively high density. A hollow configuration of the seal body 426 encloses a body interior 428. The body interior 428 may be a relatively low-density fluid contained within the seal body 426.

The seal device 466 may include one or more surfaces disposed within the hydraulic support chamber 48. For example, at least a portion of the upper support surface 49 may be a part of the seal device 466. The seal body 426 may be configured to sealingly interact with the upper support surface 49. A portion of the upper support surface 49 or another surface of the interior of the hydraulic support chamber 48 may form a body interaction surface 430 configured to sealingly interact with the seal body 426. The body interaction surface 430 may be configured to guide the seal unit 424 into a sealing state. For example, the body interaction surface 430 may be frustoconical in configuration so that a spherical configuration of the seal unit 424 is guided to a sealing position as the seal unit 424 moves in the raising direction B.

The seal body 426 may be configured to sealingly interact with the body interaction surface 430. For example, the seal body 426 may sealingly interact with the body interaction surface 430 when the seal unit 424 moves in the raising direction B relative to the hydraulic support chamber 48. The seal unit 424 may move in the raising direction B as a result of the composition of fluids within the hydraulic support chamber 48 and the buoyancy of the seal unit 424.

Positive buoyancy of the seal unit 424 in relation to relatively high-density fluids that fill or substantially fill the hydraulic support chamber 48 may cause the seal body 426 to sealingly interact with the body interaction surface 430. A threshold percentage of fill of relatively high-density fluids may determine when the seal body 426 forms a sealing interaction with the body interaction surface 430. At least one of the seal body 426 and the body interaction surface may deform to form a sealing interaction. The seal body 426 may also have a smooth surface finish operable to seal with a smooth surface finish of the body interaction surface 430. Corresponding smooth surface finishes of the seal body 426 and the body interaction surface 430 may form a metal to metal seal. Thin coatings of hydraulic fluid may microscopically interact in such a metal to metal seal to aid sealing. In an embodiment, when the seal unit 424 is at a limit of its movement within the hydraulic support chamber 48 in the raising direction B, fluid communication from the hydraulic support chamber 48 through the bias chamber 401 to the recycling path 404 is inhibited.

Negative buoyancy of the seal unit 424 in relation to relatively low-density fluids within the hydraulic support chamber 48 may cause the seal body 426 to not sealingly interact with the body interaction surface 430. For example, air or gas within the hydraulic support chamber 48 may displace the seal unit 424 in the lowering direction C relative to the hydraulic support chamber 48. In such a way, the seal unit 424 may selectively seal the hydraulic support chamber 48 when there is little or no relatively low density, compressible fluid in the hydraulic support chamber 48.

Figure 31:
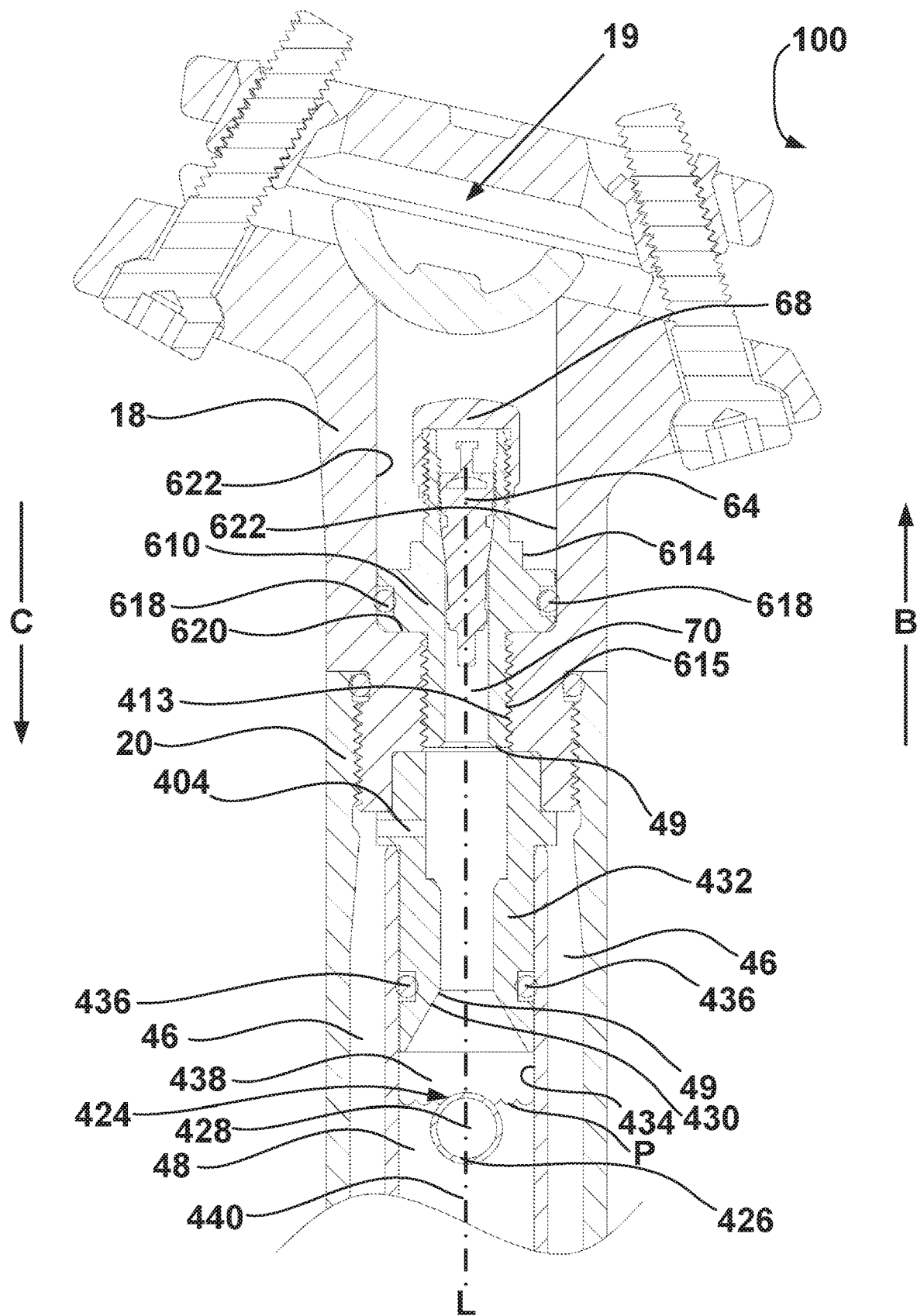
FIG. 31 is a bisected cross-sectional view of an embodiment of an adjustable seating assembly having a fluid device.

The seal unit 424 may be provided in addition to or instead of the vent device 66. For example, the vent device 66 in FIG. 16 may be omitted and the flow from the hydraulic support chamber 48 through the bias chamber 401 to the recycling path 404 may be regulated by the seal device 466 as shown in FIG. 31. Adjustment of the vent device 66 as described above may be used to regulate function of the seal device 466. For example, the position corresponding to the adjustment bias stop 420 may lock out the vent member 474 from moving out of sealing contact with the vent seal surface 486. In this embodiment, the lack of fluid communication across the vent seal 476 would inhibit function of the seal device 466. The position corresponding to the adjustment anti-bias stop 416 may facilitate relatively easy or else uninhibited operation of the vent member 474, likewise facilitating operation of the seal device 466 as fluid communicates across the vent seal 476.

The body interaction surface 430 of the seal device 466 may be located on a separate component from other components that make up the hydraulic support chamber 48. For example, the body interaction surface 430 may be a portion of a housing member 432. The housing member 432 may form a seal with an interior surface 434 of the hydraulic support chamber 48. For example, a housing seal 436 may be provided to sealingly interact with the housing member 432 and the interior surface 434. The housing seal 436 may be an elastomeric seal such as an O-ring.

The hydraulic support chamber 48 may be characterized as having a venting portion 438 and a sealing portion 440. The venting portion 438 represents a portion above a high-density fluid level P in the raising direction B and the sealing portion 440 is the portion below the high-density fluid level P in the lowering direction C. The high-density fluid level P is the boundary between relatively high density non-compressible fluid and relatively low density non-compressible fluid in the hydraulic support chamber 48. The high-density fluid level P may not be present in the hydraulic support chamber 48, for instance if there is no relatively low-density fluid in the hydraulic support chamber 48.

The relatively density of the seal unit 424 may be tunable. For example, the seal unit 424 may be tuned to have a density slightly less than that of the relatively high-density fluid in the hydraulic support chamber 48. The density of the seal unit 424 may be tuned such that the seal body 426 does not enter into sealing contact with the body interaction surface 430 until the high-density fluid level P is sufficiently high in the raising direction B such that minimal relatively low-density fluid is sealed in the hydraulic support chamber. The seal unit 424 may be configured such that no sealing interaction occurs between the seal body 426 and the body interaction surface 430 until no relatively low-density fluid remains in the hydraulic support chamber 48 and thus the high-density fluid level P is non-existent.

Figure 18:
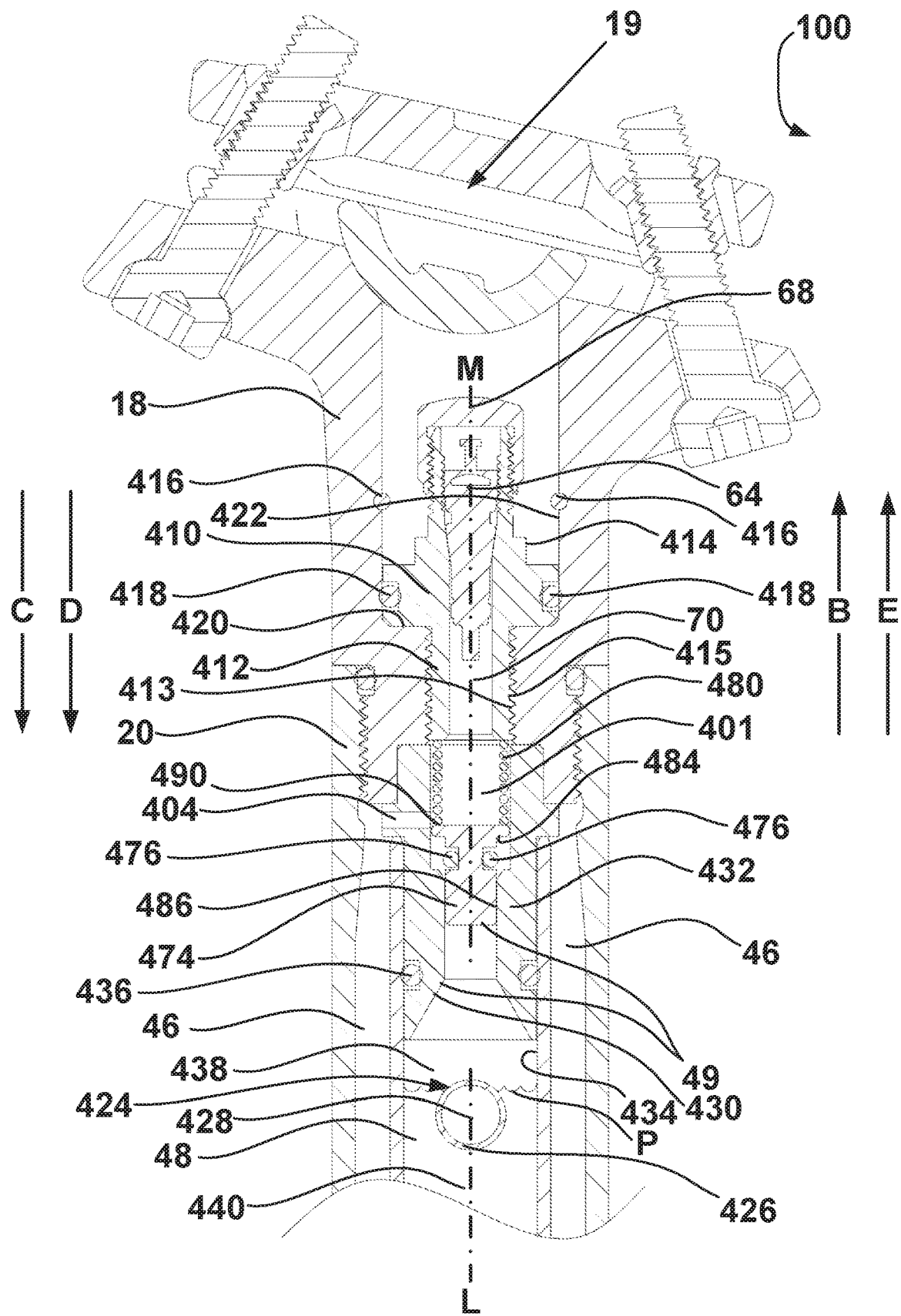
FIG. 18 illustrates an enlarged view of the fluid device of FIG. 16.

FIG. 18 illustrates an enlarged view of the seal device 466 of FIG. 16. The illustration in FIG. 18 shows the vent member 474 in its unsealed state. When the actuation valve 52 is in its closed state, as force in the lowering direction C is applied to the seat post upper 20 through the saddle 16, fluid pressure on the upper support surface 49 increases. When the force in the anti-bias direction E on the vent member 474, having at least a portion of the upper support surface 49, exceeds the force applied in the bias direction D by the vent bias device 480 and the force of pressure within the bias chamber 401, the vent member 474 will move in the anti-bias direction E. If the force in the anti-bias direction E continues to be greater than the force in the bias direction D, then the vent member 474 will enter its unsealed state.

Fluid will flow from the hydraulic support chamber 48 to the bias chamber 401 as the force of pressure within the hydraulic support chamber 48 continues to exceed the sum of the force of pressure within the bias chamber 401 and the force applied by the vent bias device 480. Compressible fluid of relatively low density will preferentially flow into the bias chamber 401 due to gravity separation. In the present embodiment of the vent device 66, compressible fluid of relatively high density may continue to flow out of the hydraulic support chamber 48 in this condition of forces on the vent member 474 in the anti-bias direction E exceeding forces on the vent member 474 in the bias direction D.

Figure 19:
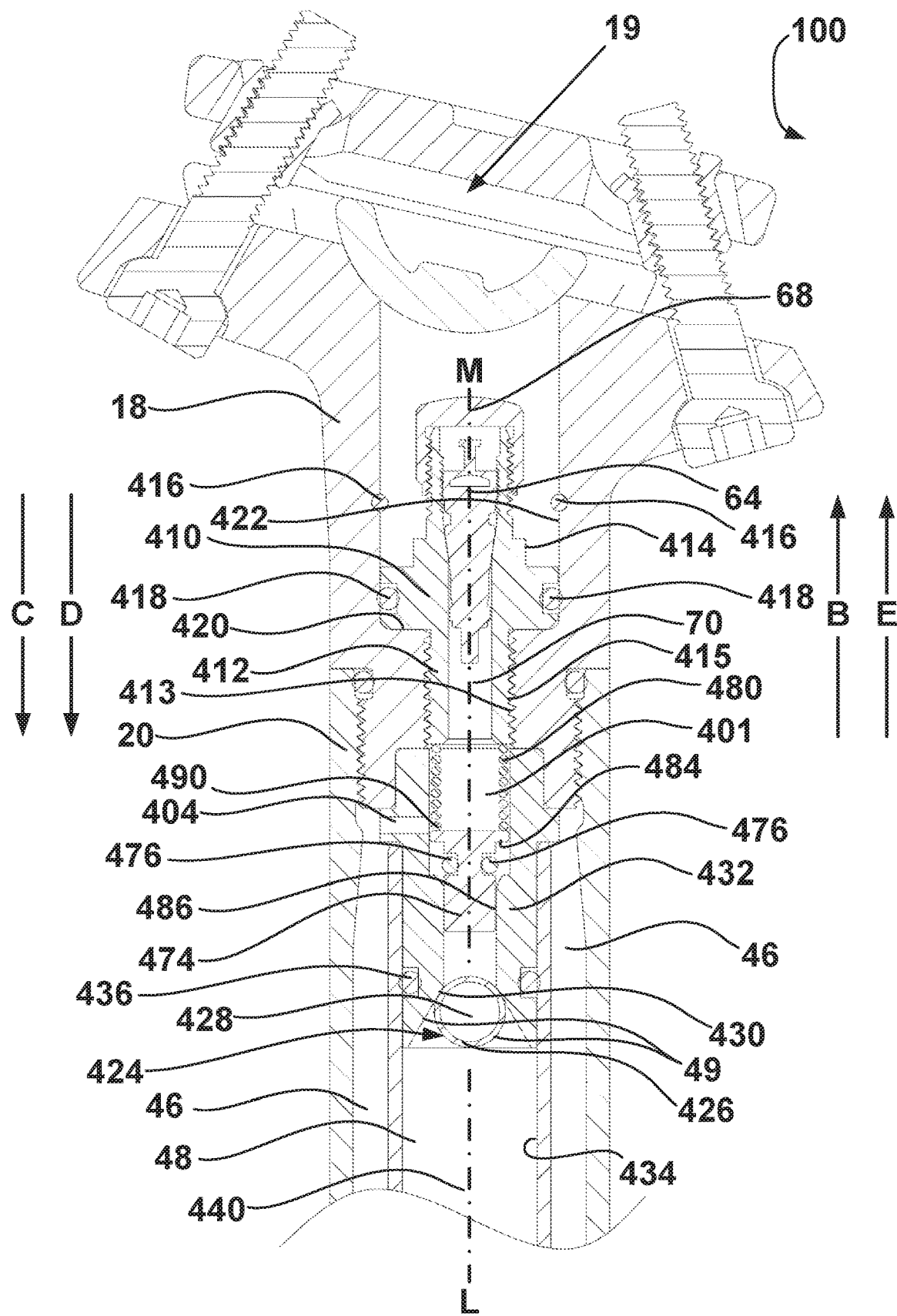
FIG. 19 illustrates an enlarged view of the fluid device of FIG. 16.

FIG. 19 is a bisected cross-sectional view of an embodiment of the seating component 15 of FIG. 16 with the seal device 466 in its sealed state. The seal device 466 is shown in its sealed state to inhibit flow of non-compressible relatively high-density fluids from the hydraulic support chamber 48 into the bias chamber 401. The seal device 466 enters its sealed state as the fluid volume within the hydraulic support chamber 48 decreases. For example, when the actuation valve 52 is in its sealed state and when fluid flows from the hydraulic support chamber 48 to the bias chamber 401, the fluid volume within the hydraulic support chamber 48 will decrease.

When the seal unit 424 is in its sealed state, a portion of seal body 426 may form a portion of the upper support surface 49. Pressure within the hydraulic support chamber 48 may act on the seal body 426 to apply a sealing force on the seal unit 424 in the raising direction B. Thus, pressure may force the seal body 426 into sealing contact with the body interaction surface 430. Increased pressure in the hydraulic support chamber 48 in this state may act to increase a surface area of the sealing interaction between the seal body 426 and the body interaction surface 430, for instance through forcing elastic deformation of at least one of the seal body 426 and the body interaction surface 430.

The vent bias device 480 may be omitted in an embodiment and a pressure acting on at least a portion of the vent member 474 may bias the vent member 474 in the bias direction D. For example, a pressure within the bias chamber 401 may exert a force on the vent member 474 in the bias direction D. This force, in the absence any operative force in the anti-bias direction E, may move the vent member 474 into a released state where the member bias stop 484 inhibits further movement in the bias direction D through contact with the housing member 432. The housing member 432 may be a separate component or may be a portion of another component. For example, the housing member 432 may be a portion of the seat post head 18 or the seat post upper 20. Alternatively, the housing member 432 may be a removable component and may be sealed with the housing seal 436.

Compressible fluids contained within the hydraulic support chamber 48 may be released into the bias chamber 401 during the released state through relative positioning of the bias chamber 401 above the hydraulic support chamber 48. In an exemplary embodiment, said relative positioning is achieved through installation of the seating component 15 on the bicycle 10 while the bicycle is upright and positioned on the external surface 42, where the external surface 42 is level ground as in FIG. 1.

Figure 20:
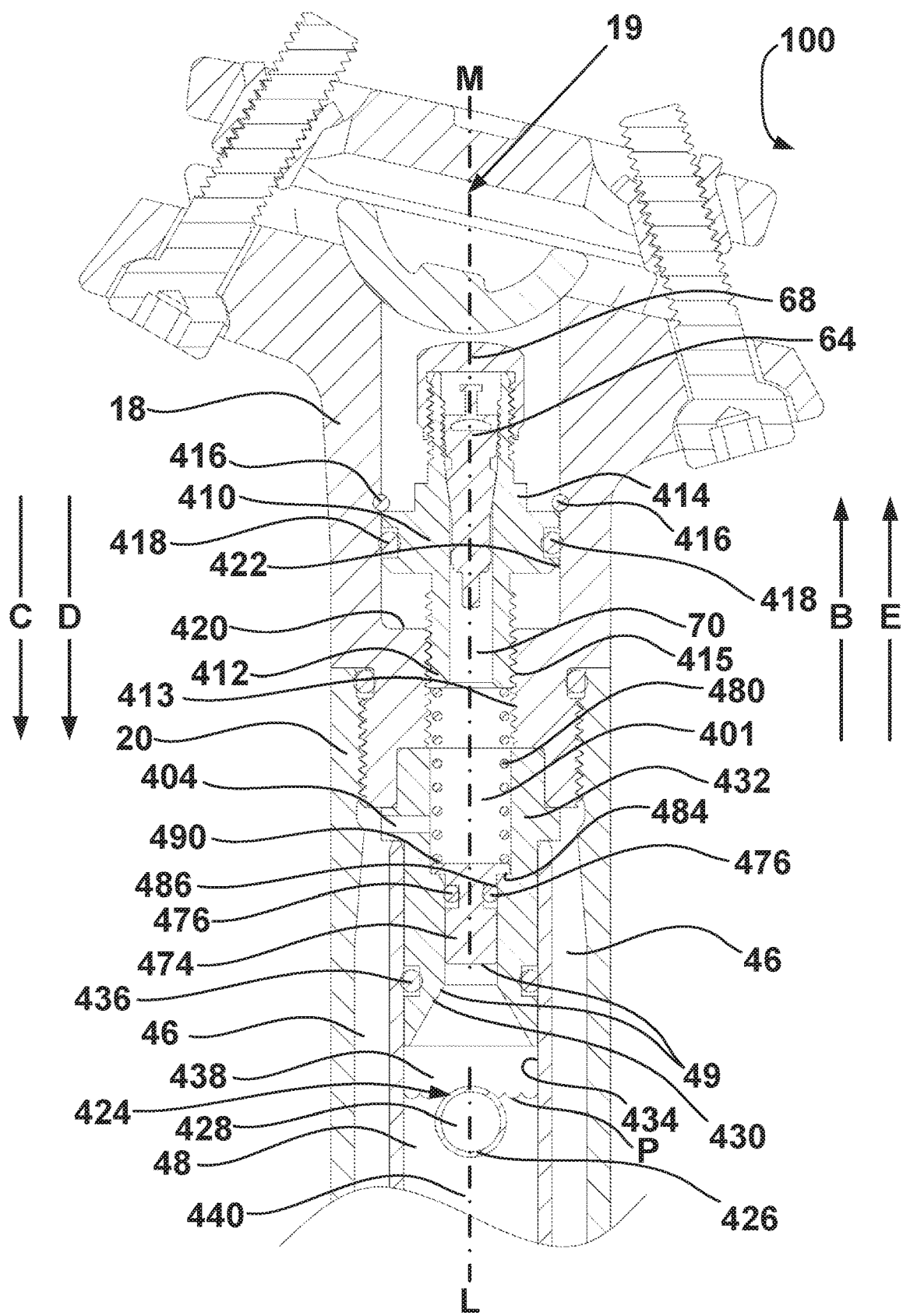
FIG. 20 illustrates an enlarged view of the fluid device of FIG. 16.

FIG. 20 illustrates an enlarged view of the seal device 466 of FIG. 16 with the bias adjustment member 410 in a minimum state corresponding to the adjustment anti-bias stop 416. In this minimum state of the bias adjustment member 410, the vent bias device 480 is in a minimum force state where the magnitude of force applied by the vent bias device 480 to the vent member 474 is smaller than at any other position of the bias adjustment member 410. In this minimum state of the bias adjustment member 410, actuation of the vent member 474 requires less force differential between the hydraulic support chamber 48 and the bias chamber 401 than at any other position of the bias adjustment member 410.

The above state of flow may also be described as a function of hydraulic pressure. The hydraulic pressure may result from force on the seating component 15 when the actuation valve 52 is closed. For example, the seat post upper 20 may be forced towards the seat post lower 22 in the lowering direction C as a result of a force in the lowering direction C on the saddle 16, such as from the rider. A force in the raising direction B may act on the seat post lower 22 as through the frame 12. In this example, a pressure within the hydraulic support chamber 48 resultant from such forces may act on the vent member 474 in the anti-bias direction E.

Figure 21:
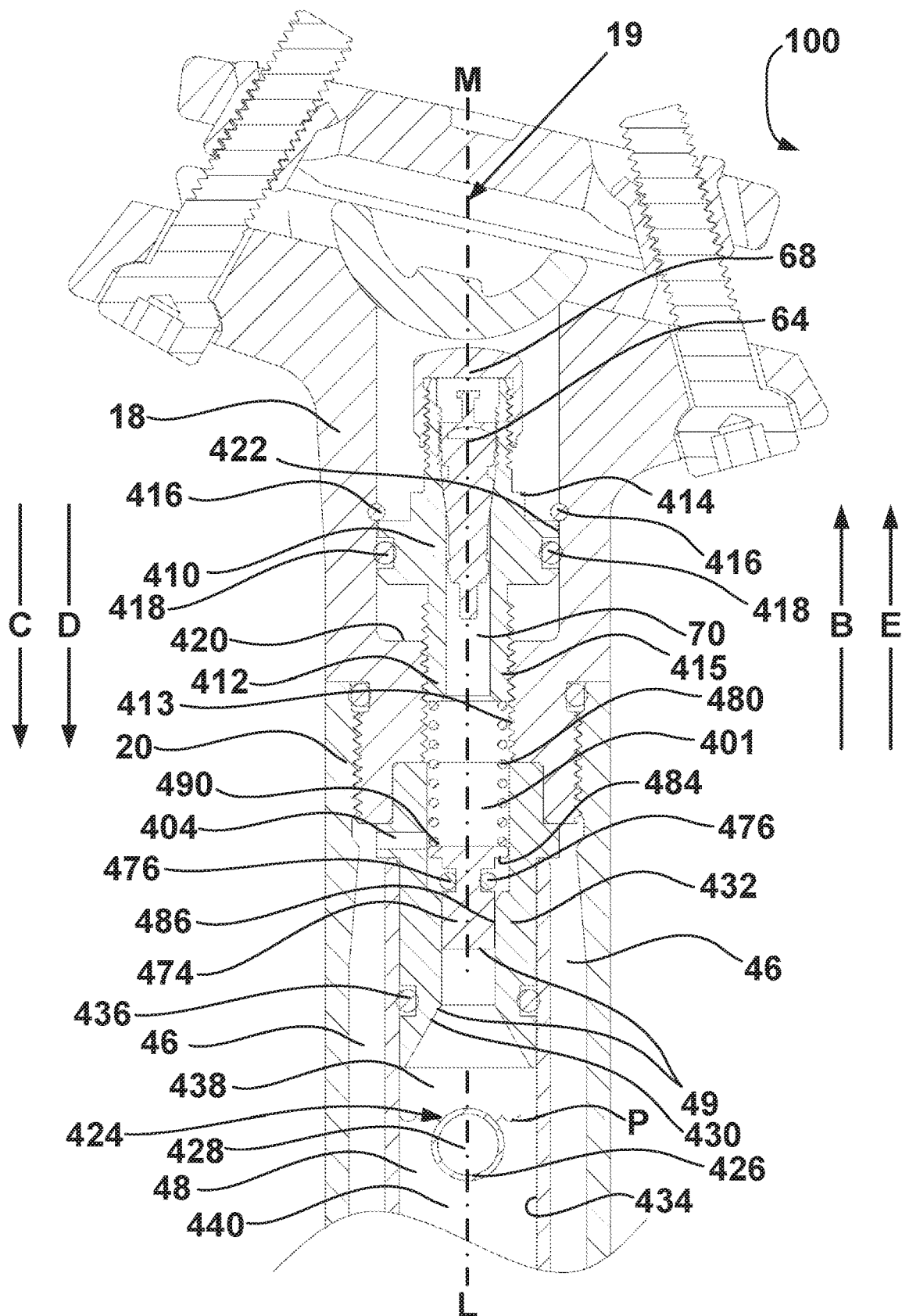
FIG. 21 illustrates an enlarged view of the fluid device of FIG. 16.

FIG. 21 illustrates an enlarged view of the seal device 466 of FIG. 16. As compared with FIG. 20, the illustration of FIG. 21 shows the vent member 474 in its actuated state. This actuated state is relatively easily achieved with the bias adjustment member 410 in its minimum state as force on the seat post upper 20 in the lowering direction C exceeds force on the vent member 474 in the bias direction D. Fluid communication is facilitated between the hydraulic support chamber 48 and the bias chamber 401 as the seal device 466 is in its unsealed state. The seating component 15 may be configured such that relatively low-density fluid from the venting portion 438 preferentially flows from the hydraulic support chamber 48 to the bias chamber 401 due to gravity separation. As fluid flows in this manner across the vent seal 476, the venting portion 438 will decrease in volume and the seal unit 424 will move closer to the body interaction surface 430.

Figure 22:
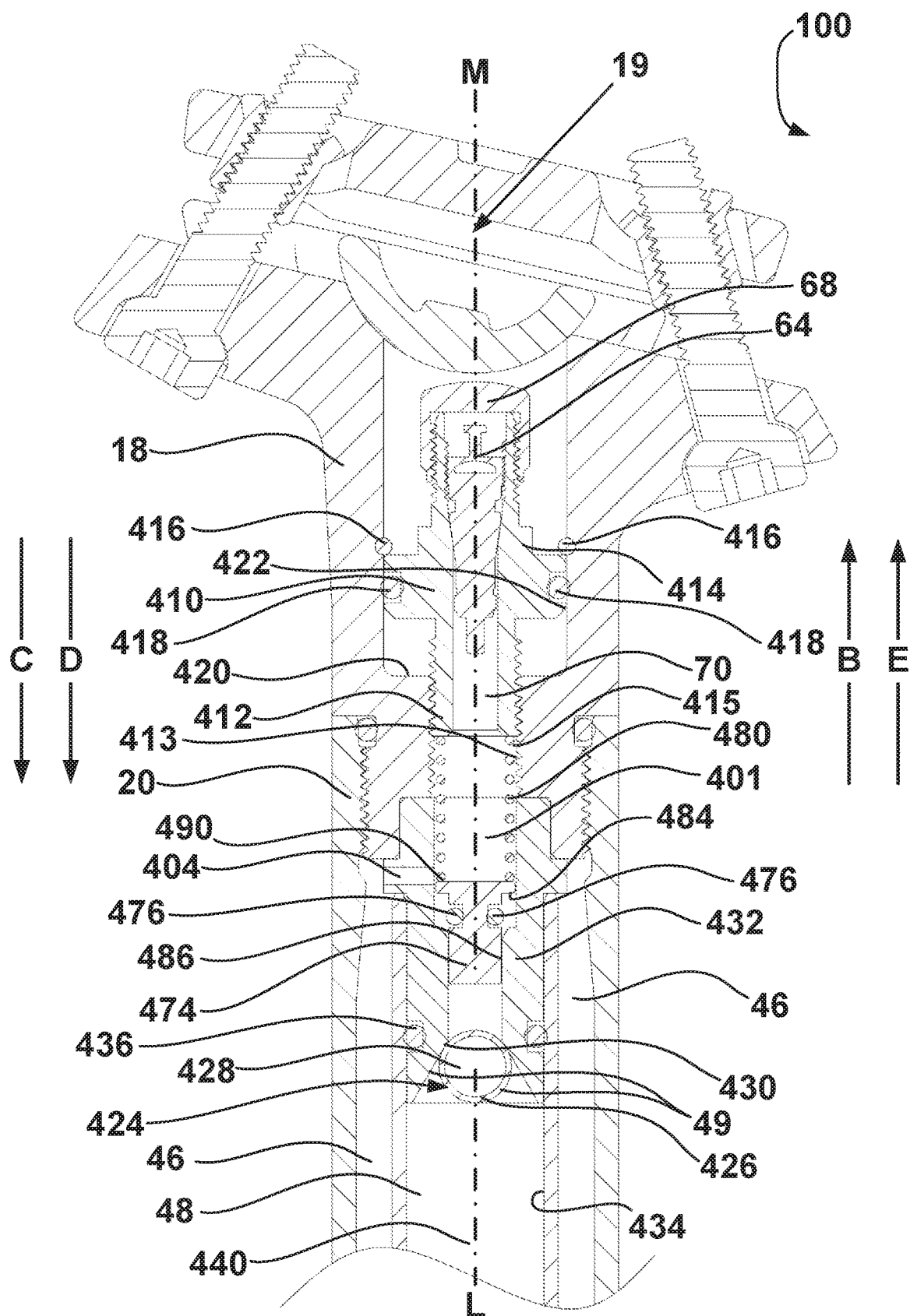
FIG. 22 illustrates an enlarged view of the fluid device of FIG. 16.

FIG. 22 illustrates an enlarged view of the seal device 466 of FIG. 16 as a progression from the illustration of FIG. 21 where the seat post upper 20 has continued to move in the lowering direction C relative to the seat post lower 22. In this illustration, the seal device 466 is in its sealed state with the seal body 426 forming a seal with the body interaction surface 430. The embodiment shown has no remaining venting portion 438 in the hydraulic support chamber 48 as all relatively low-density fluids have flowed out of the hydraulic support chamber 48. Depending on the configuration of the seal device 466, for instance density of the seal unit 424 relative to density of the relatively high-density fluids, the volume of the venting portion 438 remaining when the seal device 466 enters its sealed state may be different. For example, a relatively small volume of the venting portion 438 may remain when the seal device 466 enters its sealed state. The entire volume of the venting portion 438 may also have flowed out of the hydraulic support chamber 48 before the seal device 466 enters its sealed state.

Once the seal device 466 enters its sealed state fluid communication across the sealing interaction of the seal body 426 and the body interaction surface 430 is inhibited. Assuming the actuation valve 52 is closed and thus remains in its sealed state, the hydraulic support chamber 48 is sealed. With the hydraulic support chamber 48 sealed, movement of the seat post upper 20 in the lowering direction C relative to the seat post lower 22 is limited to the compressibility of the hydraulic support chamber 48. In the embodiment shown with the sealing portion 440 representing substantially all of the hydraulic support chamber 48, only minimal compressibility will be possible.

In an embodiment, the sealing portion 440 represents a volume of hydraulic fluid within the hydraulic support chamber 48 and the venting portion 438 represents a volume of air within the hydraulic support chamber 48. When the venting portion 438 is part of the hydraulic support chamber 48, the compressible nature of air will mean the hydraulic support chamber 48 is relatively compressible. In this scenario, movement between the seat post upper 20 and the seat post lower 22 is possible without opening of the actuation valve 52. The relatively less dense air that makes up the venting portion 438 separates from the relatively more dense hydraulic fluid that makes up the sealing portion 440 and thus enables selective removal of air from the hydraulic support chamber 48.

Fluid communication past the vent seal 476 may also be between the hydraulic support chamber 48 and another component of the bicycle 10 or another component of the seating component 15. For instance, the hydraulic support chamber 48 may be in fluid communication past the vent seal 476 with another component in order to facilitate containment of fluids and/or recycling of fluids. Fluid communication past the vent seal 476 may also be vented to atmosphere, i.e. the external environment 100.

Figure 23:
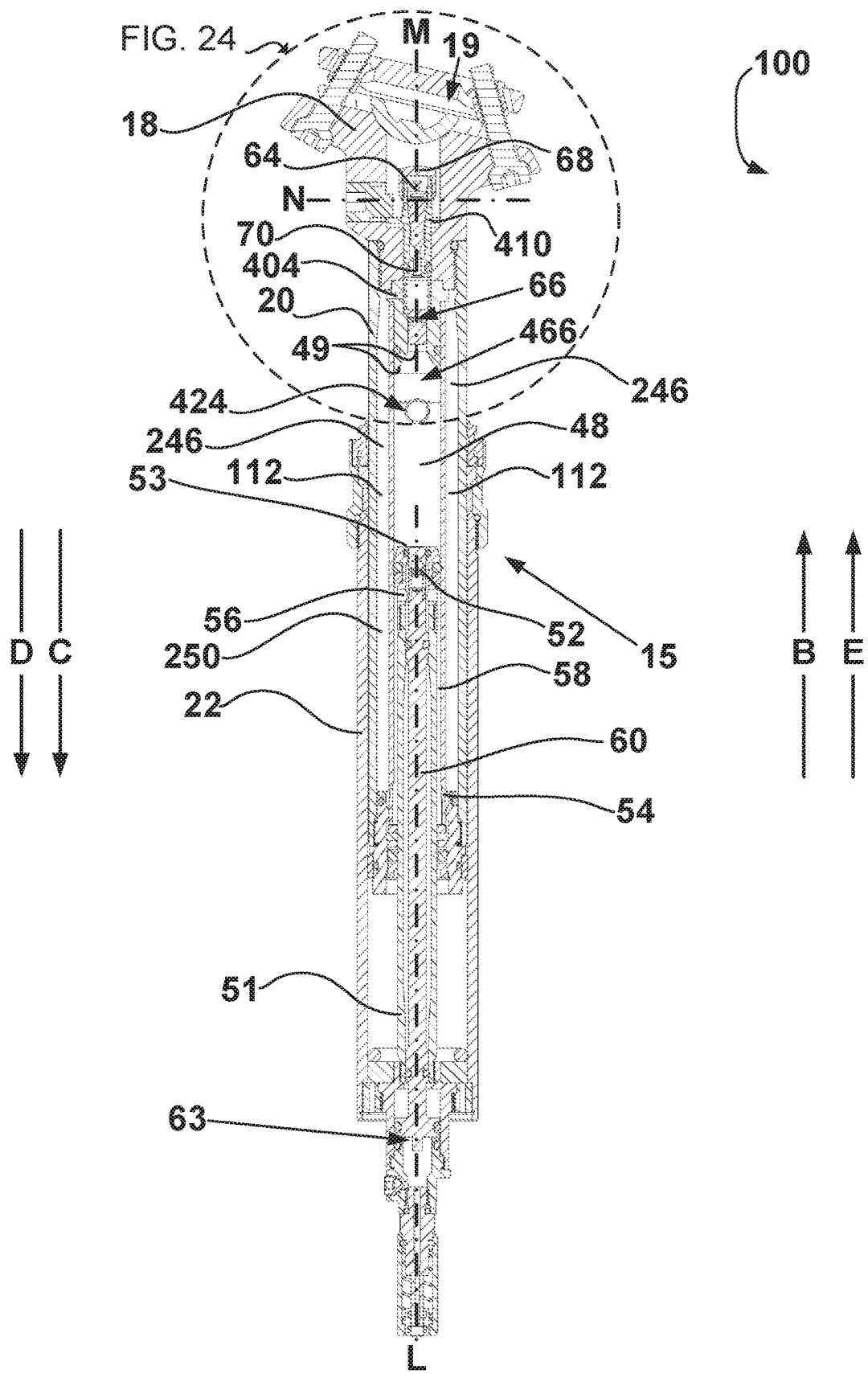
FIG. 23 is a bisected cross-sectional view of an embodiment of an adjustable seating assembly having a fluid device.

FIG. 23 is a bisected cross-sectional view of an embodiment of the seating component 15 having a seal device 466. The example in FIG. 23 differs from the example in FIGS. 16-22 in the configuration of the vent device 66 and the bias adjustment member 410 and in that no floating piston 44 is provided. Variations on this embodiment are possible. For instance, this embodiment may have the vent device 66 and the bias adjustment member 410 of FIG. 1 and not the floating piston 44. Alternatively, the embodiment of FIG. 16 may be provided without the floating piston 44.

The embodiment shown in FIGS. 23-29 may retain similar characteristics as previous embodiments, relying on gravitational separation between fluids having different densities. For instance, liquid oil of relatively high density will collect at the gravitational bottom of a given chamber when in communication with a gaseous fluid of relatively low density as in previous embodiments. The embodiment of FIGS. 23-29 also shows a different configuration of the bias adjustment member 410.

The bias adjustment member 410 may interact with a different configuration of the movable bias adjuster 412. For example, the movable bias adjuster 412 may be of a rotatable camming configuration and may not be formed as part of the bias adjustment member 410. The movable bias adjuster 412 as shown includes a cam portion 417 configured to interact with the adjustment anti-bias stop 416. The cam portion 417 is of an eccentric configuration relative to a cam axis N.

Figure 30A:
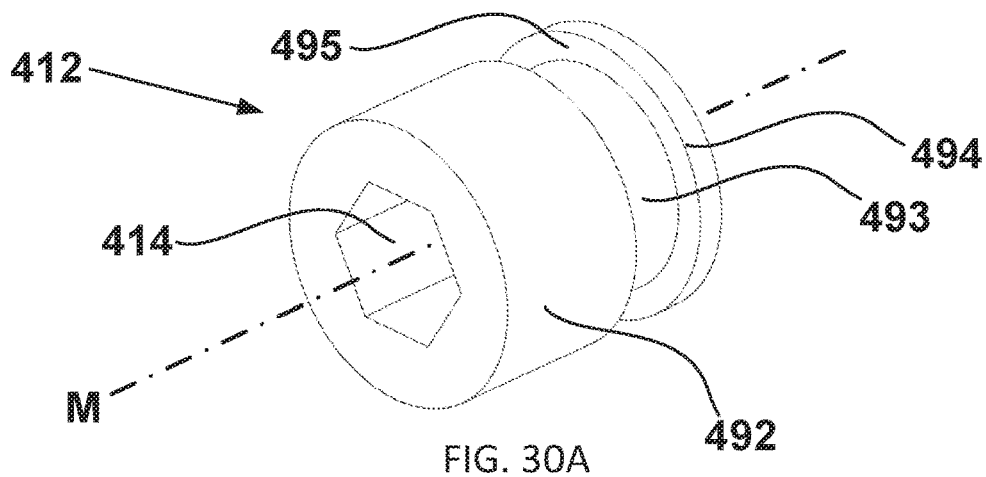
FIG. 30A illustrates an isometric view of a component of the fluid device of FIG. 23.
Figure 30B:
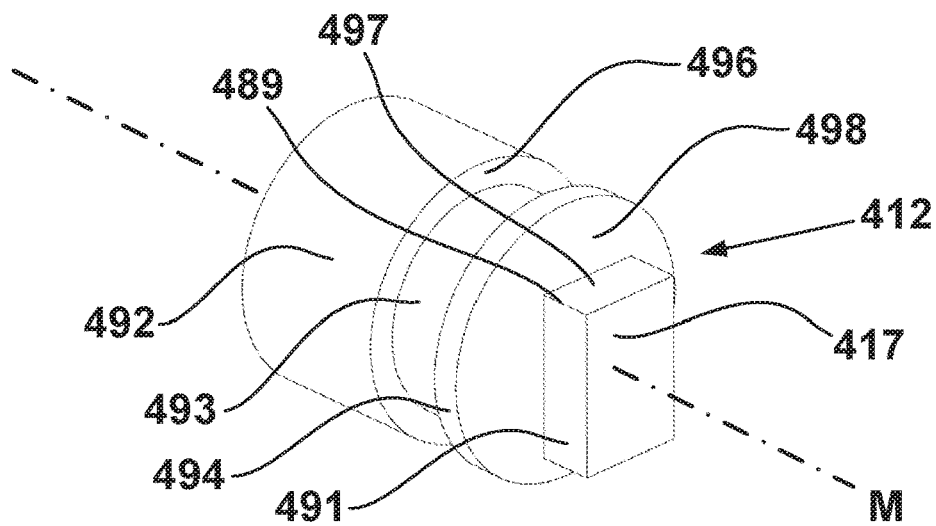
FIG. 30B illustrates an isometric view of the component of the fluid device of FIG. 30A.
Figure 30C:
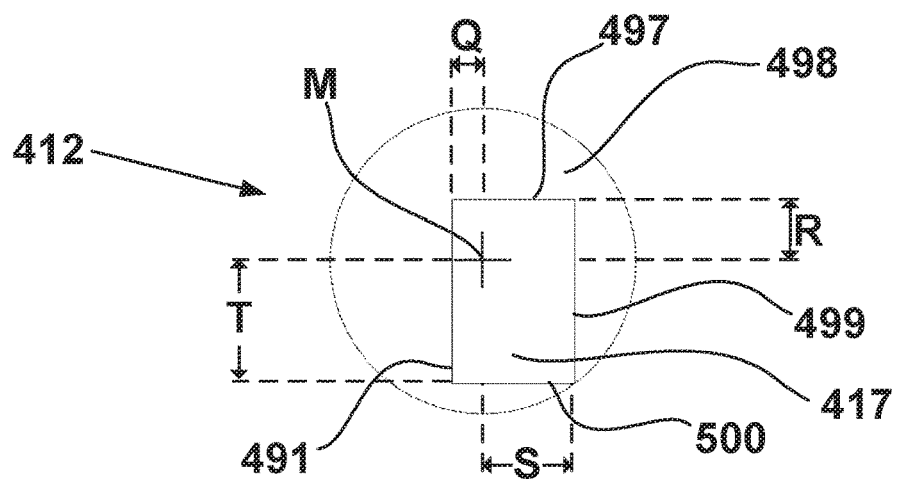
FIG. 30C illustrates a side view of a of the component of the fluid device of FIG. 30A.

FIGS. 30A-C show different views of an embodiment of the movable bias adjuster 412 having the cam portion 417. The movable bias adjuster 412 as shown includes a first rotation surface 492 and a second rotation surface 494 axially separated by a fixing recess 493 relative to the cam axis N. The first and second rotation surfaces 492, 494 are configured for rotation about the cam axis N relative to a rotation interaction surface 411. The rotation interaction surface 411 may be an annular inner surface defined by a vacancy in the seat post head 18. Likewise, the first and second rotation surfaces 492, 494 are annular outer surfaces of the movable bias adjuster 412.

The fixing recess 493 may be used to fix the movable bias adjuster 412 axially relative to the cam axis N. For example, the fixing recess 493 is located between a first fixing surface 495 and a second fixing surface 496. The first and second fixing surface 495, 496 may be configured to interact with another component to axially fix the movable bias adjuster 412 along the cam axis N to the seat post head 18 or another component. For example, a spring-loaded ball detent or similar device (not shown) may be included in the seat post head 18 to limit axial movement of the movable bias adjuster 412 along the cam axis N while not inhibiting rotation of the movable bias adjuster 412 about the cam axis N.

The cam portion 417 of the movable bias adjuster 412 is shown located on a cam locating surface 498. The cam portion 417 may be integral or otherwise affixed to the cam locating surface 498. The cam portion 417 is configured to interact with the bias adjustment member 410 so as to set positions of the bias adjustment member 410 as defined by relative position in the bias direction D and the anti-bias direction E along the second axis M. The cam portion 417 is configured eccentrically such that at least two positions of the bias adjustment member 410 are facilitated. The cam portion 417 may be configured for infinitely adjustable positions of the bias adjustment member 410. The cam portion 417 may also be configured for a limited number of discrete positions of the bias adjustment member 410.

The shown configuration of the cam portion 417 is configured for four discrete positions of the bias adjustment member 410. Each of the positions of the bias adjustment member 410 is defined by a cam surface and its distance from the cam axis N. In this embodiment, greater distances from the cam axis N correspond to greater displacement of the bias adjustment member in the bias direction D. Corners between the cam surfaces may be chamfered to facilitate rotation about the cam axis N.

The embodiment of the cam portion 417 shown in FIGS. 30A-C has a first cam surface 491 corresponding to a first cam distance Q, a second cam surface 497 corresponding to a second cam distance R, a third cam surface 499 corresponding to a third cam distance S, and a fourth cam surface 500 corresponding to a fourth cam distance T. Each of the cam distances Q, R, S, and T relates to the axial distance from cam axis N of each respective cam surface 491, 497, 499, and 500. When each cam surface 491, 497, 499, and 500 is engaged with the adjustment anti-bias stop 416, the distance the adjustment anti-bias stop 416 is displaced in the bias direction D from the cam axis N will correspond to the same cam distances Q, R, S, and T.

FIGS. 30A-C show an embodiment of the cam portion 417 having four discrete cam distances Q, R, S, and T. However, the cam portion 417 may be otherwise configured. For example, the first cam distance Q and the third cam distance S may be the same and the second cam distance R and the fourth cam distance T may be the same. In this alternative embodiment, rotation of the movable bias adjuster 412 with the hex-key interface configuration of the adjustment interface 414 will effectively switch between two positions of the bias adjustment member 410. For example, rotation from the first cam surface 491 to the second cam surface 497 may move the bias adjustment member 410 in the bias direction D from a position allowing movement of the vent member 474 along the second axis M to a position inhibiting movement of the vent member 474. In this example, further rotation from the second cam surface 497 to the third cam surface 499 may then return the bias adjustment member 410 to a position allowing movement of the vent member 474.

Rotation from the first cam surface 491 to the second cam surface 497 may include rotation past a transition zone 489. The transition zone 489 may be a sharp corner between the first and second cam surfaces 491, 497 or may be chamfered. In an embodiment, an orthogonal configuration of the transition zone 489 may be employed to make rotation relatively difficult, for instance to reduce the possibility of accidental rotation. In another embodiment, an obtuse or chamfered configuration of the transition zone 489 may be employed to make rotation relatively easy, for instance to increase user adjustability or to decrease wear. In yet another embodiment, the transition zone 489 between the first and second cam surfaces 491, 497 is chamfered to facilitate easy rotation while another transition zone is of an orthogonal, non-chamfered configuration to limit accidental rotation.

Figure 24:
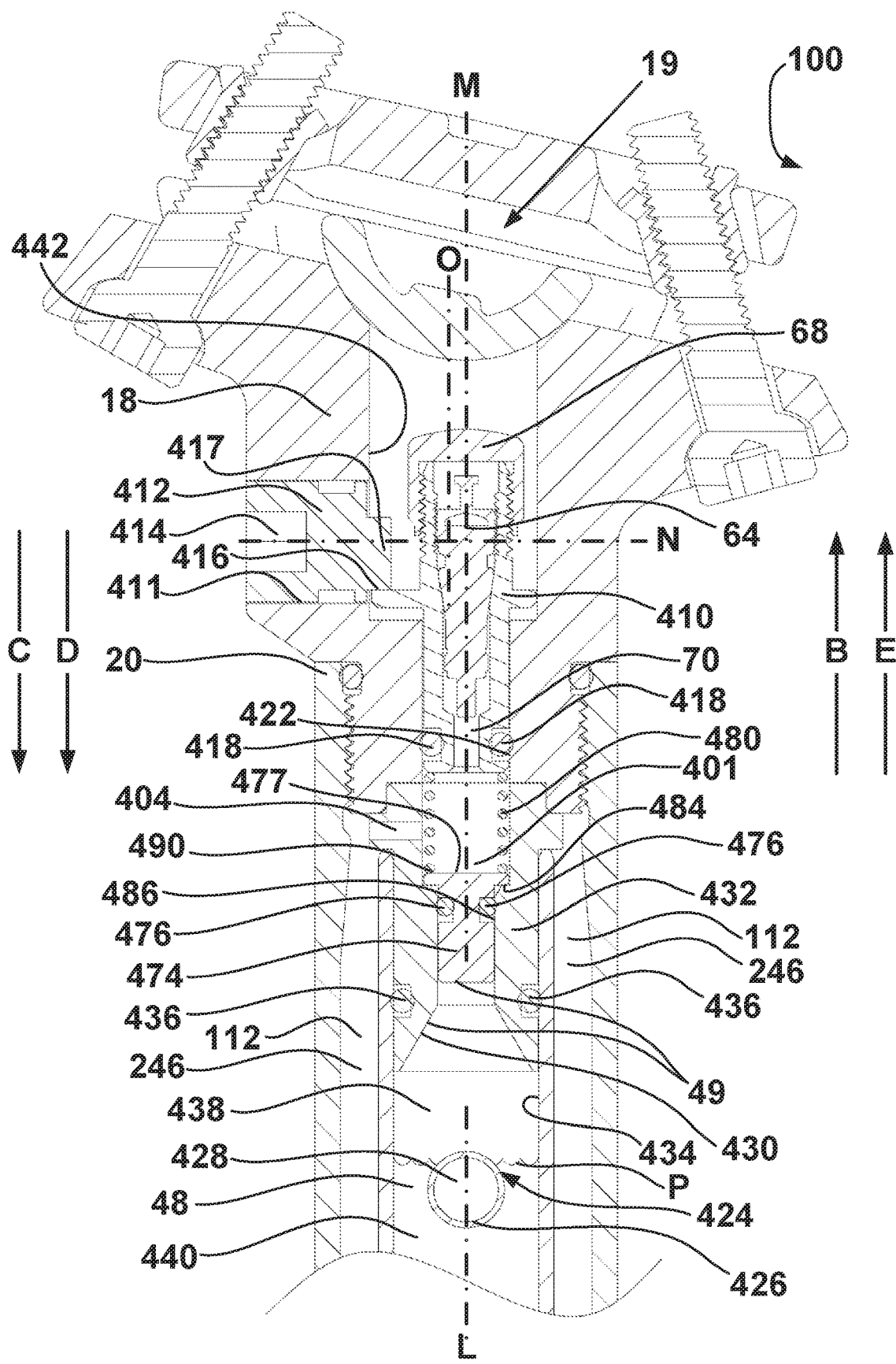
FIG. 24 illustrates an enlarged view of the fluid device of FIG. 23.
Figure 25:
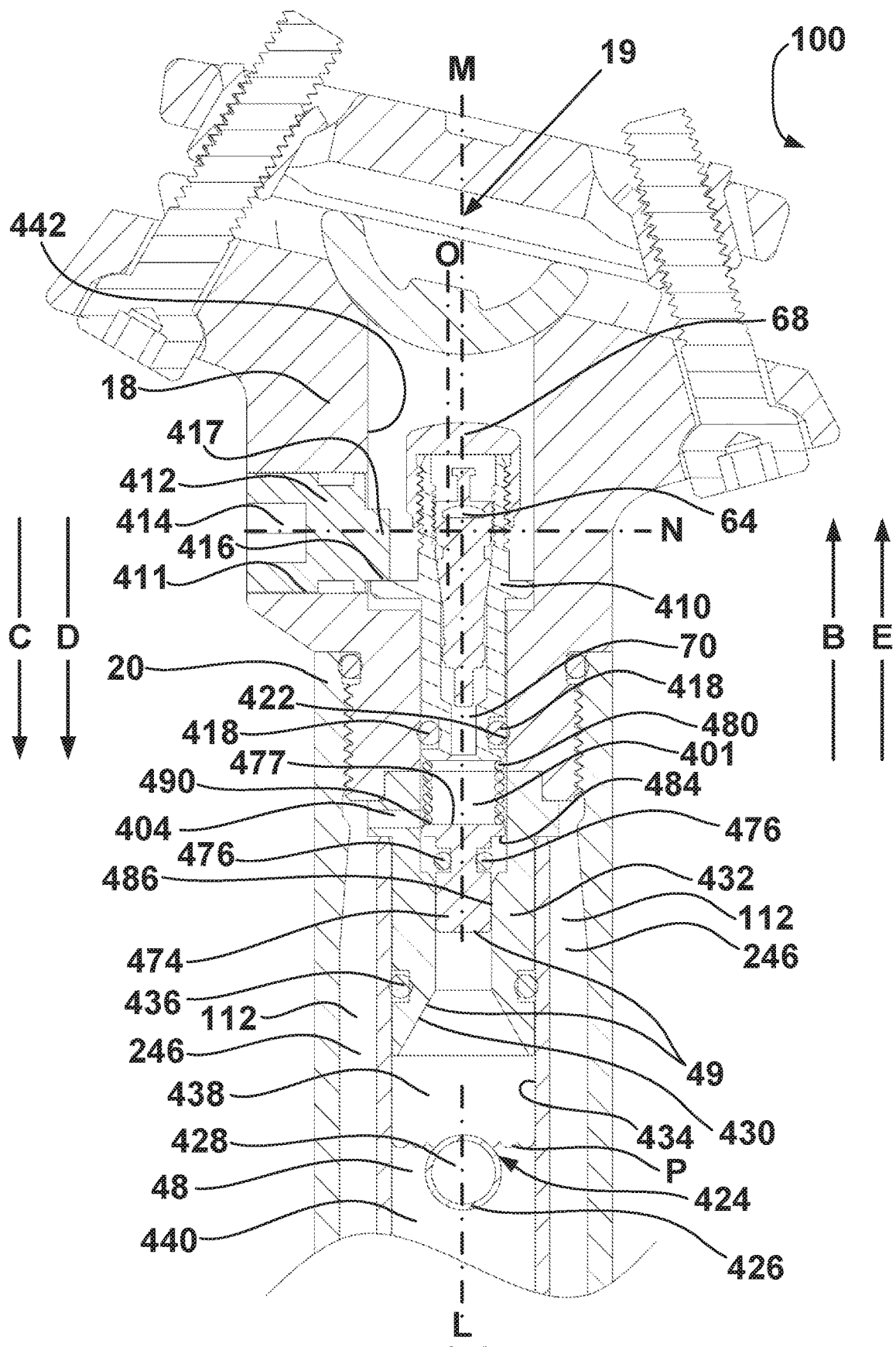
FIG. 25 illustrates an enlarged view of the fluid device of FIG. 23.
Figure 26:
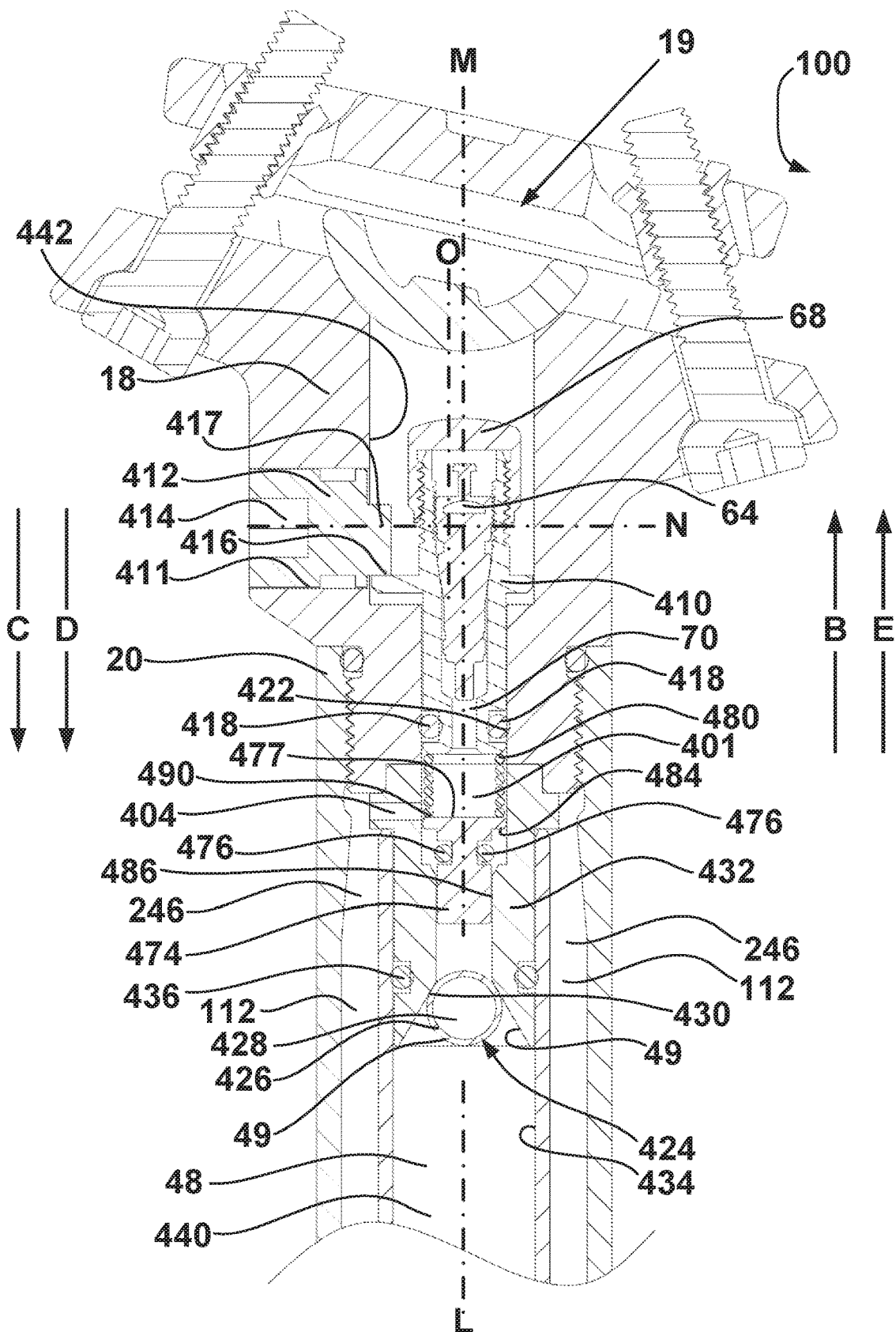
FIG. 26 illustrates an enlarged view of the fluid device of FIG. 23.

FIGS. 24-26 show the movable bias adjuster 412 rotated such that the fourth cam surface 500 interacts with the adjustment anti-bias stop 416. Thus, the adjustment anti-bias stop 416 is displaced by the fourth cam distance T in the bias direction D along the second axis M. This relatively long displacement in the bias direction D corresponds to relatively high preload on the vent bias device 480. The vent bias device 480 in the shown coil spring configuration thus imparts a relatively high bias force on the vent member 474 in the bias direction D. Movement of the vent member in the anti-bias direction E into its unsealed state therefore requires a relatively high-pressure differential between the hydraulic support chamber 48 and the bias chamber 401.

Figure 27:
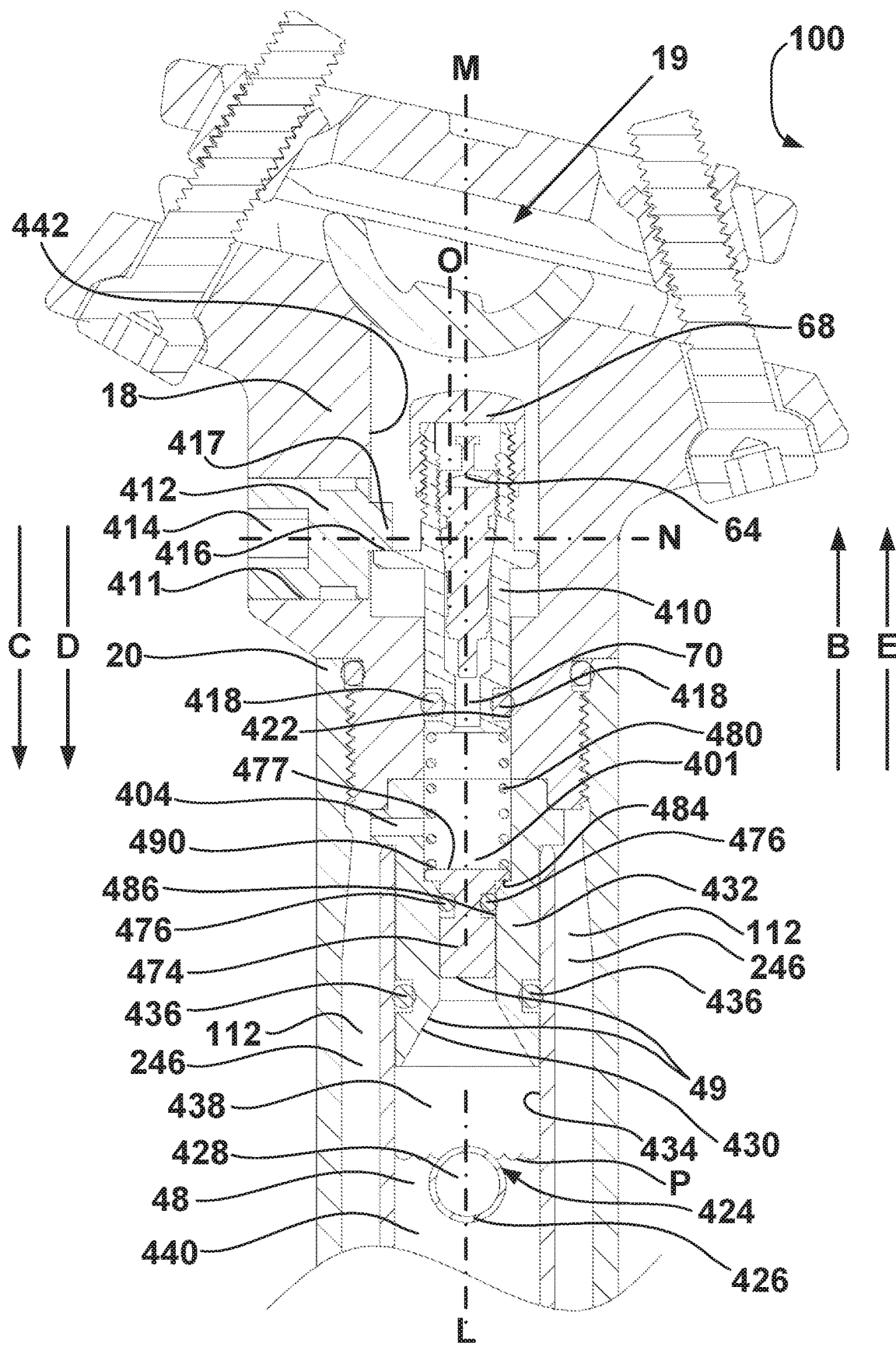
FIG. 27 illustrates an enlarged view of the fluid device of FIG. 23.
Figure 28:
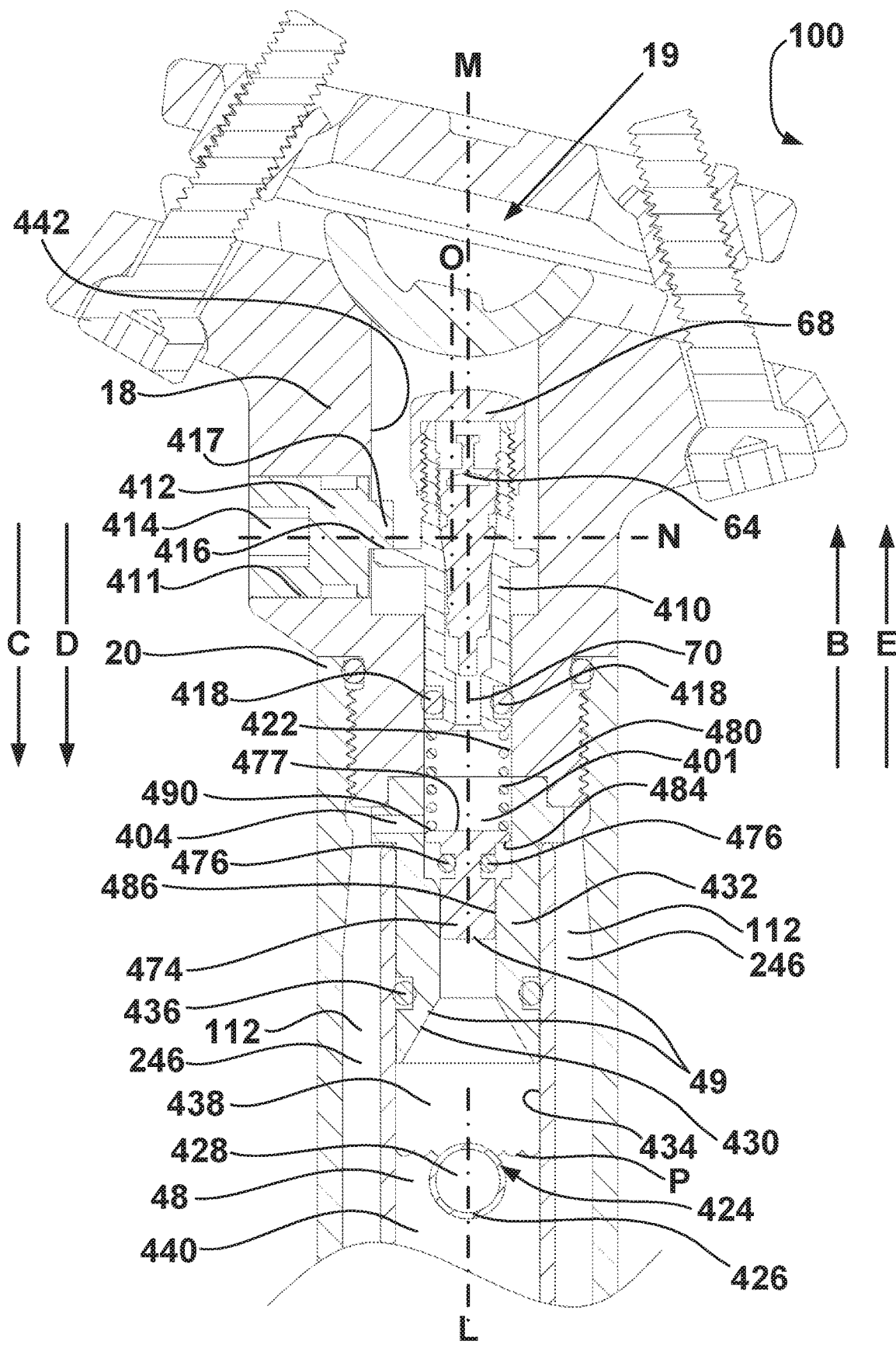
FIG. 28 illustrates an enlarged view of the fluid device of FIG. 23.
Figure 29:
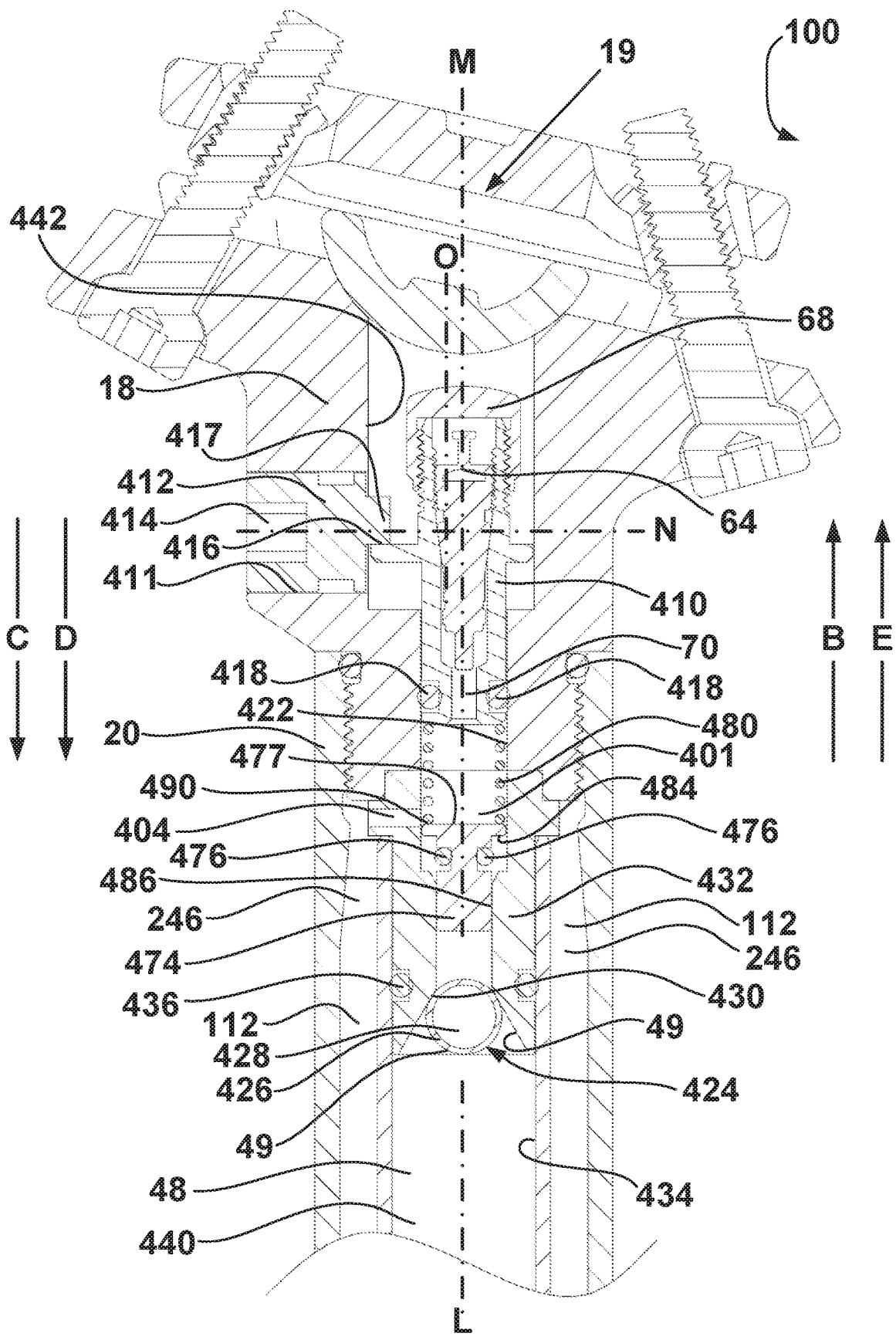
FIG. 29 illustrates an enlarged view of the fluid device of FIG. 23.

FIGS. 27-29 show the movable bias adjuster 412 rotated such that the first cam surface 491 interacts with the adjustment anti-bias stop 416. Thus, the adjustment anti-bias stop 416 is displaced by the first cam distance Q in the bias direction D along the second axis M. This relatively short displacement in the bias direction D corresponds to relatively low preload on the vent bias device 480. The vent bias device 480 in the shown coil spring configuration thus imparts a relatively low bias force on the vent member 474 in the bias direction D. Movement of the vent member in the anti-bias direction E into its unsealed state therefore requires a relatively low-pressure differential between the hydraulic support chamber 48 and the bias chamber 401.

FIGS. 25 and 28 show the vent member 474 in its actuated or unsealed state in the relatively high bias force and relatively low bias force states of the vent bias device 480, respectively. As in previous embodiments, the vent member 474 may be actuated into its unsealed state by a sufficient pressure differential between the hydraulic support chamber 48 and the bias chamber 401 to overcome the bias force provided by the vent bias device 480. With the seal device 466 in its unsealed state, compressible fluids having relatively low densities may preferentially flow out of the hydraulic support chamber 48. In an embodiment, the seal device 466 is configured to seal after substantially all low-density fluid has flowed out of the hydraulic support chamber 48, but before a substantial volume of high density fluid has flowed out of the hydraulic support chamber 48.

FIGS. 26 and 29 show the seal device 466 in its sealed state in the relatively high bias force and relatively low bias force states of the vent bias device 480, respectively. As in previous embodiments, this sealed state may be achieved by movement of the seal unit 424 in the raising direction B as a result of the intermediate buoyancy of the seal unit 424 and the preferential flow of relatively less dense compressible fluids out of the hydraulic support chamber 48. The seal device 466 prevents further flow out of the hydraulic support chamber 48 into the communication chamber 112 through the recycling path 404.

FIGS. 24-29 depict an access axis O offset from the second axis M. The depicted configuration has a closely fit first annular outer surface of the bias adjustment member 410 extending into a first annular inner surface of the seat post head 18 and centered about the second axis M. The bias adjustment member 410 also has a second annular outer surface closely fit with an access surface 442. The access surface 442 may be a second annular inner surface of the seat post head 18 and centered about the access axis O. The offset of the second axis M and the access axis O in this configuration inhibits relative rotation of the bias adjustment member 410 and the seat post head 18. Inhibiting this relative rotation may facilitate installation and removal of a threaded attachment portion of the air pump (not shown) in place of the adjustment valve cover in order to adjust system pressure.

An anti-rotation configuration of the bias adjustment member 410 may be otherwise achieved. For instance, the bias adjustment member 410 may be of a polygonal configuration in order to interact with a polygonal configuration of the access surface 442. Alternatively, the bias adjustment member 410 and the access surface 442 may be keyed as to prevent relative rotation therebetween.

Other configurations of the bias adjustment member 410 are contemplated. For example, ratcheting or plunger type embodiments may be implemented. In an alternative embodiment, the movable bias adjuster 412 may be omitted. In this embodiment, the vent bias device 480 may be non-adjustable. For instance, the bias adjustment member 410 may be substituted with a non-adjustable component. Such a substitution is discussed with regard to FIG. 31.

FIG. 31 depicts a seating component 15 not having the vent device 66. In this embodiment, the vent bias device 480 and provisions thereof are not necessary. A valve member 610 may be substituted in place of the bias adjustment member 410. The valve member 610 forms a seal with a valve member seal surface 622 and a valve member seal 618. The valve member 610 may be secured in the lowering direction C against a valve member stop 620. The valve member 610 may be secured to the seating component 15 in various ways. The present embodiment depicts the valve member 610 having a valve member threaded portion 615 configured to interface with the threaded head portion of the seat post head 18. A valve member interface 614 may be provided to facilitate securing of the valve member 610. The present embodiment depicts the valve member interface 614 as a hex nut configuration for interaction with a socket and/or wrench (not shown). The valve member interface 614 may be otherwise configured for tooled or tool-less installation. For instance, the valve member interface 614 may be textured for manual installation.

Figure 32A:
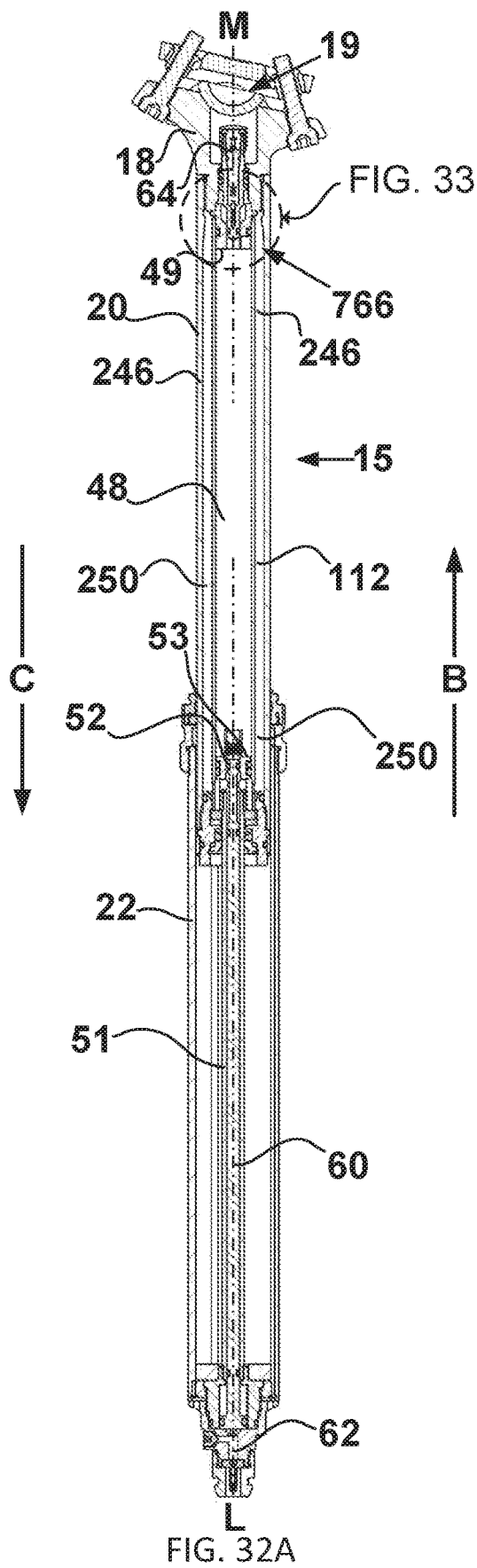
FIG. 32A is a bisected cross-sectional view of an embodiment of an adjustable seating assembly having a fluid device.
Figure 32B:
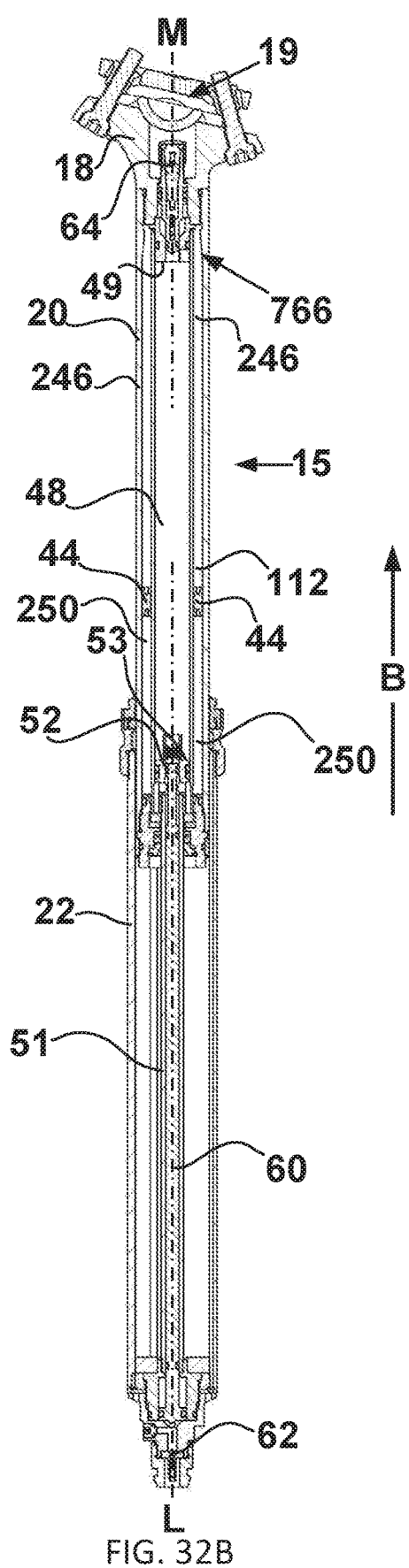
FIG. 32B is a bisected cross-sectional view of an embodiment of an adjustable seating assembly having a fluid device.

Referring to FIGS. 32A and 32B, the seating component 15 may be provided with a fluid device 766. The fluid device 766 may be implemented in an embodiment having a floating piston 44, as in FIG. 32B, or in an embodiment without a floating piston, as in FIG. 32A. The embodiments of FIGS. 32A and 32B differ from previous embodiments in that the fluid device 766 comprises a flow device 702 having a hole-type construction.

Figure 33:
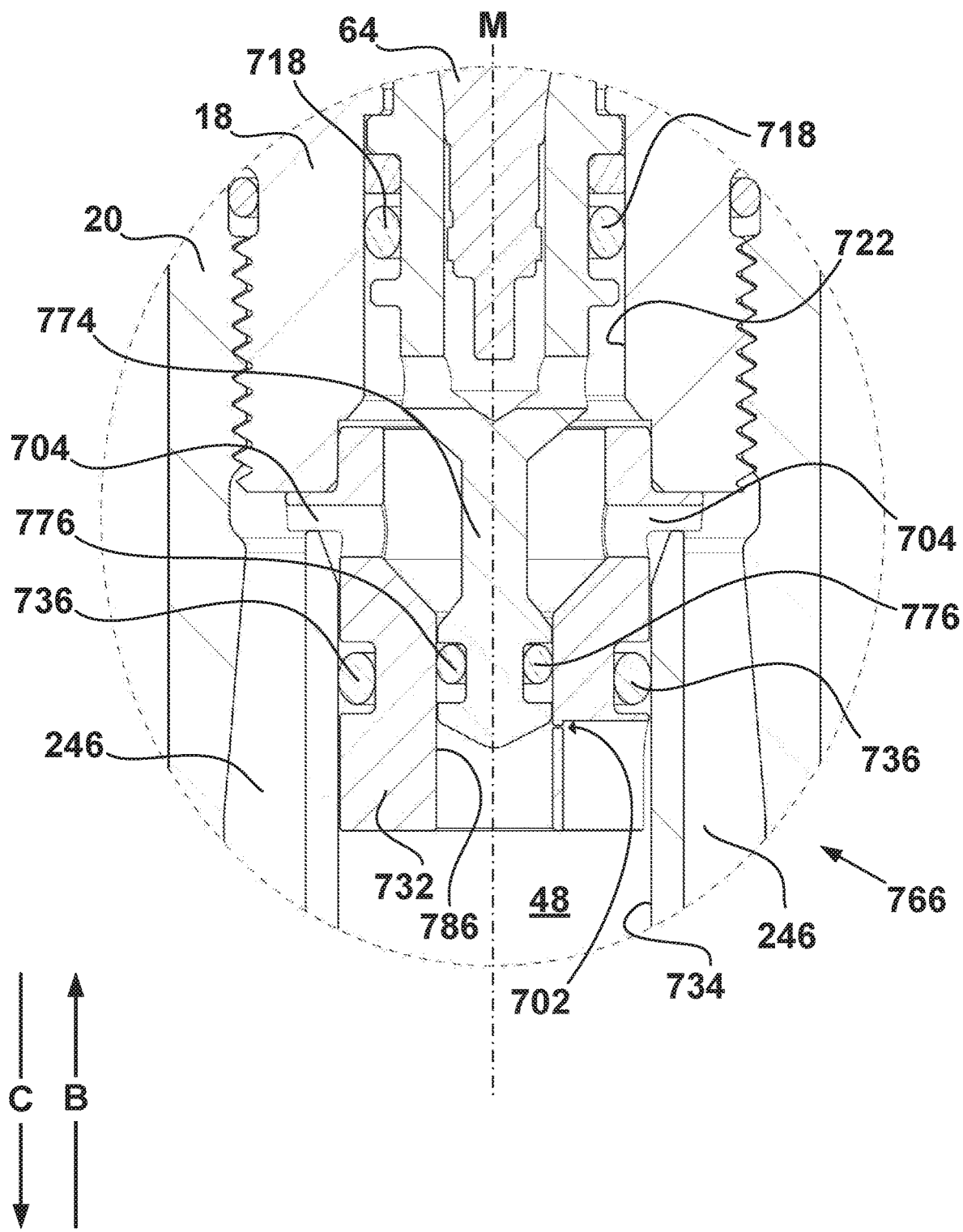
FIG. 33 illustrates an enlarged view of the adjustable seating assembly of FIG. 32A in a closed state.

FIG. 33 illustrates an enlarged view of the seating component of FIG. 32A in a closed state of the fluid device 766. In this closed state, fluid does not communicate from the hydraulic support chamber 48 to the pneumatic spring portion 246. A vent seal 776 is provided to seal the hydraulic support chamber 48. In an embodiment, the vent seal 776 is a dynamic seal configured to seal with one or more other components of the seating component 15. For example, the vent seal 776 may be configured to seal between a vent member 774 and a vent seal surface 786. The vent member 774 may be movable relative to the vent seal surface 786.

A housing member 732 may be provided to house the vent member 774. The housing member 732 may form a seal with an interior surface 734 of the hydraulic support chamber 48. For example, a housing seal 736 may be provided to sealingly interact with the housing member 732 and the interior surface 734. The housing seal 736 may be an elastomeric seal such as an O-ring, an adhesive sealing arrangement, a compression fitting, and/or another sealing configuration.

Figure 34:
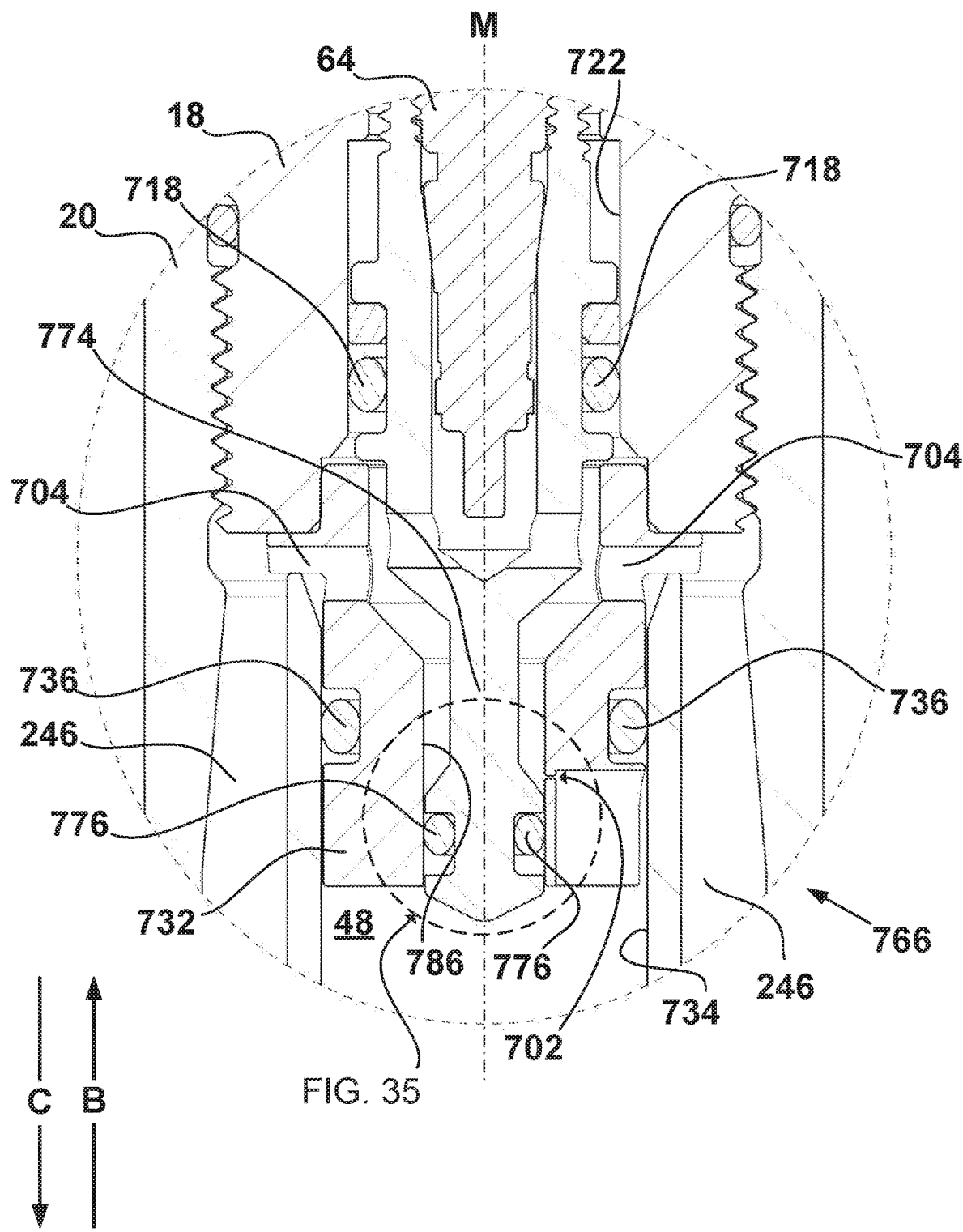
FIG. 34 illustrates the enlarged view of the seating component of FIG. 33 in an open state.

FIG. 34 illustrates the enlarged view of the seating component 15 of FIG. 33 in an open state. In the open state of the fluid device 766, fluid may communicate from the hydraulic support chamber 48 to the pneumatic spring portion 246 across a recycling path 704. In such a way, fluid passing from the hydraulic support chamber 48 may be recycled into communication with the pneumatic spring portion 246, or the pneumatic spring chamber in embodiments having the floating piston 44.

The fluid device 766 may be actuated similarly to other embodiments. For instance, the fluid device 766 may be manually actuated. In an embodiment, the fluid device 766 may be actuated by manually depressing the adjustment valve cover 68. For example, the vent member 774 may be fixed relative to the adjustment valve cover 68. The vent member 774 may form a seal with another component. For example, the vent member 774 may form a seal with a valve member seal surface 722 and a valve member seal 718.

Movement of the valve member 774 relative to the housing member 732 may move the vent seal 776 past the flow device 702. The flow device 702 may be opened to pass fluid between the hydraulic support chamber 48 and the recycling path 704. The flow device 702 may be configured as in other embodiments. Downward pressure in the lowering direction C on the seat post upper 20 may then force fluid from the hydraulic support chamber 48

In an embodiment, the flow device 702 is provided with an orifice configuration. The orifice configuration may be tunable for length and width. For example, the orifice configuration of the flow device 702 may have a diameter tuned for relative easy passage of low density fluids such as gasses and relatively difficult passage of high density fluids such as liquids. The flow device 702 may include a plurality of orifices or may be of a membrane configuration as described with reference to previous embodiments. The orifice configuration may be of a through hole configuration. In an embodiment, the flow device 702 has a diameter of between 0.05 millimeter and 0.35 millimeter. In another embodiment, a through hole configuration of the flow device 702 has a length of between 1 and 2 millimeters.

The fluid device 766 may be configured to preferentially evacuate gaseous fluids due to gravity separation. For example, the fluid device 766 may be actuated when right side up on the bicycle 10, where low density fluids have accumulated near the top of the hydraulic support chamber 48 in the raising direction B.

Figure 35:
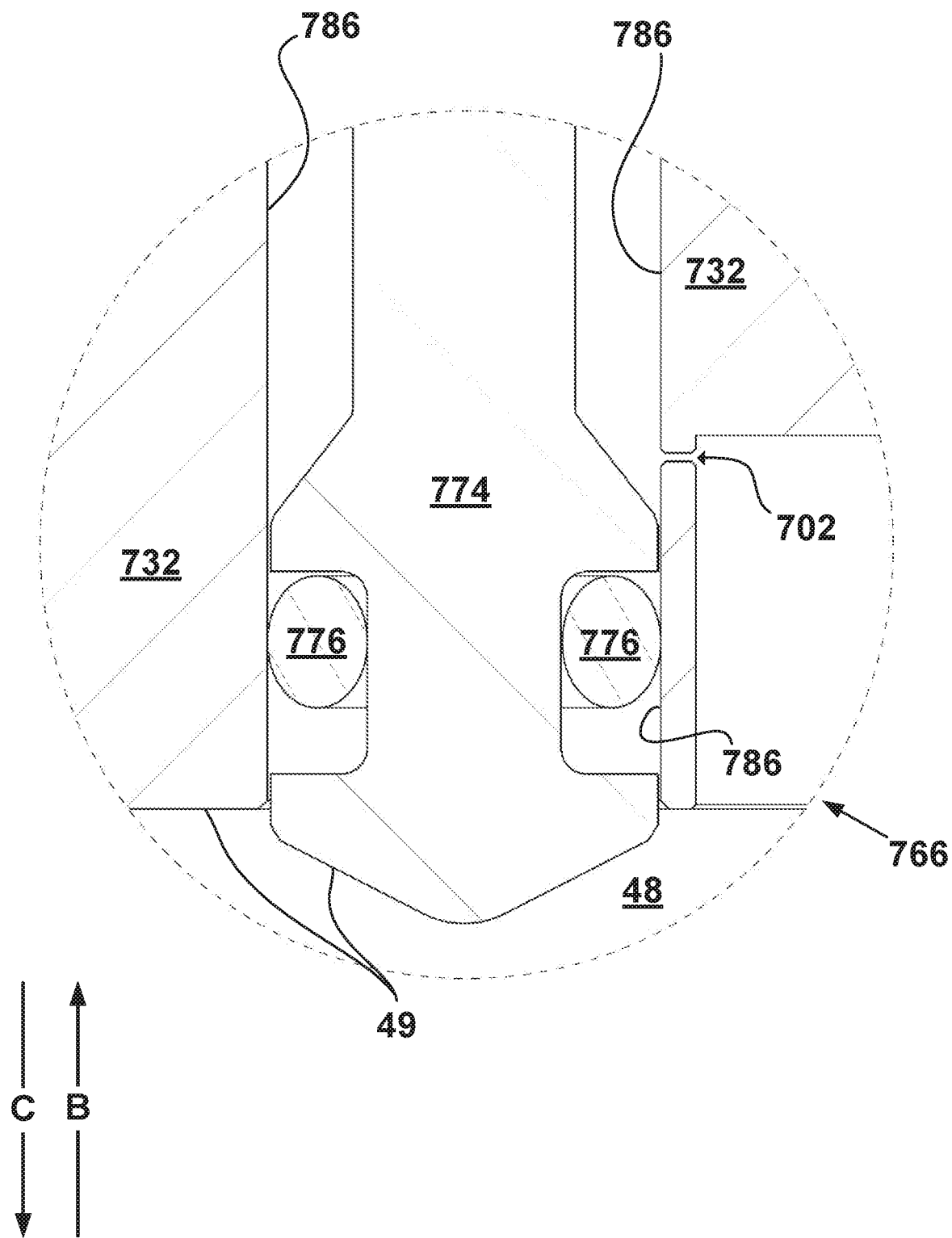
FIG. 35 illustrates a further enlarged view of the open state of the adjustable seating assembly of FIG. 34.

FIG. 35 illustrates a further enlarged view of the open state of the seating component 15 of FIG. 34. The orifice configuration of the flow device 702 is visible to allow fluid to flow out of the hydraulic support chamber 48. The orifice may be tuned to make forcing high-density fluids, such as hydraulic oils, difficult to pass. A user may be made aware that the hydraulic support chamber 48 is sufficiently clear of gasses by a significantly increased difficulty of actuation.

The seating component 15 may have an embodiment wherein the flow device 702 is configured to facilitate flow between the support chamber 48 and an atmospheric volume 100. The seating component 15 may further comprise a vent member 74, the vent member 74 configured to facilitate fluid communication across the flow device 702 in an open state of the vent member 74 and to inhibit fluid communication across the flow device 702 in a closed state of the vent member 74. The vent member 74 may be configured for manual operation. An adjustment valve 64, wherein the adjustment valve 64 is operable in: an adjustment mode for adjusting a pressure of the spring portion 246; and a vent mode for facilitating fluid communication across the flow device 702. The vent member 74 may be fixedly connected to the adjustment valve 64. The vent member 74 may also configured for passive operation. A vent bias device 80 may be configured to adjustably restrict operation of the vent member 74 to the open state of the vent member 74.

The seating component 15 may have an embodiment wherein the flow device 702 comprises an oil impermeable membrane. The flow device 702 may comprise a restricted flow path. The restricted flow path may comprise a through hole between the support chamber 48 and the spring portion 246. The spring portion 246 may be restricted from fluid communication with the reservoir 250 by a floating piston 44. The through hole may have a diameter of between 0.05 millimeter and 0.35 millimeter. The through hole may have a length of between 1 and 2 millimeters. The restricted flow path may comprise a plurality of through holes.

The seating component 15 may have an embodiment wherein the flow device 702 is configured to facilitate flow between the support chamber 48 and an external volume 100. The flow device 702 may comprise a through hole between the support chamber 48 and the spring portion 246. The reservoir 250 may be sealed from the spring portion 246 with a floating piston 44. The reservoir may be in fluid communication with the support chamber 48 across a recycling path 704 disposed in the upper.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this depiction should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to fewer than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A component for a bicycle, comprising:
    a hydraulic reservoir chamber configured to include liquid oil;
    a vent device disposed at an intersection of the hydraulic reservoir and an external environment of the component, comprising:
        a permeable device including a membrane formed of a material that permits the flow of gas from the hydraulic reservoir chamber to the external environment, and prohibits the flow of the liquid oil from the hydraulic reservoir chamber to the external environment.

2. The component of claim 1, wherein the vent device further includes a device configured to secure the permeable device to the component.

3. The component of claim 2, wherein the device is a flow device having at least one channel permitting fluid flow from the hydraulic reservoir chamber to the external environment.

4. The component of claim 3, wherein the flow device is disposed between the permeable device and the external environment.

5. The component of claim 2, wherein the device secures the permeable device to the component using a threaded attachment.

6. The component of claim 1, further comprising a seat post head.

7. The component of claim 6, wherein the vent device is disposed in the seat post head.

8. The component of claim 1, further comprising an upper, and a lower connected to the upper and movable relative to the upper along an axis.

9. The component of claim 8, wherein the hydraulic reservoir chamber is disposed between the upper and the lower.

10. The component of claim 8, further comprising a spring portion configured to contain a relatively compressible fluid when compared to the liquid oil.

11. The component of claim 10, wherein the reservoir is sealed from the spring portion with a piston.

12. The component of claim 8, wherein the upper is disposed between the lower and the vent device.

13. The component of claim 8, further comprising a piston in contact with the liquid oil.

14. The component of claim 8, wherein the upper is an upper tube and the lower is a lower tube.

15. The component of claim 1, further comprising a lever.

* * * * *